United States Patent [19]

Ueda

[11] Patent Number: 5,541,956
[45] Date of Patent: Jul. 30, 1996

[54] ADAPTIVE EQUALIZER AND ADAPTIVE DIVERSITY EQUALIZER

[75] Inventor: Koji Ueda, Kanagawa, Japan

[73] Assignee: Mitsubishi Denki Kabushiki Kaisha, Tokyo, Japan

[21] Appl. No.: 292,612

[22] Filed: Aug. 18, 1994

[30] Foreign Application Priority Data

Sep. 10, 1993 [JP] Japan .................. 5-226004

[51] Int. Cl.⁶ ............................................. H03H 7/30
[52] U.S. Cl. ................................. 375/232; 375/233
[58] Field of Search .................... 375/230, 231, 375/232, 233, 236, 234, 346, 347, 350; 333/18, 28 R; 364/724.19, 724.2

[56] References Cited

U.S. PATENT DOCUMENTS 5,203,027  4/1993  Nounin et al. ..................... 375/231
5,230,007  7/1993  Baum ................................. 375/232
5,274,670  12/1993 Serizawa et al. .................. 375/231
5,337,025  8/1994  Polhemus ........................... 375/232
5,416,799  5/1995  Currivan et al. ................... 375/232

*Primary Examiner*—Stephen Chin
*Assistant Examiner*—Huong Luu
*Attorney, Agent, or Firm*—Wolf, Greenfield & Sacks, P.C.

[57] ABSTRACT

An adaptive equalizer which has a decision feedback adaptive equalizer unit 41, a linear adaptive equalizer unit 42, comparing circuit 47 which compares integrated equalizing error value of the decision feedback adaptive equalizer 41 with integrated estimation error value of the linear adaptive equalizer unit 42, and selecting circuit 48. The selecting circuit 48 selects one of the equalizer units 41 and 42, which has the better performance based on the result of the comparison of comparing circuit 47.

6 Claims, 23 Drawing Sheets

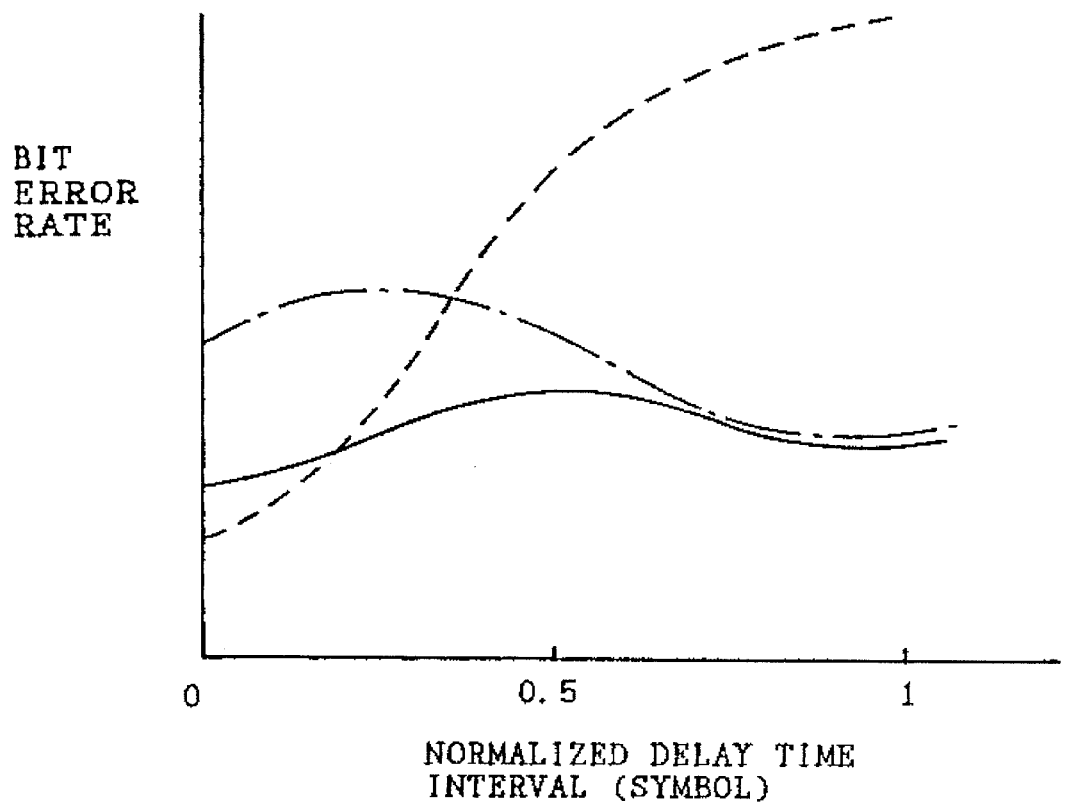

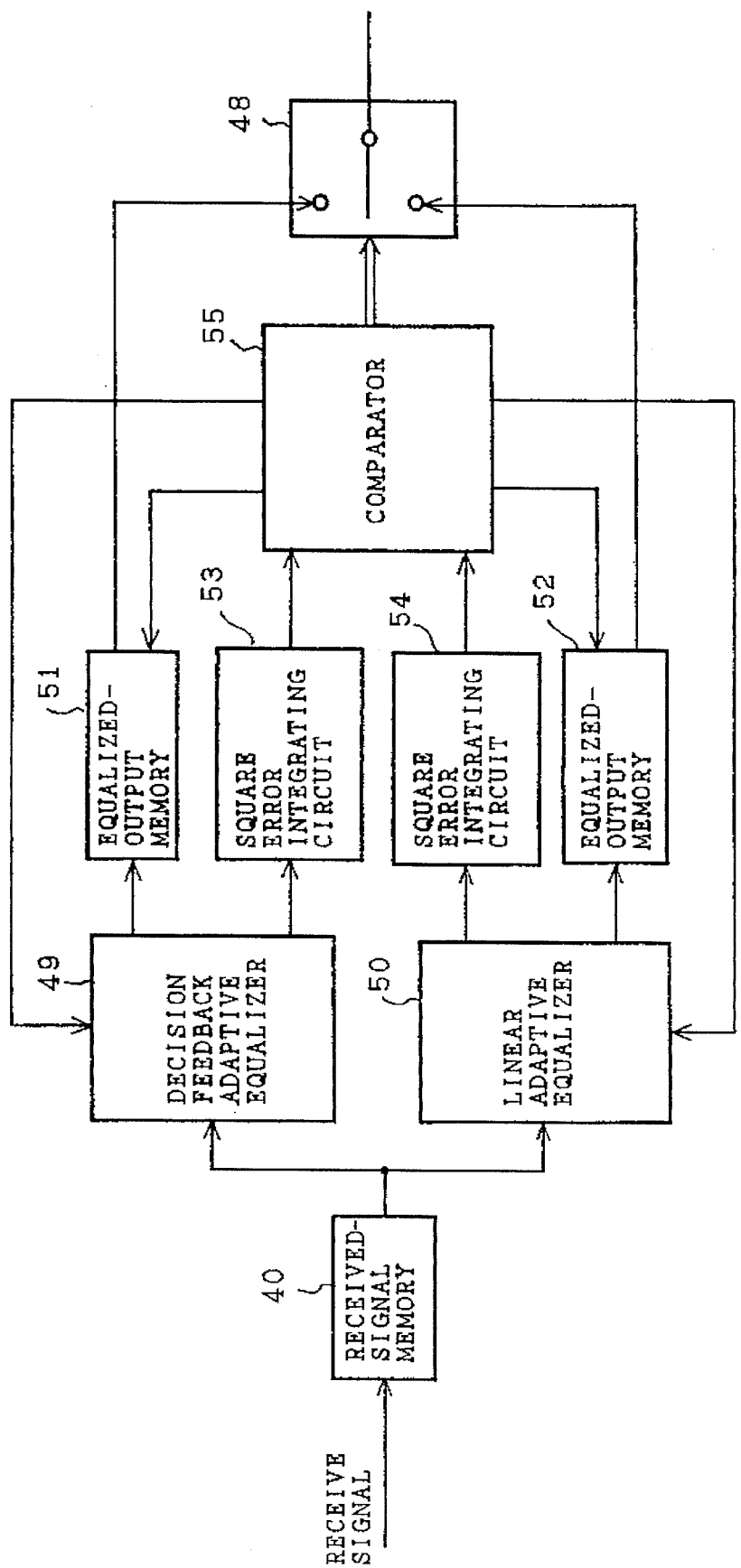

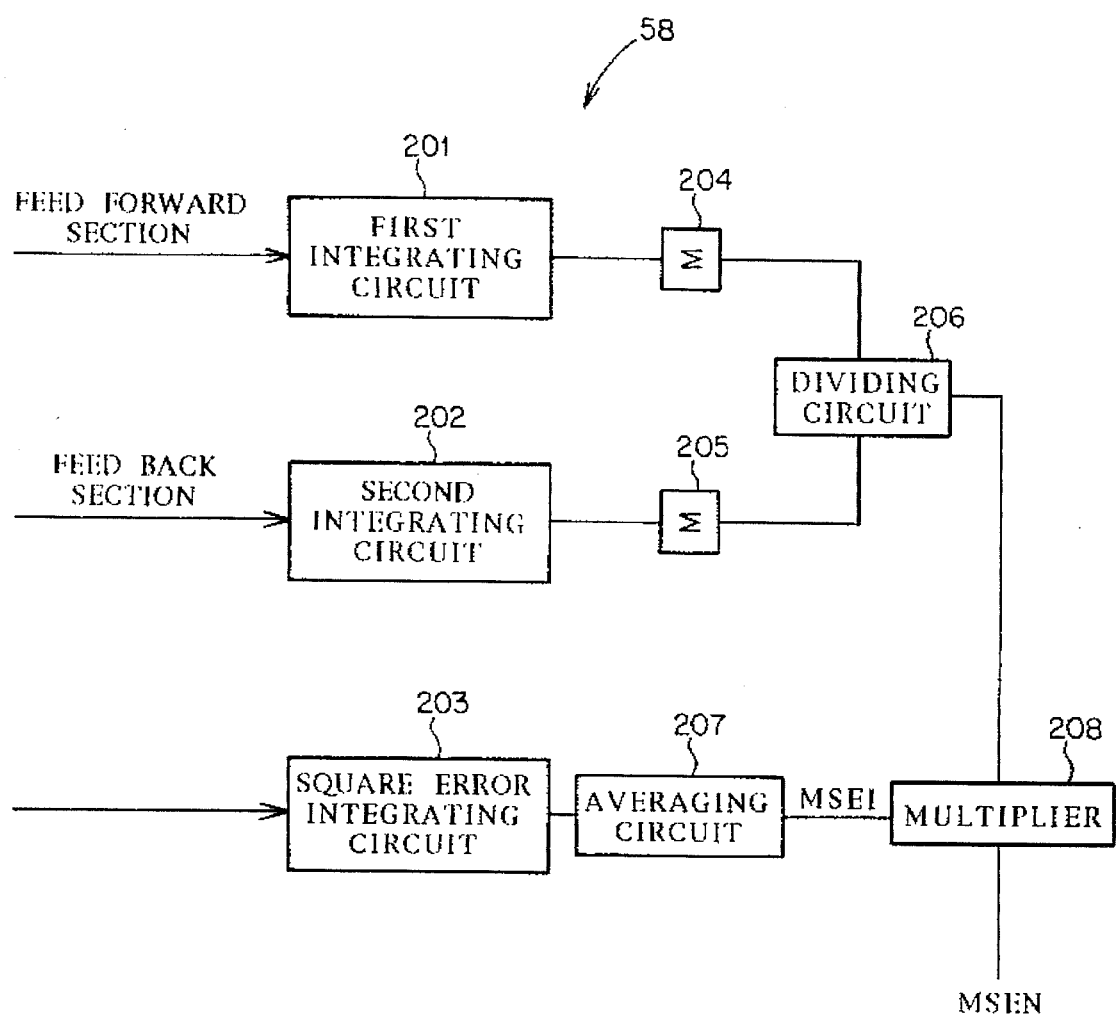

FIG. 5

S501: DECISION FEEDBACK TYPE ADAPTIVE EQUALIZER 56 CAUSES TAP COEFFICIENTS TO CONVERGE USING UW11, DETERMINES ERRORS FOR EACH SYMBOL UPON EQUALIZATION OF UW11 AND OUTPUTS DETERMINED ERRORS TO THRESHOLD-VALUE SETTING CIRCUIT 58 TOGETHER WITH TAP COEFFICIENTS

S502: THRESHOLD-VALUE SETTING CIRCUIT 58 DETERMINES THRESHOLD VALUE SE11 AND OUTPUTS MSE11 TO COMPARATOR 61

S503: EQUALIZED SQUARE ERROR INTEGRATING CIRCUIT 59 CALCULATES SQUARE SUM SE2 OF ERROR VALUES OUTPUTTED UPON EQUALIZATION OF DATA BY LINEAR ADAPTIVE EQUALIZER 57 AND OUTPUTS IT TO EQUALIZED SQUARE ERROR AVERAGING CIRCUIT 60 AND COMPARATOR 65. EQUALIZED SQUARE ERROR AVERAGING CIRCUIT 60 CALCULATES AVERAGE VALUE MSE2 AND OUTPUTS IT TO COMPARATOR 61

S504: MSE2 < MSE11 ?

S506: EQUALIZED SQUARE ERROR AVERAGING CIRCUIT 64 CALCULATES SQUARE SUM SE3 OF ERROR VALUES OUTPUTTED UPON EQUALIZATION OF DATA BY DECISION FEEDBACK TYPE ADAPTIVE EQUALIZER 56 AND OUTPUTS IT TO COMPARATOR 65

S507: SE2 < SE3 ?

S508: IF IT IS DECIDED BY COMPARATOR 65 that SE2 ≥ SE3, THEN EQUALIZED RESULT PRODUCED FROM DECISION FEEDBACK TYPE ADAPTIVE EQUALIZER 56 IS SET AS FINAL EQUALIZED OUTPUT

S505: OUTPUTS PRODUCED FROM LINEAR ADAPTIVE EQUALIZER 57 IS SET AS FINAL EQUALIZED OUTPUT

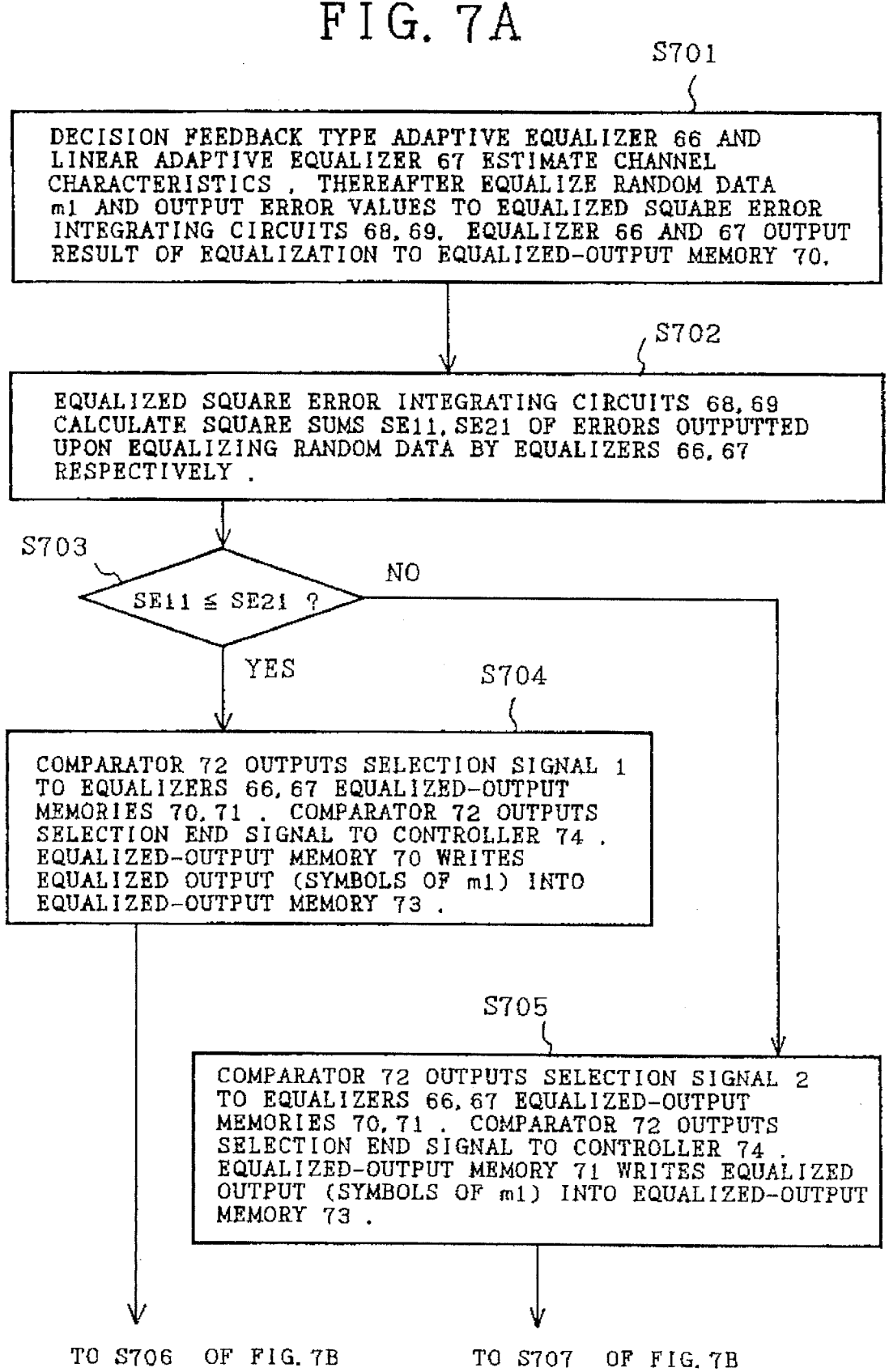

•---• : WITHOUT RETRAINING o——o : WITH RETRAINING

ADAPTIVE EQUALIZER AND ADAPTIVE DIVERSITY EQUALIZER

BACKGROUND OF THE INVENTION

1. Field of the Invention

In high bit rate digital mobile communication, waveform distortion produced due to frequency selective fading causes severe performance degradation in the transmission system. The present invention relates to an adaptive equalizer and an adaptive diversity equalizer both used for the purpose of reducing the performance degradation in the transmission system.

2. Description of the Prior Art

A structure and operation of a conventional adaptive equalizer will first be described below. As one of baseband adaptive equalizers capable of tracking a time-varying channel observed in mobile communication and effecting its initialization in accordance with a short-time training process, there is known such a decision feedback adaptive equalizer as described in, e.g., an article: "Performance of a Decision Feedback Equalizer under Frequency Selective Fading in Land Mobile Communications" by Nakajima and Sampei, published in the Transaction of IEICE, Vol. J72-B-II. No.10, pp 513–523, Oct. 1989. Further, as one constructed for the purpose of improving characteristics in a decision feedback adaptive equalizer, reducing the amount or quantity of calculation and reducing the power to be consumed by a receiver including an equalizer, there is known one such as an automatic equalizer disclosed in Japanese Patent Application Laid-Open Publication No. 3-244220, an equalizer disclosed in Japanese Patent Application Laid-Open Publication No. 3-242015, a digital communication control device disclosed in Japanese Patent Application Laid-Open Publication No. 4-77019.

FIG. 15 is a block diagram showing a decision feedback adaptive equalizer described in the above references. In FIG. 15, reference numeral 1 indicates a transversal filter of a feedforward section (FF section) in which the interval between taps is a predetermined delay time interval Tp second and the number of the taps is an L, reference numeral 2 indicates a transversal filter of a feedback section (FB section) which the interval between taps is a given delay time interval T second and the number of taps is (M - L), reference numeral 3 indicates an adder for adding data outputted from the FF section 1 and data outputted from the FB section 2 together, reference numeral 4 indicates a decision circuit for identifying and performing hard decision on an output signal series of the adder 3 for each T seconds, reference numeral 5 indicates an adder for determining the difference between an output of the adder 3 and a signal series outputted from the decision circuit 4 or a known signal series, reference numeral 6 indicates a tap coefficient update circuit for setting tap coefficients for the FF section 1 and the FB section 2 for each T seconds, reference numeral 7 indicates a switching circuit for switching a signal series inputted to the FB section 2 to the output signal series or the known signal series of the decision circuit 4, reference numeral 8 indicates a received-signal input terminal of the decision feedback adaptive equalizer, reference numeral 9 denotes a reference-signal series input terminal, and reference numeral 10 denotes an output signal terminal of the decision feedback adaptive equalizer.

FIG. 16 is a view for describing one example of a burst format of a signal employed in mobile communication or the like. Designated at numeral 11 is a unique word (hereinafter called a "UW") used to effect the training of the adaptive equalizer and provide frame synchronization. Reference numeral 12 indicates random data.

FIG. 17 is a block diagram showing the conventional equalizer disclosed in Japanese Patent Application Laid-Open Publication No. 3-244220. In the figure, reference numeral 13 indicates a symbol spaced automatic equalizer, reference numeral 14 indicates a fractionally spaced automatic equalizer, reference numeral 15 indicates an output selector switch, and reference numeral 16 indicates a switch controller for controlling the output selector switch 15.

FIG. 18 is a block diagram showing the conventional equalizer disclosed in Japanese Patent Application Laid-Open Publication No. 3-242015. In the drawing, reference numeral 17 indicates a received-signal memory for storing reception baseband signals of I and Q channels therein. Reference numeral 18 indicates an equalizing processor for reading a reception signal corresponding to UW 11 or random data 12 from the received-signal memory 17 and effecting an equalizing process on it. Reference numeral 19 denotes an equalized-output memory for storing an equalized output data corresponding to a predetermined amount therein and outputting it as received data therefrom. Reference numeral 20 indicates a controller for controlling the received-signal memory 17, the equalizing processor 18 and the equalized-output memory 19.

FIG. 20 is a block diagram showing the digital communication control device including an equalizer, which has been disclosed in Japanese Patent Application Laid-Open Publication No. 4-77019. In the drawing, reference numeral 21 indicates an input signal distributor for dividing an SI corresponding to a reception signal into a signal S1 and a signal S2, reference numeral 22 indicates a delay circuit for delaying the first signal S1 outputted from the input signal distributor 21 by a time interval longer than a period corresponding to the UW11, reference numeral 23 indicates an adaptive automatic equalizer, reference numeral 24 indicates a changeover switch for providing connection and disconnection between the output of the delay circuit 22 and the adaptive automatic equalizer 23, reference numeral 25 indicates a differential detector, a delay circuit for enabling data excluding UW, of demodulated data outputted from the differential detector 25 to be delayed by a time interval required to effect an equalizing process on the data by the adaptive automatic equalizer 23, reference numeral 27 indicates a bit error rate measuring device for comparing UW demodulated by the differential detector 25 with the known UW and calculating or counting bit error rates which exist during a UW period from the result of comparison, reference numeral 28 indicates a first demodulator made up of the delay circuit 22, the changeover switch 24 and the adaptive automatic equalizer 23, reference numeral 29 indicates a second demodulator made up of the differential detector 25 and the delay circuit 26, and reference numeral 30 indicates a changeover switch for selecting either one of outputs produced from the first and second demodulators 28 and 29 based on a control signal outputted from the code error rate measuring device 27.

Operation of the conventional equalizer will next be described.

The decision feedback adaptive equalizer shown in FIG. 15 estimates channel characteristics with respect to a received signal converted into a baseband signal by a demodulator, using the UW11 shown in FIG. 16, which corresponds to the head of each burst to thereby converge tap coefficients (training mode). At this time, each of the input signal series in the FB section 2 and the input signal series in the adder 5 is a reference signal series defined based on the known signal series of the UW11 as data free of errors in decision.

Next, the decision feedback adaptive equalizer effects an equalizing process on random data 12 (tracking mode). At this time, the decision circuit 4 identifies and performs a hard decision on the output signal series for each T seconds. Each of the input signal series in the FB section 2 and the input signal series in the adder 5 is brought to the output signal series of the decision circuit 4.

The tap coefficient update circuit 6 updates tap coefficients for the FF and FB sections 1 and 2 for each symbol in accordance with tap-coefficient update algorithms such as Kalman filter algorithms (RLS algorithms) using the input signal series of the decision feedback adaptive equalizer and the output data sequence of the adder 5 defined based on the reference data sequence that are determined by the known data sequence or the output data sequence of the decision circuit 4.

The tap-coefficient update algorithms will now be described in brief by the following example of the Kalman filter algorithms (RLS algorithms).

A signal vector inputted to an equalizer at a time t=nT (where n=0, 1, 2, ... ) is represented as $X_M(n)$, a tap coefficient is represented as $C_M(n)$, an equalizer output is represented as I(n), a desired output is represented as d(n) and an error signal is represented as e(n).

Now, $X_M(n)$, CM(n), I(n) and d(n) are complex numbers indicative of in-phase and quadrature channels. Assuming that the number of taps in the FF section 1 of the decision feedback adaptive equalizer is represented as L and the total number of taps is represented as M, the relationships between these are given by the following equations:

$$X_M(n)=[y_1^*(n), y_2^*(n), \ldots, y_L^*(n), d_1^*(n), d_2^*(n), \ldots, d_{M-L}^*(n)]^* \quad (1)$$

$$C_M(n)=[C_1^*(n), C_2^*(n), \ldots, C_M^*(n)]^* \quad (2)$$

$$I(n)=C_M^*(n-1)X_M(n) \quad (3)$$

$$e(n/n-1)=d(n)-I(n)=d(n)-C_M^*(n-1)X_M(n) \quad (4)$$

where * represents a complex conjugate transposed matrix (or vector), y(n) represents an input signal to be received by the FF section, and d(n) represents a signal inputted to the FB section. Under the training mode, d(n) is an output signal series obtained by performing a hard decision on the result of the equation 3 by the decision circuit 4, while under the tracking mode d(n) is the known data sequence.

Further, the error signal e(n) represents the output of the adder 5. The tap coefficient $C_M(n)$ that minimizes a cost function $\epsilon$ given by the following equation, is a desired value:

$$\epsilon = \sum_{i=1}^{n} \lambda^{n-1} e^*(i/n)e(i/n) \quad (5)$$

where $\lambda$ represents a forgetting factor ($0<k\leq 1$). $C_M(n)$, which minimizes the equation 5, is as follows:

$$C_M(n)=R^{-1}(n)D(n) \quad (6)$$

$$P^{-1}(n)=R(n)=E\lambda^{n-i}X_M(i)X_M^*(i)+\delta\lambda^n I \quad (7)$$

where $\delta$ represents a positive constant.

$$D(n) = \sum_{i=1}^{n} \lambda^{n-1} X_M(i) d^*(i) \quad (8)$$

The algorithm for recursively obtaining $C_M(n)$ at time t=Nt from $C_M(n-1)$ and P(n-1) at time t=(n-1)T is as follows:

$$K(n)=P(n-1)X_M(n)/[\lambda+X_M^*(n)P(n-1)X_M(n)] \quad (9)$$

$$P(n)=P(n-1)-K(n)X_M^*(n)P(n-1) \quad (10)$$

$$C_M(n)=C_M(n-1)+K(n)e^*(n/n-1) \quad (11)$$

$$P(0)=\delta^{-1}I, C_M(0)=0 \quad (12)$$

where K(n) represents a Kalman gain, P(n) represents a predicted-error covariance matrix of tap coefficients, and I represents a unit matrix.

Incidentally, the tap-coefficient update algorithms have been described in detail in the reference: "Introduction to Adaptive Filter" written by S. Hekin and translated by K. Takebe, Chapter 5, Gendai Kogakusha (1987) or the reference: "DIGITAL COMMUNICATION" by J. G. PROAKIS, Chapters 6, 8, McGRAW-HILL (1983).

Operation of the equalizer shown in FIG. 17 will now be described. Now, the symbol spaced automatic equalizer 13 is constructed in such a manner that the interval between the taps in the FF section employed in the decision feedback adaptive equalizer shown in FIG. 15 is set to one symbol, i.e., T seconds. The fractionally spaced automatic equalizer 14 is also constructed in such a way that the interval between the taps in the FF section employed in the decision feedback adaptive equalizer shown in FIG. 15 is set to (M/N) symbols, i.e., (M/N)T seconds (where M and N: integer and M<N). Both the symbol spaced automatic equalizer 13 and the fractionally spaced automatic equalizer 14 may be used as linear equalizers each free of a decision feedback unit.

A reception signal is first supplied to each of the symbol spaced automatic equalizer 13 and the fractionally spaced automatic equalizer 14. The outputs of the symbol spaced automatic equalizer 13 and the fractionally spaced automatic equalizer 14 are selected by and outputted from the output selector switch 15. When a multipath delay time interval is long as in the case where a receiver is located far away from a transmitter, for example, that is when the difference in time between a direct wave and a delayed wave is large, the switch controller 16 sets up the output selector switch 15 so that it selects the output of the symbol spaced automatic equalizer 13. On the other hand, when the multipath delay time interval is short like the case where the receiver is located nearby the transmitter, for example, the switch controller 16 controls the output selector switch 15 so that it selects the output of the fractionally spaced automatic equalizer 14. As specific methods of effecting changeover control on the output selector switch 15, there are known those disclosed in Japanese Patent Application Laid-Open Publication No. 3-244220, such as a method of checking the amplitude of eyepatterns of the output of the adder 3 in both the symbol spaced automatic equalizer 23 and fractionally spaced automatic equalizer 14 and selecting the equalizer whose amplitude of the eyepatterns is larger than the other, a method of calculating the variance of amplitude of eyepatterns of both equalizers and selecting the equalizer whose variance of amplitude of the eyepatterns is smaller than the other, a method of providing a means for effecting a forward error correction on the outputs of both equalizers, comparing the degrees of correction effected on their outputs and effecting changeover control on the output selector switch 15 based on the result of comparison, etc.

Operation of the equalizer shown in FIG. 18 will now be described with reference to FIG. 19. The equalizing processor 18 effects an equalizing process on the random data 12 based on tap coefficients set in accordance with a process effected on the UW11 but temporarily stops the equalizing process in the course of one burst signal. The controller 20 assumes that a data sequence subjected to the equalizing process and stored in the equalized-output memory 19 is correct, regards the data sequence as a known data sequence used for re-training and causes the equalizing processor to effect retraining. That is, a reading pointer of the received-signal memory 17 is returned forward by a length of the training sequence. The equalizing processor 18 effects a re-training process using a part of the random data read from the received-signal memory 17, based on the known data sequence read from the equalized-output memory 19. The equalizing processor 18 is reset at the start of the re-training period. However, the already-set tap coefficients are held without returning to an initial condition. As a result, the tap coefficients set by the re-training can be converged at a high speed. The timing for temporarily stopping the equalizing process in the course of the one burst signal is decided based on the relationship between the length of the UW, a required signal processing speed and a tracking property. In the same manner as described above, the re-training process is repeated up to the end of the one burst signal. Thus, although the equalizer has been reset to effect the training process on only the beginning of the one burst signal in the conventional apparatus, the tracking property can be improved by periodically resetting the equalizer even during the stage of effecting the equalizing process on the random data and resetting the tap coefficients.

Operation of the digital communication control device shown in FIG. 20 will now be described. A baseband input signal SI has already been converted to the baseband digital data and are divided into two signals each having the same content by the input signal distributor 21. Two divided signals are represented as S1 and S2 respectively. The first signal S1 is inputted to the delay circuit 22 and the second signal S2 is inputted to the differential detector 25. The differential detector 25 effects the following predetermined operation on the signal to be demodulated using a differential detection scheme regarding the signal detected one symbol previous as a reference phase signal. That is, when the difference in phase between the signal and the previous signal is $\pi/2$ or less, "0" is outputted. On the other hand, when the phase difference is $\pi/2$ or more, "1" is outputted. Thereafter, received signals each corresponding to the UW11 located at the top of each burst are successively demodulated.

On the other hand, only UW11 of signals outputted from the differential detector 25 is inputted to the bit error rate measuring device 27, so that a bit error rate is measured. Further, data excluding a UW signal of the signals outputted from the differential detector 25 is inputted to the delay circuit 26.

The first signal S1 inputted to the delay circuit 22 is delayed by a time interval required to demodulate the UW11 of the corresponding signal by the differential detector 25 of the second demodulator 29 and complete the measurement of the bit error rate, and is thereafter inputted to the adaptive automatic equalizer 23 through the changeover switch 24 controlled by a flap decided depending on a desired threshold value by the bit error rate measuring device 27. Whenever the flag is reset, the signal S1 is not inputted to the adaptive automatic equalizer 23 and the adaptive automatic equalizer 23 is not active.

Further, a signal excluding the UW, which has been inputted to the delay circuit 26 from the differential detector 25 is delayed by a time interval required to cause the signal outputted from the delay circuit 22 to pass through the changeover switch 24 so that the signal is inputted to the adaptive automatic equalizer 23 and to complete an equalizing process on the signal.

Thus, the signals obtained by demodulating the signals having the same contents appear at an output terminal of the first demodulator 28 and an output terminal of the second demodulator 29 at the same time. The demodulated results are selectively outputted via the switch 30 controlled by the flag.

As described above, the state of a multipath can be taken and the demodulator having the adaptive automatic equalizer can be selected for each burst unit by monitoring the training signal demodulated by the demodulator having no adaptive automatic equalizer. As a result, communications can be made without degradation of the reliability (speech quality or the like) of information on the receiver. Further, the operation of the automatic equalizer whose consumption power is very high can be controlled. As a result, the power consumption in each demodulator can be greatly reduced. Further, the limited capacity of a power supply, which is employed in a telephone set mounted on and carried in a mobile, can be effectively used.

A conventional adaptive diversity equalizer will next be described. As one of adaptive diversity equalizers wherein equalizers and diversity reception have been combined, there is known one which has been described in the reference: "BER Performance of Selection Diversity with Adaptive Equalizers for Mobile Radio" by Higashi and Suzuki, 1990 Autumn Natl. Conv. Rec., IEICE, B-279, for example.

FIG. 21 is a block diagram showing the adaptive diversity equalizer disclosed in the above reference. In the drawing, reference numerals 101,102 respectively indicate antennas, reference numeral 103 indicates a detector circuit a for detecting a receive signal outputted from the antenna 101 and converting it into a baseband signal, reference numeral 104 indicates a detector circuit for detecting a receive signal outputted from the antenna 102 and converting it into a baseband signal, reference numeral 105 indicates a decision feedback adaptive equalizer for equalizing the output of the detector circuit 103, reference numeral 106 indicates a decision feedback adaptive equalizer for equalizing the output of the detector circuit 104, reference numeral 107 indicates a comparator for comparing equalized errors produced from the decision feedback adaptive equalizers 105, 106, and reference numeral 108 indicates a selecting circuit for selecting either the output of the decision feedback adaptive equalizers 105 and 106 in response to a signal outputted from the comparator 107 and setting the selected output as a final equalized output.

Operation of the conventional adaptive diversity equalizer will next be described.

In the adaptive diversity equalizer shown in FIG. 21, the input signals outputted from the antennas 101 and 102 are respectively converted into the baseband signals by the detector circuit 103 and 104. The output signal of the detector circuit 103 is inputted to the decision feedback adaptive equalizer 105 and the output signal of the detector circuit 104 is inputted to the decision feedback adaptive equalizer 106. Each of the decision feedback adaptive equalizer 105 and the decision feedback adaptive equalizer 106 estimates characteristics of a channel using the UW11 which is located in each burst head shown in FIG. 16, as described in the paragraphs of the operation of the equalizer shown in FIG. 15 and converge tap coefficients. Next, each of the decision feedback adaptive equalizer 105 and the decision feedback adaptive equalizer 106 equalizes random data 12 and calculates the mean value of the equalized errors. Each of the equalizers outputs the result of calculation to the comparator 107. The comparator 107 compares the mean value of the equalized errors produced from the decision feedback adaptive equalizer 105 and the mean of the equalized errors produced from the decision feedback adaptive equalizer 106 and outputs a signal to the selecting circuit 108 indicating that one of the two mean values, which is smaller than the other, is to be selected. In response to the output of the comparator 107, the selecting circuit 108 outputs either the output of the decision feedback adaptive equalizer 105 or the output of the decision feedback adaptive equalizer 106 as a final equalized output.

SUMMARY OF THE INVENTION

Since the conventional adaptive equalizer is constructed in the above-described manner, the following problems have been pointed out.

When a normalized delay time interval of a delay wave is shorter than one symbol under frequency selective fading, the intersymbol interference by way of the delay wave takes place over several symbols. But for the number of taps in the FB section is small. Therefore, a problem arises that a bit error rate characteristic obtained when the above normalized delay time is shorter than the one symbol, shows severe degradation as compared with a bit error rate characteristic obtained when the normalized delay time interval of the delay wave is of one symbol. If the number of the taps in the FB section increases to improve this drawback, then the number of taps in the equalizer increases. Therefore, a problem arises in that the computational complexity increases and a tracking property to time variant channel further becomes poor, thus resulting in degradation of the bit error rate performance.

FIG. 22 shows one example of a bit error rate characteristic, with respect to a normalized delay time interval, of the conventional equalizer shown in FIG. 17. When the normalized delay time interval of the delay wave is shorter than one symbol, bit error rate characteristics of the symbol spaced automatic equalizer and the fractionally spaced automatic equalizer are greatly degraded as shown in FIG. 22 as compared with a bit error rate characteristic obtained when the normalized delay time interval of the delay wave is of one symbol.

FIG. 23 shows one example of a bit error rate characteristic, with respect to a normalized delay time interval of a delay wave, of the conventional digital communication control device. It is understood from the drawing that bit error rate performance of the digital communication control device when a normalized delay time interval of a delay wave is shorter than one symbol is improved by selecting the outputs of the differential detector and the equalizer as described above. However, a problem arises that when the normalized delay time interval of the delay wave is longer than 0.2 symbol on the contrary, bit error rate performance of the entire device is degraded as compared with that of the equalizer itself. Further, the conventional digital communication control device is accompanied by a problem that since the error rate of the UW portion produced from the differential detector is measured to make a decision as to whether the equalizer should be operated, the error rate of the UW portion produced from the differential detector is degraded due to noise and the equalizer is always activated even in the case of absence of the delay wave when Eb/No (the energy of input signal per bit-to-noise power spectrum density ratio) is small.

Further, a sufficient tracking property cannot be often obtained in high-speed digital mobile communication made at several tens or more of kbps even if the Kalman filter, previously described is used as adaptation algorithm. In order to solve this inconvenience, the equalizer shown in FIG. 18, which has been described in the conventional example, has been devised to improve the tracking property of rapid time-varying channel, resulting in improvement of bit error rate performance. However, a problem arises that when Eb/No (the energy of input signal per bit-to-noise power spectrum density ratio) is small like one example of a bit error rate performance of an equalizer shown in FIG. 24, a bit error rate is degraded.

The present invention was made to solve such problems. It is therefore an object of the present invention to provide an adaptive equalizer wherein the computational complexity is not greatly increased, even when a normalized delay time interval of a delay wave is shorter than one symbol and the delay wave does not exist, a bit error rate characteristic is not degraded as compared with a bit error rate characteristic obtained when the normalized delay time interval is of the one symbol, and a characteristic similar or superior to that of a conventional adaptive equalizer can be obtained even when Eb/No is small. It is also another object of the present invention to provide an adaptive equalizer wherein the amount of computation is reduced as compared with the conventional adaptive equalizer when a delay wave does not exist and a normalized delay time interval of the delay wave is short.

Since the conventional adaptive diversity equalizer is constructed as described above, it has the following problems in a manner similar to the conventional adaptive equalizer.

When a normalized delay time interval of a delay wave is shorter than one symbol under frequency selective fading, the intersymbol interference by way of the delay wave takes place over several symbols but for the number of taps in the FB section is small, the bit error rate performance obtained when the above normalized delay time is shorter than the one symbol, shows severe degradation as compared with a bit error rate characteristic obtained when the normalized delay time interval of the delay wave is of one symbol. If the number of the taps in the FB section increases to improve this drawback, then the number of taps in the equalizer increases. Therefore, the problem arises that the computational complexity increases and a tracking property to time variant channel further becomes poor, thus resulting in degradation of bit error rate performance.

The present invention was made to solve the above problems. It is therefore a further object of the present invention to provide an adaptive diversity equalizer wherein the computational complexity is not greatly increased, even when a normalized delay time interval of a delay wave is shorter than one symbol and the delay wave does not exist, a bit error rate characteristic is not degraded as compared with a bit error rate characteristic obtained when the normalized delay time interval is of the one symbol, and a characteristic similar or superior to that of a conventional adaptive diversity equalizer can be obtained even when Eb/No is small. It is also a still further object of the present invention to provide a adaptive diversity equalizer wherein the computational complexity is reduced as compared with the conventional adaptive diversity equalizer when a delay wave does not exist and a normalized delay time interval of the delay wave is short.

In order to achieve the above objects, an adaptive equalizer of the first aspect of the invention comprises: a decision feedback adaptive equalizer comprised of two linear transversal filters, that is, a feedforward filter and a feedback filter, a decision part and a tap-coefficient-update part that updates the tap-coefficient of the two linear transversal filters in accordance with tap-coefficient update algorithms; a linear adaptive equalizer comprised of a linear transversal filter, a decision part and a tap-coefficient-update part that updates the tap-coefficient of the linear transversal filter in accordance with tap-coefficient update algorithms; a comparator for comparing a value determined based on an estimation error produced from the decision feedback adaptive equalizer with a value determined based on an estimation error produced from the linear adaptive equalizer; and means for selecting either one of an equalized output produced from the decision feedback adaptive equalizer and an equalized output produced from the linear adaptive equalizer, based on the result of comparison by the comparator and setting the selected equalized output as a final equalized output, whereby differences in performance of the decision feedback adaptive equalizer and the linear adaptive equalizer are compared to thereby set an equalized output of one adaptive equalizer that shows better performance than that of the other as a final equalized output from the result of comparison.

In order to achieve the above objects, an adaptive equalizer of the second aspect of the invention comprises: a decision feedback adaptive equalizer comprised of two linear transversal filters, that is, a feedforward filter and a feedback filter, a decision part and a tap-coefficient-update part that updates the tap-coefficient of the two linear transversal filters in accordance with tap-coefficient update algorithms, and deactivated in response to an external control signal; a linear adaptive equalizer comprised of a linear transversal filter, a decision part and a tap-coefficient-update part that updates the tap-coefficient of the linear transversal filter in accordance with tap-coefficient update algorithms, and deactivated in response to an external control signal; a comparator for comparing a value determined based on an estimation error produced from the decision feedback adaptive equalizer with a value determined based on an estimation error produced from the linear adaptive equalizer; and means for selecting either one of an equalized output produced from the decision feedback adaptive equalizer and an equalized output produced from the linear adaptive equalizer, based on the result of comparison by the comparator and setting the selected equalized output as a final equalized output and for deactivating either the decision feedback adaptive equalizer or the linear adaptive equalizer, whereby differences in performance of the decision feedback adaptive equalizer and the linear adaptive equalizer are compared to thereby set an equalized output of one adaptive equalizer that shows better performance than that of the other as a final equalized output from the result of comparison and the adaptive equalizer that shows performance degradation compared with the other is deactivated.

In order to achieve the above objects, an adaptive equalizer of the third aspect of the invention comprises: a decision feedback adaptive equalizer comprised of two linear transversal filters, that is, a feedforward filter and a feedback filter, a decision part and a tap-coefficient-update part that updates the tap-coefficient of the two linear transversal filters in accordance with tap-coefficient update algorithms, and deactivated and re-activated in response to an external control signal; a linear adaptive equalizer comprised of a linear transversal filter, a decision part and a tap-coefficient-update part that updates the tap-coefficient of the linear transversal filter in accordance with tap-coefficient update algorithms; a threshold-value setting circuit for determining a threshold value from an estimation error outputted from the decision feedback adaptive equalizer upon equalizing a receive signal corresponding to a known data sequence; a first comparator for comparing a value determined based on an estimation error outputted from the linear adaptive equalizer upon equalizing a receive signal corresponding to a random data sequence with the threshold value; means for setting an equalized output produced from the linear adaptive equalizer as a final equalized output and stopping the equalization of the random data sequence by the decision feedback adaptive equalizer when at least the value determined by the linear adaptive equalizer is smaller than the threshold value; means for effecting the equalization of a receive signal corresponding to a data sequence other than the known data sequence by the decision feedback adaptive equalizer when at least the value determined by the linear adaptive equalizer is larger than the threshold value; a second comparator for comparing a value determined based on an estimation error produced from the decision feedback adaptive equalizer upon equalizing the receive signal corresponding to the data sequence other than the known data sequence with the value determined by the linear adaptive equalizer when at least the value determined by the linear adaptive equalizer is larger than the threshold value; and means for selecting either one of an equalized output produced from the decision feedback adaptive equalizer and an equalized output produced from the linear adaptive equalizer based on the result of comparison by the second comparator when at least the value determined by the linear adaptive equalizer is larger than the threshold value and setting the selected equalized output as a final equalized output, whereby when it is unnecessary for the decision feedback adaptive equalizer to equalize random data, the decision feedback adaptive equalizer is deactivated and even when the equalization of the random data by the decision feedback adaptive equalizer is carried out, differences in performance of the decision feedback adaptive equalizer and the linear adaptive equalizer are compared to thereby set the output of one of both adaptive equalizers, which shows better performance than that of the other, a final equalized output from the result of comparison.

In order to achieve the above objects, an adaptive equalizer of the fourth aspect of the invention comprises: a decision feedback adaptive equalizer comprised of two linear transversal filters, that is, a feedforward filter and a feedback filter, a decision part and a tap-coefficient-update part that updates the tap-coefficient of the linear transversal filter in accordance with tap-coefficient update algorithms, and deactivated and re-activated in response to an external control signal; a linear adaptive equalizer comprised of a linear transversal filter, a decision part and a tap-coefficient-update part that updates the tap-coefficient of the two linear transversal filters in accordance with tap-coefficient update algorithms, and deactivated and re-activated in response to an external control signal; means for temporarily stopping an equalizing process of the decision feedback adaptive equalizer and of linear adaptive equalizer and effecting an equalizing process again after tap coefficients of both equalizers have been reset and both equalizers have been retrained; a comparator for comparing a value determined based on an estimation error of the decision feedback adaptive equalizer and a value determined based on an estimation error of the linear adaptive equalizer, where the estimation errors are obtained from the equalizing process carried until it is temporarily stopped; means for selecting either one of an equalized output produced from the decision feedback adaptive equalizer and an equalized output produced from the linear adaptive equalizer based on the result of comparison by the comparator and setting the selected equalized output as a final equalized output; and means for setting either one of the equalized output produced from the decision feedback adaptive equalizer and the equalized output produced from the linear adaptive equalizer as a reference signal, based on the result of comparison by the comparator, where the reference signal is used to retain the decision feedback adaptive equalizer and the linear adaptive equalizer, whereby differences in performance of the decision feedback adaptive equalizer and the linear adaptive equalizer are compared for every desired number of data symbols to thereby set the output of one of both adaptive equalizers, which shows better performance than that of the other, as a final equalized output with respect to the data symbols from the result of comparison, and both adaptive equalizers are retrained using the result of the equalized output produced from the one which shows better performance than that of the other.

In order to achieve the above object, an adaptive equalizer of the fifth aspect of the invention comprises: a decision feedback adaptive equalizer comprised of two linear transversal filters, that is a feedforward filter and a feedback filter, a decision part and a tap-coefficient-update part that updates the tap-coefficient of the two linear transversal filters in accordance with tap-coefficient update algorithms; a linear adaptive equalizer comprised of a linear transversal filter, a decision part and a tap-coefficient-update part that updates the tap-coefficient of the linear transversal filter in accordance with tap-coefficient update algorithms; a delay measuring circuit for measuring a multipath propagation characteristic of a channel; and means for activating either the decision feedback adaptive equalizer or the linear adaptive equalizer based on the result of measurement by the delay measuring circuit to thereby produce an equalized output, hereby the output of one adaptive equalizer expected to show better performance than that of the other with respect to the multipath propagation characteristic measured by the delay measuring circuit is set as an equalized output.

In order to achieve the above objects, an adaptive diversity equalizer of the sixth aspect of the invention comprises: a plurality of antennas; a plurality of detector circuits for respectively detecting a plurality of waves to be received, which have been received by the plurality of antennas; a plurality of decision feedback adaptive equalizers each supplied with each detected signal as an input and each comprising two linear transversal filters, that is, a feedforward filter and a feedback filter, a decision part and a tap-coefficient-update part that updates the tap-coefficient of the two linear transversal filters in accordance with tap-coefficient update algorithms; a plurality of linear adaptive equalizers each supplied with each detected signal as the input and each comprising a linear transversal filter, a decision part and a tap-coefficient-update part that updates the tap-coefficient of the linear transversal filter in accordance with tap-coefficient update algorithms; at least one comparator for comparing values determined based on estimation errors produced from the respective adaptive equalizers; and means for selecting one of the equalized outputs produced from the plurality of decision feedback adaptive equalizers or one of the equalized outputs produced from the plurality of linear adaptive equalizers based on the result of comparison by the comparator and setting the selected one as a final equalized output, whereby performance of the plurality of decision feedback adaptive equalizers and those of the plurality of linear adaptive equalizers are respectively compared to thereby set the output of one of the adaptive equalizers, which is best in equalization characteristic, as a final equalized output from the result of comparison.

In order to achieve the above objects, an adaptive diversity equalizer of the seventh aspect of the invention comprises: a plurality of antennas; a plurality of detector circuits for respectively detecting a plurality of waves to be received, which have been received by the plurality of antennas; a plurality of decision feedback adaptive equalizers each supplied with each detected signal as an input, each comprised of two linear transversal filters, that is, a feedforward filter and a feedback filter, a decision part and a tap-coefficient-update part that updates the tap-coefficient of the two linear transversal filters in accordance with tap-coefficient update algorithms, and each deactivated in response to an external control signal; a plurality of linear adaptive equalizers each supplied with each detected signal as the input, each comprised of a linear transversal filter, a decision part and a tap-coefficient-update part that updates the tap-coefficient of the linear transversal filter in accordance with tap-coefficient update algorithms, and each deactivated in response to an external control signal; at least one comparator for comparing values determined based on estimation errors produced from the respective adaptive equalizers; and means for selecting one of the equalized outputs produced from the plurality of decision feedback adaptive equalizers or one of the equalized outputs produced from the plurality of linear adaptive equalizers based on the result of comparison by the comparator, setting the selected one as a final equalized output and deactivating either the non-selected decision feedback adaptive equalizers or the non-selected linear adaptive equalizers, whereby performance of the plurality of decision feedback adaptive equalizers and those of the plurality of linear adaptive equalizers are respectively compared to thereby set the output of one of the adaptive equalizers, which is best in equalization characteristic, as a final equalized output from the result of comparison, and the remaining adaptive equalizers are deactivated.

In order to achieve the above objects, an adaptive diversity equalizer of the eighth aspect of the invention comprises: a plurality of antennas; a plurality of detector circuits for respectively detecting a plurality of waves to be received, which have been received by the plurality of antennas; a plurality of decision feedback adaptive equalizers each supplied with each detected signal as an input, each comprised of two linear transversal filters, that is, a feedforward filter and a feedback filter, a decision part and a tap-coefficient-update part that updates the tap-coefficient of the two linear transversal filters in accordance with tap-coefficient update algorithms, and each deactivated and re-activated in response to an external control signal; a plurality of linear adaptive equalizers each supplied with each detected signal as the input, each comprised of a linear transversal filter, a decision part and a tap-coefficient-update part that updates the tap-coefficient of the linear transversal filter in accordance with tap-coefficient update algorithms; at least one threshold-value setting circuit for determining threshold values based on estimation errors outputted upon equalizing receive signals corresponding to a known data sequence by the plurality of decision feedback adaptive equalizers; a first comparator for comparing values determined based on estimation errors outputted upon equalizing receive signals corresponding to a random data sequence by the plurality of linear adaptive equalizers with the threshold values respectively; means for selecting one of equalized outputs produced from the plurality of linear adaptive equalizers and setting the selected one as a final equalized output when at least one of the values determined using the plurality of linear adaptive equalizers is smaller than the threshold values and for stopping the equalization of the random data sequence by the plurality of decision feedback adaptive equalizers; means for effecting the equalization of a data sequence other than a known data sequence related to a plurality of receive signals by the plurality of decision feedback adaptive equalizers when all the values determined by the linear adaptive equalizers is larger than the threshold value which is the smallest set by threshold-value setting circuit; a second comparator for comparing values determined based on estimation errors produced from the plurality of decision feedback adaptive equalizers upon equalizing receive signals corresponding to the data sequence other than the known data sequence with the values determined by the plurality of linear adaptive equalizers respectively when all the values determined by the linear adaptive equalizers is larger than the threshold value which is the smallest set by threshold-value setting circuit; and means for selecting either one of equalized outputs produced from the plurality of decision feedback adaptive equalizers and equalized outputs produced from the plurality of linear adaptive equalizers based on the result of comparison by the second comparator when all the values determined by the linear adaptive equalizers is larger than the threshold value which is the smallest set by threshold-value setting circuit and setting the selected equalized output as a final equalized output, whereby when it is unnecessary for the decision feedback adaptive equalizers to equalize random data, the decision feedback adaptive equalizers are deactivated and even when the equalization of the random data by the decision feedback adaptive equalizers is carried out, performance of the decision feedback adaptive equalizers and those of the linear adaptive equalizers are respectively compared to thereby set the output of one of these adaptive equalizers, which is best in equalization characteristic, as a final equalized output from the result of comparison.

In order to achieve the above objects, an adaptive diversity equalizer of the ninth aspect of the invention comprises: a plurality of antennas; a plurality of detector circuits for respectively detecting a plurality of waves to be received, which have been received by the plurality of antennas; a plurality of decision feedback adaptive equalizers each supplied with each detected signal as an input, each comprised of two linear transversal filters, that is, a feedforward filter and a feedback filter, a decision part and a tap-coefficient-update part that updates the tap-coefficient of the two linear transversal filters in accordance with tap-coefficient update algorithms, and each deactivated and re-activated in response to an external control signal; a plurality of linear adaptive equalizers each supplied with each detected signal as the input, each comprised of a linear transversal filter, a decision part and a tap-coefficient-update part that updates the tap-coefficient of the linear transversal filter in accordance with tap-coefficient update algorithms, and each deactivated and re-activated in response to an external control signal; means for temporarily stopping equalizing processes of the plurality of decision feedback adaptive equalizers of plurality of linear adaptive equalizers and effecting equalizing processes again after tap coefficients of all the equalizers have been reset and all the equalizers have been retrained; at least one comparator for comparing values determined based on estimation errors produced from the plurality of decision feedback adaptive equalizers and values determined based on estimation errors produced from the plurality of linear adaptive equalizers, where the respective estimation errors are obtained from the equalizing process carried until it is temporarily stopped; means for selecting one of equalized outputs produced from the plurality of decision feedback adaptive equalizers or one of equalized outputs produced from the plurality of linear adaptive equalizers based on the result of comparison by the comparator and setting the selected equalized output as a final equalized output; and means for setting the equalized output selected from either the equalized outputs of the decision feedback adaptive equalizers or the equalized outputs of the linear adaptive equalizers based on the result of comparison as a reference signal which will be used to retain, whereby differences in performance of the plurality of decision feedback adaptive equalizers and the plurality of linear adaptive equalizers are compared every desired number of data symbols to thereby set the output of one of these adaptive equalizers, which is best in equalization characteristic to the others as a final equalized output with respect to the data symbols from the result of comparison, and all the adaptive equalizers are retrained using the result of the equalized output produced from the one thereof best in equalization characteristic to the others.

In order to achieve the above objects, an adaptive diversity equalizer of the tenth aspect of the invention comprises: a plurality of antennas; a plurality of detector circuits for respectively detecting a plurality of waves to be received, which have been received by the plurality of antennas; a plurality of decision feedback adaptive equalizers each supplied with each detected signal as an input and each comprised of two linear transversal filters, that is, a feedforward filter and a feedback filter, a decision part and a tap-coefficient-update part that updates the tap-coefficient of the two linear transversal filters in accordance with tap-coefficient update algorithms; a plurality of linear adaptive equalizers each supplied with each detected signal as the input and each comprised of a linear transversal filter, a decision part and a tap-coefficient-update part that updates the tap-coefficient of the linear transversal filter in accordance with tap-coefficient update algorithms; a plurality of delay measuring circuits each supplied with each detected signal as the input and for detecting a multipath propagation characteristic of a channel; and means for selecting one of equalized outputs produced from the plurality of decision feedback adaptive equalizers or one of equalized outputs produced from the plurality of linear adaptive equalizers based on the results measured by the delay measuring circuits and setting the selected one equalized output as a final equalized output, whereby the adaptive equalizers which are expected to show better performance than that of the other with respect to the multipath propagation characteristics measured by the respective delay measuring circuits, are activated every branches to thereby produce equalized outputs for every branches and characteristics of the equalized outputs produced every branches are thereafter compared to thereby set the output of the adaptive equalizer which is best in equalization characteristic as a final equalized output from the result of comparison.

According to the adaptive equalizer of the first aspect of the invention, which has been constructed as described above, an is effected by means of the decision feedback adaptive equalizer excellent in equalization characteristic under frequency selective fading in which a delay time interval of a delay wave is long and the linear adaptive equalizer excellent in equalization characteristic under frequency selective fading in which a delay time interval of a delay wave is short and fading in which a delay wave does not exist. Further, the result of the output of the adaptive equalizer that has better performance than that of the other is used as a final equalized output. Therefore, a satisfactory equalization characteristic can be obtained irrespective of whether the delay wave is present and the delay time interval of the delay wave is long or short under fading.

According to the adaptive equalizer of the second aspect of the invention, which has been constructed as described above, an equalization is executed by means of the decision feedback adaptive equalizer which shows excellent performance under frequency selective fading in which a delay time interval of a delay wave is long and the linear adaptive equalizer which shows excellent performance under frequency selective fading in which a delay time interval of a delay wave is short and fading in which a delay wave does not exist. Further, the result of the output of the adaptive equalizer which has better performance than the other is used as a final equalized output. Therefore, a good performance can be obtained irrespective of whether the delay wave is present and the delay time interval of the delay wave is long or short under fading. Besides, the total computation time by the adaptive equalizer can be reduced by effecting the comparison between the performance on data existing up to the middle of a burst and stopping the calculation effected by the equalizer that shows performance degradation compared with the other.

According to the adaptive equalizer of the third aspect of the invention, which has been constructed as described above, the decision feedback adaptive equalizer equalizes only the receive signal with respect to the known data sequence to thereby determine the threshold value based on the estimation error produced upon its equalization. Next, the linear adaptive equalizer equalizes a receive signal corresponding to one burst. Thereafter, the value determined based on the estimation error produced upon its equalization is compared with the threshold value. When the value determined based on the estimation error produced from the linear adaptive equalizer is smaller than the threshold value, the output of the linear adaptive equalizer is set as a final equalized output. On the other hand, when all the values determined by the linear adaptive equalizers is larger than the threshold value which is the smallest set by threshold-value setting circuit, the decision feedback adaptive equalizer equalizes the receive signal other than that corresponding to the known data sequence. Thereafter, the value determined based on the estimation error produced upon its equalization is compared with the value determined based on the previously-determined estimation error of the linear adaptive equalizer. From the result of comparison, the result of the output from the adaptive equalizer which has better performance to the other is set as a final equalized output. Therefore, a good performance can be obtained irrespective of whether a delay wave is present and a delay time interval of the delay wave is long or short under fading. Further, since the equalization characteristic of the decision feedback adaptive equalizer is judged from the part of the known data sequence and compared with that of the linear adaptive equalizer and an equalization is effected on data other than the known data sequence only when it is expected that the equalization characteristic of decision feedback equalizer shows better performance than the other, the total computation time by the adaptive equalizer can be reduced.

According to the adaptive equalizer of the fourth aspect of the invention, which has been constructed as described above, the equalization effected on data sequence produced in one burst is temporarily stopped and the tap coefficients for the decision feedback adaptive equalizer and the linear adaptive equalizer are reset. The value determined based on the estimation error produced so far from the decision feedback adaptive equalizer is compared with the value determined based on the estimation error produced from the linear adaptive equalizer. Next, the output of a memory in one of the adaptive equalizers, having the value smaller than the value determined based on the equalized output produced from the other, is selected based on the result of comparison so as to be set as the equalized output so far. Further, the value corresponding to several symbols produced before the stoppage of the equalization, of the equalized output produced from the one adaptive equalizer, is set as a known reference signal for the following equalization. In this condition, the decision feedback adaptive equalizer and the linear adaptive equalizer are subjected to re-training. Therefore, a tracking property with respect to a variation a channel characteristic can be improved and a good performance can be brought about irrespective of whether a delay wave is present and a delay time interval of the delay wave is long or short under fading.

According to the adaptive equalizer of the fifth aspect of the invention, which has been constructed as described above, the delay measuring circuit measures a state of a channel. When a delay time interval of a delay wave is long, an equalization is executed by means of the decision feedback adaptive equalizer which shows excellent performance under frequency selective fading. On the other hand, when the delay time interval of the delay wave is short, an equalization is executed by means of the linear adaptive equalizer which shows excellent performance under frequency selective fading in which the delay time interval of the delay wave is short and fading in which the delay wave does not exist. Thus, a good performance can be obtained regardless of whether the delay wave is present and the delay time interval of the delay wave is long or short.

According to the adaptive diversity equalizer of the sixth aspect of the invention, which has been constructed as described above, each of the plurality of decision feedback adaptive equalizers, which shows excellent performance under frequency selective fading in which a delay time interval of a delay wave is long, and each of the plurality of linear adaptive equalizers, which shows excellent performance under frequency fading in which a delay time interval of a delay wave is short and fading in which the delay wave does not exist, effect an equalization on the signal outputted from each of the plurality of antennas and detectors. Further, the result outputted from the adaptive equalizer whose equalization characteristic is best, is set as a final equalized output. Therefore, a receiver performance can be improved owing to a diversity effect and a good performance can be obtained irrespective of whether the delay wave is present and the delay time interval of the delay wave is long or short.

According to the adaptive diversity equalizer of the seventh aspect of the invention, which has been constructed as described above, each of the plurality of decision feedback adaptive equalizers, which shows excellent performance under frequency selective fading in which a delay time interval of a delay wave is long and each of the plurality of linear adaptive equalizers, which shows excellent performance under frequency selective fading in which a delay time interval of a delay wave is short and fading in which a delay wave does not exist, effect an equalization on each of the signals outputted from the plurality of antennas and detectors. Further, the result outputted from the adaptive equalizer, which is best in equalization characteristic, is set as a final equalized output. Therefore, a receiver performance can be improved owing to a diversity effect under fading. Further, a good performance can be obtained irrespective of whether the delay wave is present and the delay time interval of the delay wave is long or short under fading. Moreover, the total computation time by the adaptive diversity equalizer can be reduced by effecting the comparison between the performance on data existing up to the middle of a burst and stopping the calculations made by the adaptive equalizers other than the adaptive equalizer which is best in equalization characteristic.

According to the adaptive diversity equalizer of the eighth aspect of the invention, which has been constructed as described above, each of the decision feedback adaptive equalizers, which is to perform an equalization on each of the signals outputted from the plurality of antennas and detectors, first equalizes only the received signal corresponding to the known data sequence and determines the threshold value from the estimation error produced from each decision feedback adaptive equalizer. Similarly, each of the linear adaptive equalizers, which is to perform an equalization on each of the signals outputted from the plurality of antennas and detectors, then equalizes a received signal corresponding to one burst. Thereafter, each of the values determined based on the estimation errors produced from the linear adaptive equalizers is compared with the threshold value. When each of the values determined based on the estimation errors produced from the linear adaptive equalizers is smaller than the threshold value, the output produced from the corresponding linear adaptive equalizer in which the value determined based its estimation error is minimum, is set as a final equalized output. On the other hand, when each of the values determined based on the estimation errors produced from all the linear adaptive equalizers is larger than the threshold value, each of the decision feedback adaptive equalizers, which is to perform an equalization on each of the signals outputted from the plurality of antennas and detectors, equalizes a received signal subsequent to that corresponding to the known data sequence. Next, the value determined based on the resultant estimation error is compared with each value determined based on each of the previously-determined estimation errors produced from the plurality of linear adaptive equalizers, thereby setting an output result best in equalization characteristic as a final equalized output, based on the result of comparison. Therefore, a receiver performance can be improved owing to a diversity effect under fading and a good performance can be obtained irrespective of whether a delay wave is present and a delay time interval of the delay wave is long or short. Further, the performance of the decision feedback adaptive equalizers with respect to the signals outputted from the plurality of antennas and detectors are decided or judged from the known received signals corresponding to the known data sequence and then compared with those of the linear adaptive equalizers with respect to the signals outputted from the plurality of antennas and detectors. Since the corresponding decision feedback adaptive equalizer equalizes data subsequent to the known signal only when its equalization characteristic is expected to show good performance, the total computation time by the adaptive diversity equalizer can be reduced.

According to the adaptive diversity equalizer of the ninth aspect of the invention, which has been constructed as described above, the equalization effected on data sequence in one burst is temporarily stopped and the tap coefficients for all the decision feedback adaptive equalizers and linear adaptive equalizers are reset. The values determined based on the estimation errors produced so far from the decision feedback adaptive equalizers with respect to the signals outputted from the plurality of antennas and detectors are compared with the values determined based on the estimation errors produced from the linear adaptive equalizers. Thereafter, the output of a memory in one of the adaptive equalizers, having the minimum one of the values determined based on the estimation errors, is selected based on the result of comparison so as to be set as the equalized output so far. Further, the value, corresponding to several symbols produced before the stoppage of the equalization, of the equalized output which provides the minimum one of the values determined based on the estimation errors, is set as a known reference signal for the following equalization. In this condition, all the decision feedback adaptive equalizers and linear adaptive equalizers are subjected to re-training. Therefore, a tracking property with respect to a variation in a channel characteristic can be improved and a receiver performance can be enhanced owing to a diversity effect under fading. Further, a good performance can be brought about irrespective of whether a delay wave is present and a delay time interval of the delay wave is long or short.

According to the adaptive diversity equalizer of the tenth aspect of the invention, which has been constructed as described above, each of the plurality of delay measuring circuits measures a state of a channel with respect to each of the signals outputted from the plurality of antennas and detectors. When a delay time interval of a delay wave is long at each branch, each of the plurality of decision feedback adaptive equalizers, which shows excellent performance under frequency selective fading in which the delay time interval of the delay wave is long, is activated. On the other hand, when the delay time interval of the delay wave is short at each branch or when the delay wave is absent, each of the plurality of linear adaptive equalizers, which shows excellent performance under frequency selective fading in which the delay time interval of the delay wave is short and fading in which the delay wave does not exist, is activated. Next, the result outputted from the adaptive equalizer best in equalization characteristic between the branches, is set as a final equalized output. Therefore, a receiver performance can be improved owing to a diversity effect under fading and a good performance can be obtained regardless of whether the delay wave is present and the delay time interval of the delay wave is long or short.

BRIEF DESCRIPTION OF THE DRAWINGS

FIG. 2 is a bit error rate performance illustrating one example of improved effects of the equalizer shown in FIG. 1.

FIG. 3 is a block diagram depicting the structure of an adaptive equalizer according to a second embodiment of the present invention.

FIG. 5 is a flow chart for describing the operation of the adaptive equalizer shown in FIG. 4.

FIGS. 7A–7C are a flow chart for explaining the operation of the adaptive equalizer shown in FIG. 6.

DESCRIPTION OF THE PREFERRED EMBODIMENTS

Figure 1:
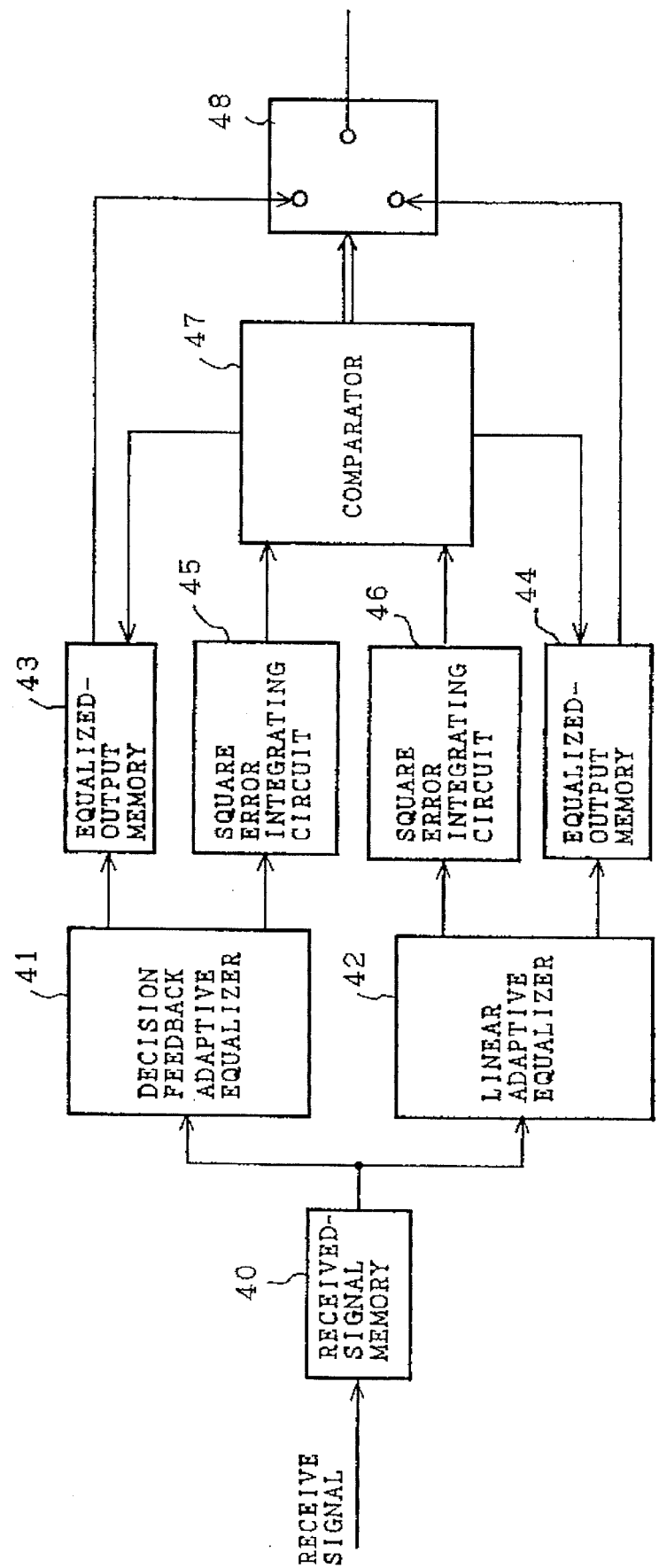
FIG. 1 is a block diagram showing the structure of an adaptive equalizer according to a first embodiment of the present invention.

The preferred embodiments of the invention will be explained in detail with reference to the drawings.
First embodiment FIG. 1 is a block diagram showing the structure of an adaptive equalizer according to the first embodiment of the present invention. In the drawing, the same elements of structure as those employed in a conventional example are identified by same reference numerals and their description will therefore be omitted. In FIG. 1, reference numeral 40 indicates a received-signal memory for storing received signals corresponding to one burst. Reference numeral 41 indicates a decision feedback adaptive equalizer for reading the receive signal from the received-signal memory 40 and for equalizing it. Designated at numeral 42 is a linear adaptive equalizer for reading the receive signal from the received-signal memory 40 and for equalizing it. The linear adaptive equalizer is constructed such that it has the same structure as the decision feedback adaptive equalizer except that an FB section is removed. Further, reference numeral 43 indicates an equalized-output memory for storing therein an equalized output supplied from the decision feedback adaptive equalizer 41, reference numeral 44 indicates an equalized-output memory for storing therein an equalized output supplied from the linear adaptive equalizer 42, reference numeral 45 indicates a square error integrating circuit for integrating equalized square errors produced from the decision feedback adaptive equalizer 41, reference numeral 46 indicates an equalized square error integrating circuit for integrating equalized square errors of the linear adaptive equalizer 42, reference numeral 47 indicates a comparator for comparing an output produced from the equalized square error integrating circuit 45 and an output produced from the equalized square error integrating circuit 46 and outputting the result of comparison therefrom as an output control signal, and reference numeral 48 indicates an output selector switch for selecting one of outputs produced from the equalized-output memory 43 and the equalized-output memory 44 in response to the output control signal supplied from the comparator 47.

Operation of the adaptive equalizer shown in FIG. 1 will be described.

The received-signal memory 40 stores the receive signal therein. The decision feedback adaptive equalizer 41 reads data from the received-signal memory 40 and estimates a channel characteristics using UW11 as described in the paragraphs of the operation of the equalizer shown in FIG. 15 and then the tap coefficients are converged. Next, the decision feedback adaptive equalizer 41 equalizes the random data 12. Further, the decision feedback adaptive equalizer 41 outputs the error values expressed by the equation (4) to the equalized square error integrating circuit 45 upon equalization of the random data 12. Thereafter, the decision feedback adaptive equalizer 41 outputs the result of equalization of the random data 12 to the equalized-output memory 43.

Figure 15:
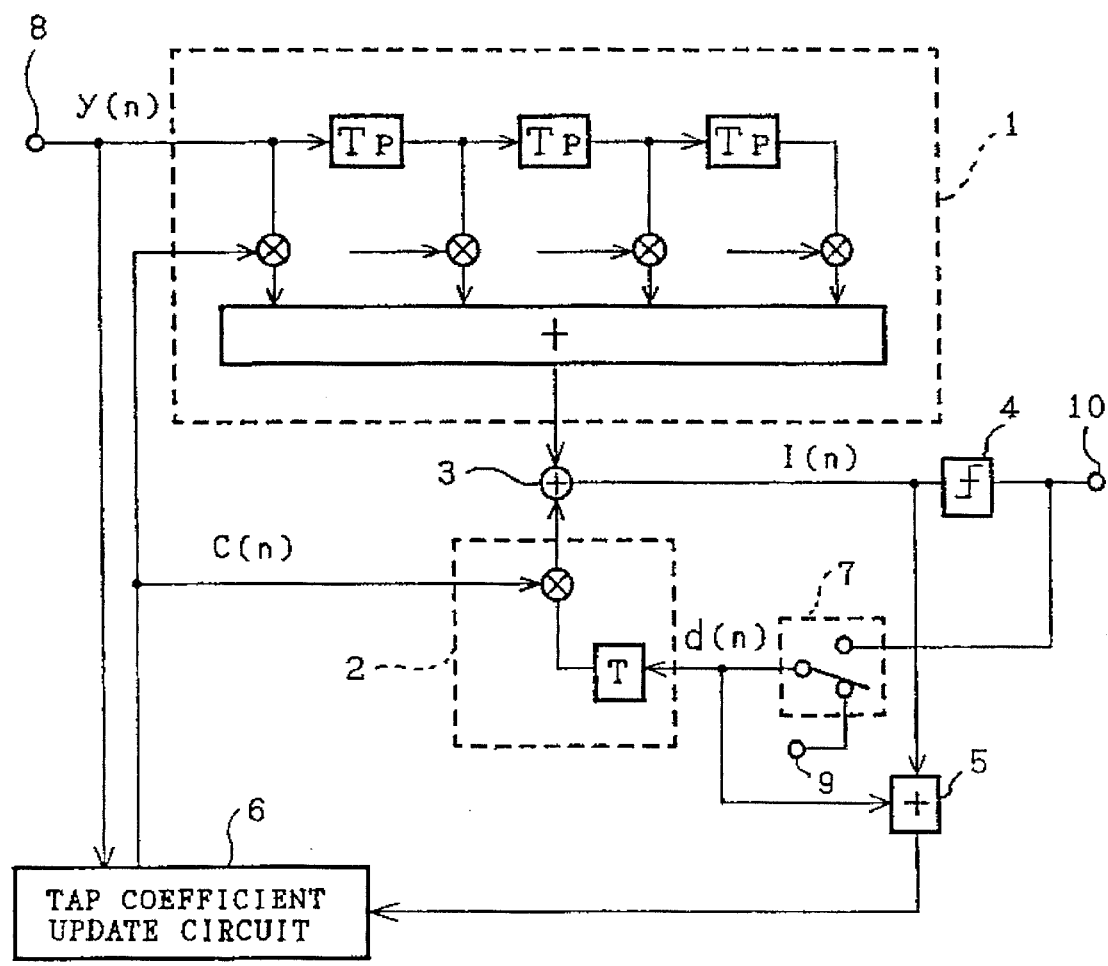
FIG. 15 is a block diagram illustrating the structure of a conventional adaptive equalizer.
Figure 16:
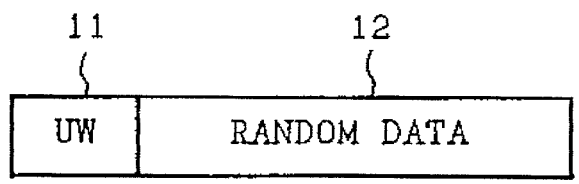
FIG. 16 is a view for describing one example of a burst format employed in mobile radio communication.
Figure 17:
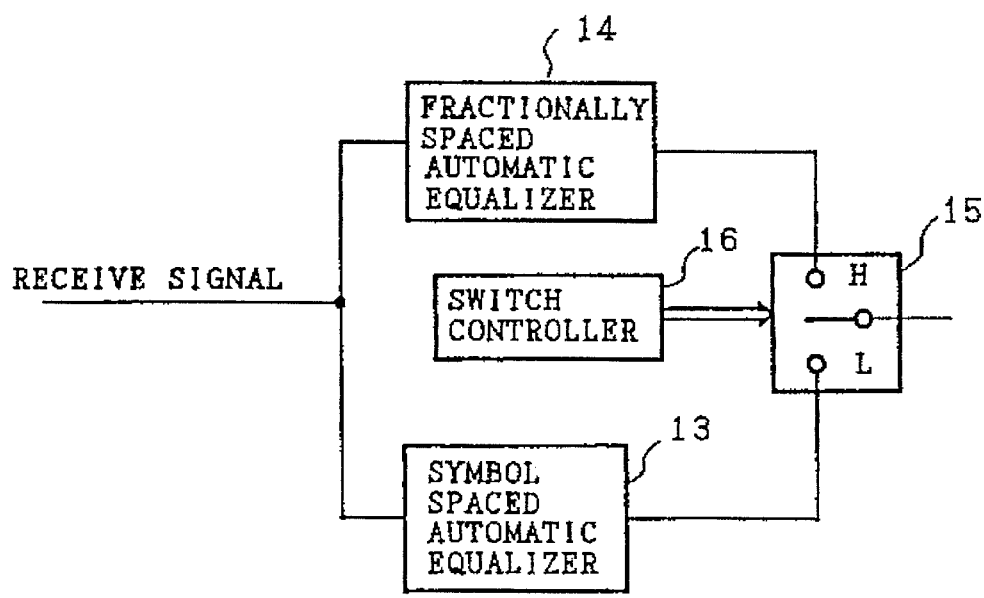
FIG. 17 is a block diagram showing the structure of another conventional adaptive equalizer.
Figure 18:
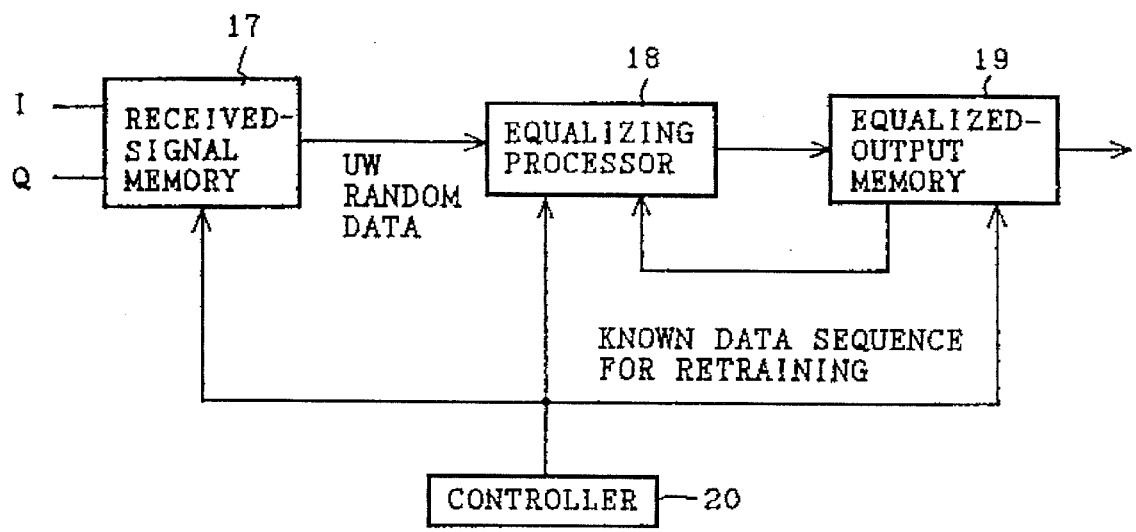
FIG. 18 is a block diagram illustrating the structure of still another conventional adaptive equalizer.
Figure 19:
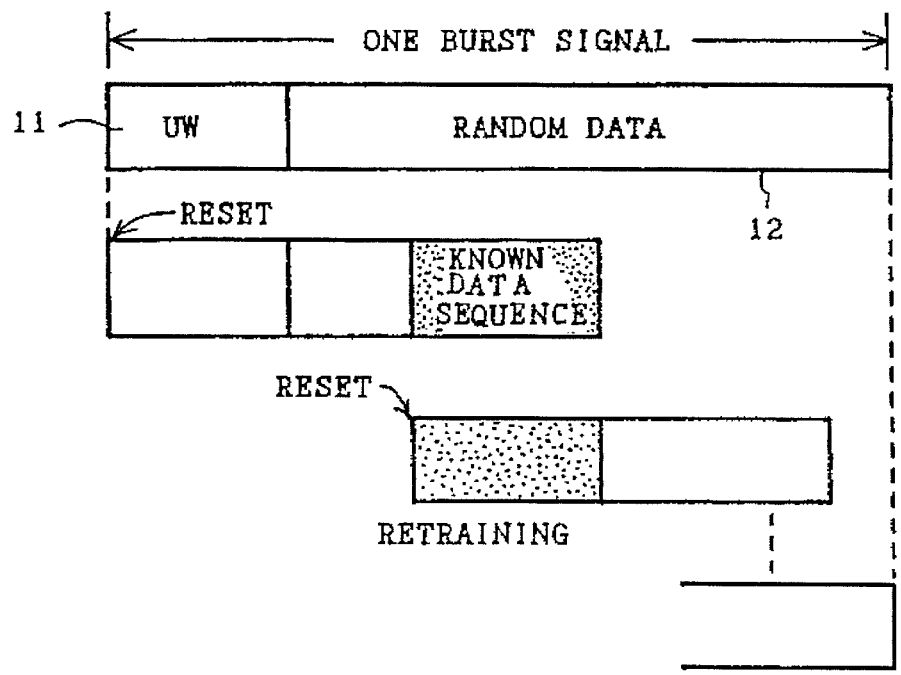
FIG. 19 is a view for describing the operation of the conventional adaptive equalizer.
Figure 21:
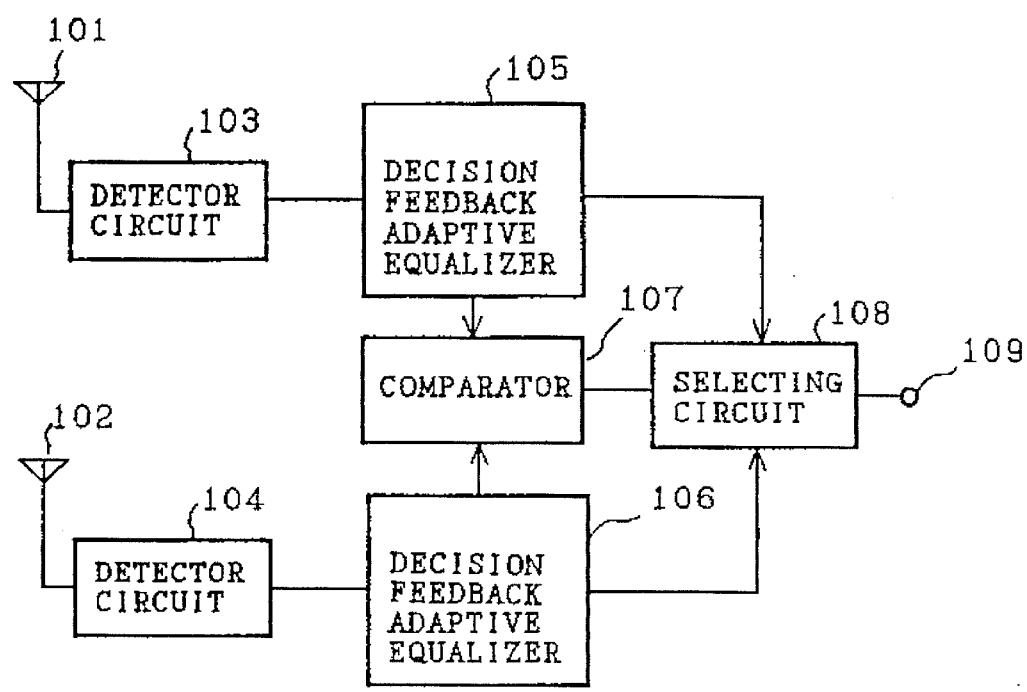
FIG. 21 is a block diagram showing the structure of an adaptive diversity equalizer.
Figure 22:
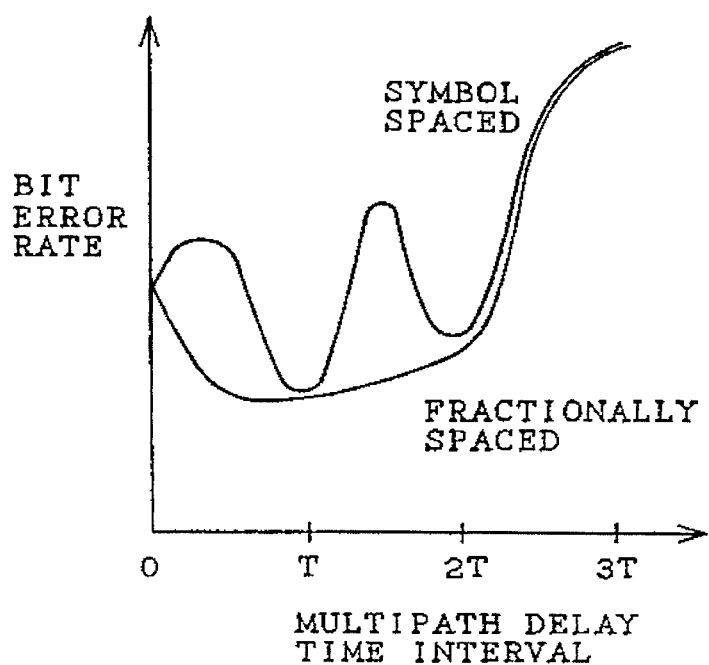
FIG. 22 is a view for describing one example of bit error rate performance with respect to a normalized delay time of a delay wave, of the conventional equalizer.
Figure 23:
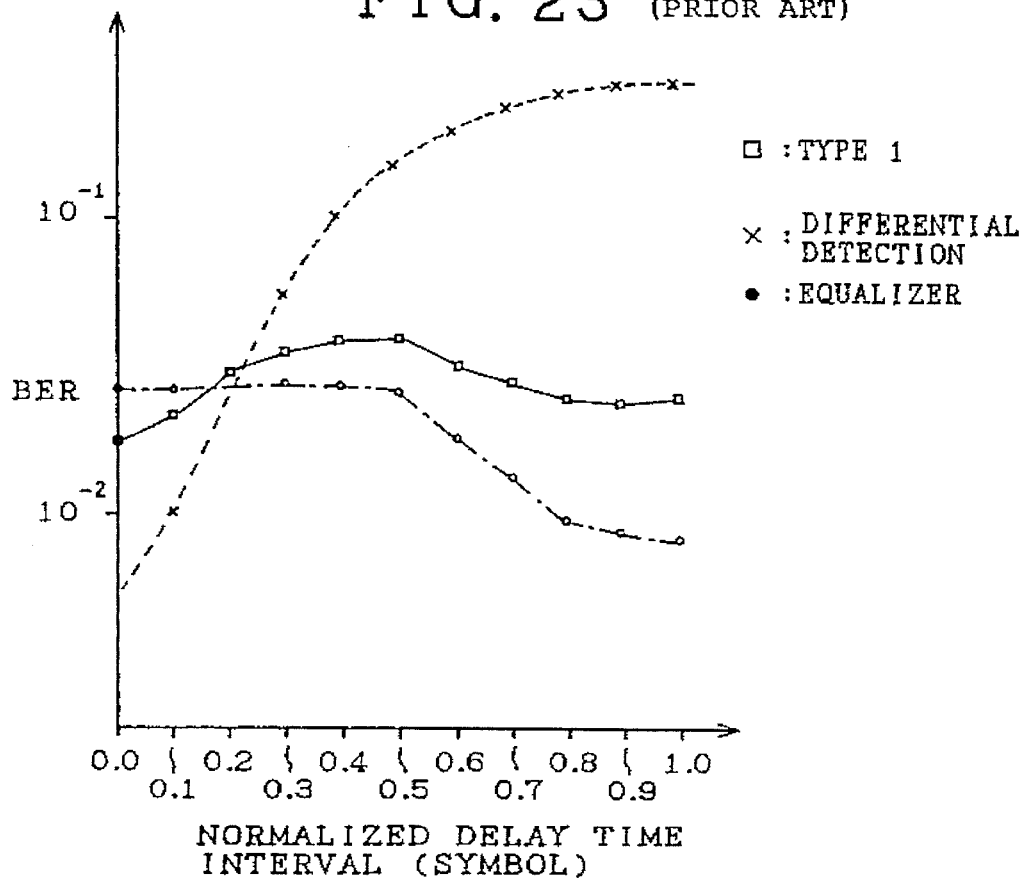
FIG. 23 is a view for describing another example of bit error rate performance with respect to a normalized delay time of a delay time, of the conventional equalizer.
Figure 20:
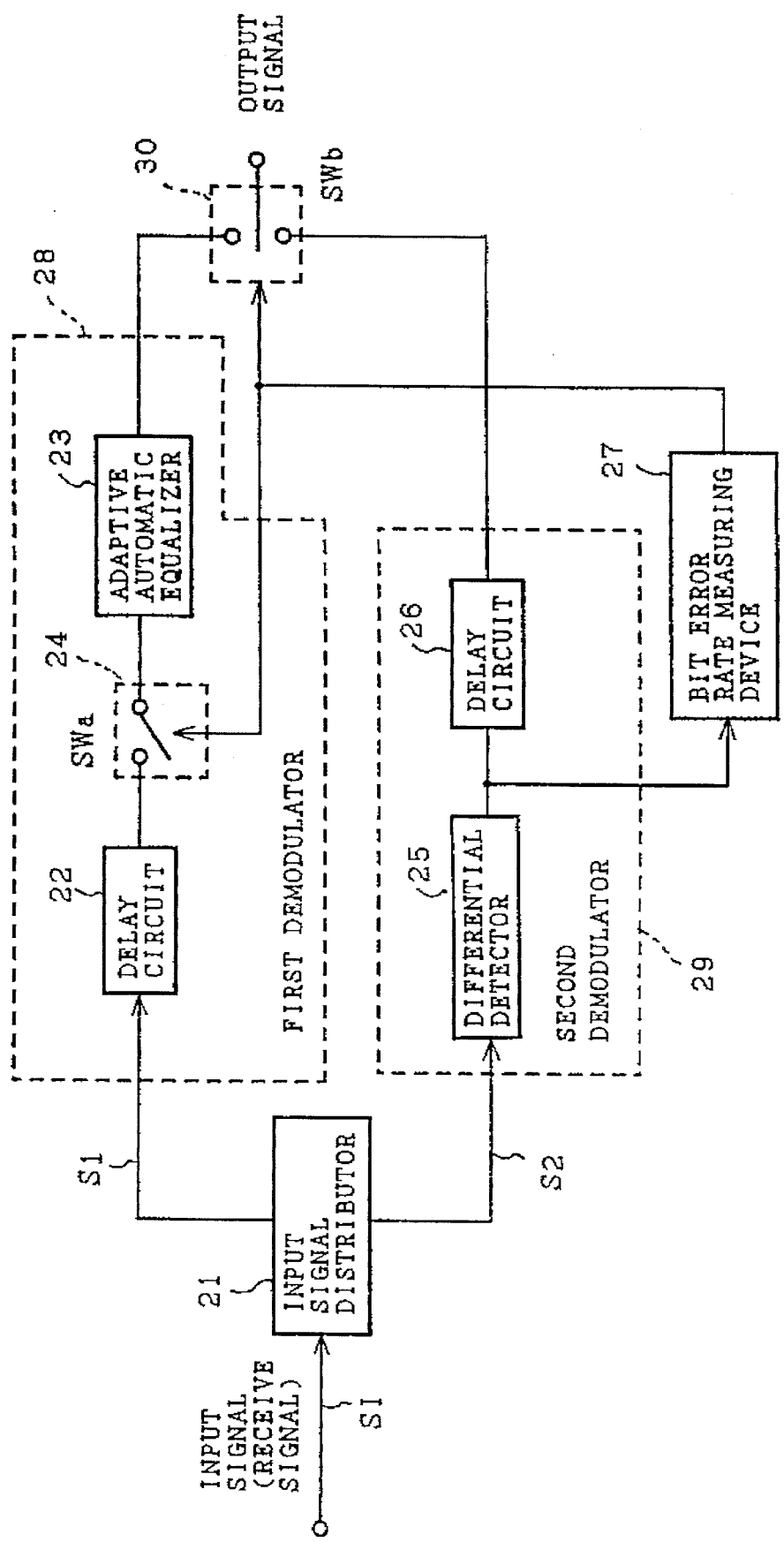
FIG. 20 is a block diagram showing the structure of a digital communication control device including the conventional adaptive equalizer.
Figure 24:
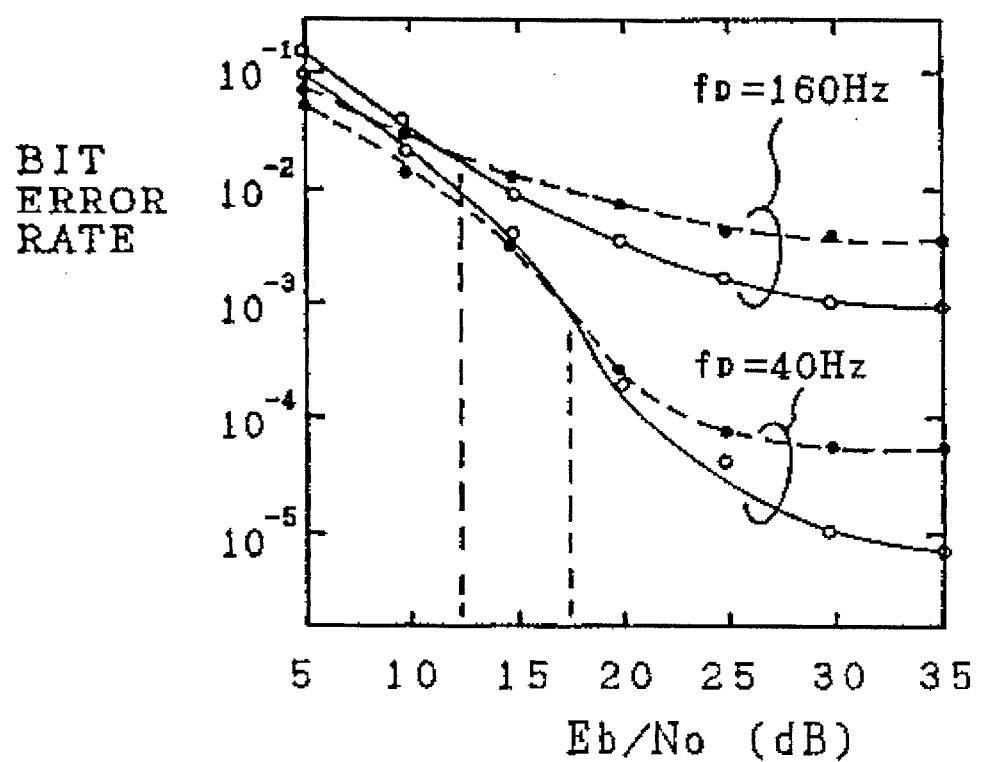
FIG. 24 is a view for describing one example of bit error rate performance of the conventional equalizer.

The linear adaptive equalizer 42 reads the data from the received-signal memory 40 and estimates channel characteristics using UW11 as described in the paragraphs of the operation of the equalizer shown in FIG. 15 and then the tap coefficients are converged. Next, the linear adaptive equalizer 42 equalizes random data 12. Thereafter, the linear adaptive equalizer 42 outputs the error signal given by the equation (4) to the equalized square error integrating circuit 46 upon equalization of the random data 12. Further, the linear adaptive equalizer 42 outputs the result of equalization of the random data 12 to the equalized-output memory 44.

The equalized square error integrating circuit 45 brings the error values outputted upon equalization of the random data 12 from the decision feedback adaptive equalizer 41 to a square and thereafter calculates the sum of the squared error values corresponding to one burst. Next, the equalized square error integrating circuit 45 outputs the result of calculation to the comparator 47.

The equalized square error integrating circuit 46 brings error values outputted upon equalizing the random data 12 from the linear adaptive equalizer 42 to a square and thereafter calculates their sum corresponding to one burst.

Thereafter, the equalized square error integrating circuit 46 outputs the result of calculation to the comparator 47.

The comparator 47 compares the result outputted from the equalized square error integrating circuit 45 and the result outputted from the equalized square error integrating circuit 46. When the sum of equalized square errors by the equalized square error integrating circuit 45 is smaller than that by the equalized square error integrating circuit 46, that is, when the decision feedback adaptive equalizer 41 is shows better performance than the linear adaptive equalizer 42 with respect to such a burst, the comparator 47 outputs a control signal for connection of the equalized-output memory 43 to the output selector switch 48.

On the other hand, when the sum of the equalized square errors by the equalized square error integrating circuit 46 is smaller than that of the equalized square errors by the equalized square error integrating circuit 45, that is, when the linear adaptive equalizer 42 which shows better performance than the decision feedback adaptive equalizer 41 with respect to such a burst, the comparator 47 outputs a control signal for connection of the equalized-output memory 44 to the output selector switch 48.

After either the equalized-output memory 43 or the equalized-output memory 44 has been electrically connected to the output selector switch 48, either the equalized-output memory 43 or the equalized-output memory 44 outputs the result of equalization stored in the same memory as a final equalized output.

FIG. 2 shows, as one example, improved effects of bit error rate performance obtained by the first embodiment. FIG. 2 is a graph showing an example of a bit error rate performance of a single decision feedback adaptive equalizer including an FF section having 4 taps (fractional interval value T/2: T represents one symbol) and an FB section having 1 tap; an example of an error rate characteristic of a single linear adaptive equalizer in which the number of taps is set to 2 (fractional interval time T/2:); and an example of an error rate characteristic of the adaptive equalizer according to the first embodiment. The bit error rate performance of the single decision feedback adaptive equalizer as shown in FIG. 2 shows degradation as normalized delay time τ of the delayed wave become smaller than 1. This degradation is described in the paragraph of problems to be solved by the invention. Since the linear adaptive equalizer 42 has the small number of taps and does not make use of decision feedback, a bit error rate performance of the linear adaptive equalizer 42 when τ=0 (one Rayleigh wave) is best. Further, the bit error rate performance shows severe degradation as τ increases. On the other hand, in the adaptive equalizer according to the present embodiment, the performances of the two adaptive equalizers are compared with each other every burst and one of two outputs of equalizer, which shows better performance than the other, is selected so as to be produced as a final equalized output. Thus, when τ=0 or τ is small, the equalized output of the linear adaptive equalizer 42 is selected. On the other hand, when τ is large, the equalized output of the decision feedback adaptive equalizer 41 is selected. Therefore, an error rate characteristic substantially constant when τ≦1 is shown regardless of the magnitude of τ.

Incidentally, the first embodiment shows the case where the output selector switch 48 is changed over so as to select one of the outputs of the decision feedback adaptive equalizer 41 and the linear adaptive equalizer 42 in response to the sum of the equalized square errors outputted upon equalization of the random data corresponding to the one burst. However, the following method may be executed as an alternative. That is, the random data corresponding to one burst is divided into n data (where n: integer). Further, the sum of the equalized square errors by the decision feedback adaptive equalizer 41 and the sum of the equalized square errors by the linear adaptive equalizer 42 are calculated and compared every divided data. Thereafter, the outputs of the decision feedback adaptive equalizer 41 and the linear adaptive equalizer 42 are selected for each divided data.

Further, the first embodiment shows the case where the output selector switch 48 is changed over so as to select one of the outputs of the decision feedback adaptive equalizer 41 and the linear adaptive equalizer 42 in response to the sum of the equalized square errors outputted upon equalization of the random data corresponding to the one burst. However, the following method may be executed as an alternative. That is, the sum of the equalized square errors by the decision feedback adaptive equalizer 41 and the sum of the equalized square errors by the linear adaptive equalizer 42 are calculated and compared upon equalizing random data corresponding to a desired number of bursts. Thereafter, the outputs of the memories are selected for each desired number of bursts.

Second embodiment

FIG. 3 is a block diagram showing the structure of an adaptive equalizer according to the second embodiment of the present invention. In the drawing, the same elements of structure as those employed in the conventional example and the first embodiment are identified by the same reference numerals and their description will therefore be omitted. In FIG. 3, reference numeral 49 indicates a decision feedback adaptive equalizer for reading a receive signal from a received-signal memory 40 so as to equalize it and deactivated in response to a control signal supplied from the outside, reference numeral 50 indicates a linear adaptive equalizer for reading the receive signal from the received-signal memory 40 so as to equalize it and deactivated in response to the control signal supplied from the outside, reference numeral 51 indicates an equalized-output memory for storing an equalized output supplied from the decision feedback adaptive equalizer 49 therein, reference numeral 52 indicates an equalized-output memory for storing an equalized output supplied from the linear adaptive equalizer 50 therein, reference numeral 53 indicates an equalized square error integrating circuit for integrating equalized square errors of the decision feedback adaptive equalizer 49, reference numeral 54 indicates an equalized square error integrating circuit for integrating equalized square errors of the linear adaptive equalizer 50, and reference numeral 55 indicates a comparator for comparing the magnitude of an output produced from the equalized square error integrating circuit 53 with that of an output produced from the equalized square error integrating circuit 54 and outputting an output control signal to each of an output selector switch 48, the decision feedback adaptive equalizer 49 and the linear adaptive equalizer 50 using the result of comparison.

Operation of the adaptive equalizer shown in FIG. 3 will be described.

The decision feedback adaptive equalizer 49 reads data from the received-signal memory 40 and estimates channel characteristic using UW11 as described in the paragraphs of the operation of the equalizer shown in FIG. 15 so that tap coefficients are converged. Next, the decision feedback adaptive equalizer 49 equalizes random data 12. Further, the decision feedback adaptive equalizer 49 outputs the error values expressed by the equation (4) to the equalized square error integrating circuit 53 for each symbol upon equalization of the random data 12. Thereafter, the decision feedback adaptive equalizer 49 outputs the result of equalization of the random data 12 to the equalized-output memory 51 for each symbol.

The linear adaptive equalizer 50 reads the data from the received-signal memory 40 and estimates channel characteristics using UW11 as described in the paragraphs of the operation of the equalizer shown in FIG. 15 so that the tap coefficients are converged. Next, the linear adaptive equalizer 50 equalizes random data 12. Thereafter, the linear adaptive equalizer 50 outputs the error values to the equalized square error integrating circuit 54 for each symbol upon equalization of the random data 12. Further, the linear adaptive equalizer 50 outputs the result of equalization of the random data 12 to the equalized-output memory 52 for each symbol.

The equalized square error integrating circuit 53 brings the individual error values outputted upon equalization of the random data 12 from the decision feedback adaptive equalizer 49 to a square and thereafter calculates the sum of the squared error values corresponding to m symbols (m: integer) in the random data. Next, the equalized square error integrating circuit 53 outputs the result of calculation to the comparator 55.

The equalized square error integrating circuit 54 brings the error values outputted upon equalizing the random data 12 from the linear adaptive equalizer 50 to a square and thereafter calculates the sum of the squared error values corresponding to m symbols (m: integer) in the random data. Next, the equalized square error integrating circuit 54 outputs the result of calculation to the comparator 55.

The comparator 55 compares the result outputted from the equalized square error integrating circuit 53 and the result outputted from the equalized square error integrating circuit 54. When the output of the equalized square error integrating circuit 53 is smaller than that of the equalized square error integrating circuit 54, that is, when it is expected that the decision feedback adaptive equalizer 49 that shows better performance than the linear adaptive equalizer 50 with respect to such a burst, the comparator 55 outputs a control signal for connection of the equalized-output memory 51 to the output selector switch 48 and outputs a stop signal to the linear adaptive equalizer 50. The linear adaptive equalizer 50 stops the equalization of the remaining random data with respect to the same burst in response to the control signal. On the other hand, when the output of the equalized square error integrating circuit 54 is smaller than that of the equalized square error integrating circuit 53, the comparator 55 outputs a control signal for connection of the equalized-output memory 52 to the output selector switch 48 and outputs a stop signal to the decision feedback adaptive equalizer 49. The decision feedback adaptive equalizer 49 stops the equalization of the remaining random data with respect to the same burst in response to the control signal.

After either the equalized-output memory 51 or the equalized-output memory 52 has been electrically connected to the output selector switch 48, either the equalized-output memory 51 or the equalized-output memory 52 outputs the result of equalization stored therein as a final equalized output.

The present embodiment shows the case where the comparison between the sums of the equalized square errors and their stop operation of calculation is carried out once for each burst. As an alternative, however, the comparison between the sums of the equalized square errors and their arithmetic stop operation may be carried out once for each m burst (m=2, 3, 4, . . . ) when an interval between receiving bursts is short and a channel slowly varies.

Third embodiment

Figure 4A:
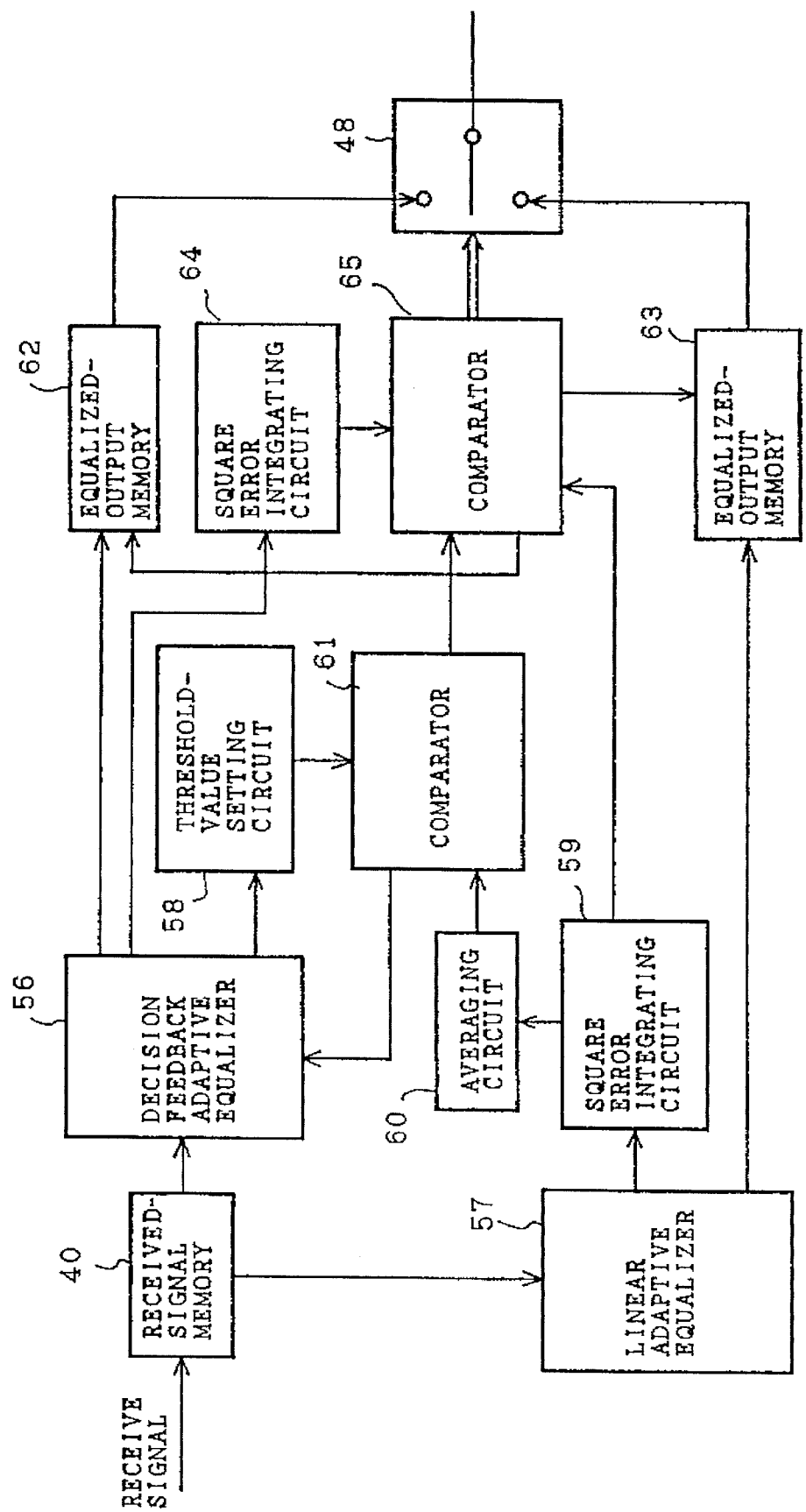
FIG. 4 is a block diagram illustrating the structure of an adaptive equalizer according to a third embodiment of the present invention.
FIG. 4B is a block diagram illustrating the structure of the threshold value setting circuit of FIG. 4A.

FIG. 4 is a block diagram showing the structure of an adaptive equalizer according to the third embodiment of the present invention. In the drawing, the same elements of structure as those employed in the conventional example and the first and second embodiments are identified by the same reference numerals and their description will therefore be omitted.

In FIG. 4, reference numeral 56 indicates a decision feedback adaptive equalizer for reading a receive signal from a received-signal memory 40 so as to equalize UW11 and thereafter equalizing random data 12 in response to a control signal supplied from the outside, reference numeral 57 indicates a linear adaptive equalizer for reading the receive signal from the received-signal memory 40 and equalizing it, reference numeral 58 indicates a threshold-value setting circuit for determining a threshold value based on tap coefficients produced after completion of the equalization of the UW11 and the receive signal corresponding to the UW11, reference numeral 59 indicates an equalized square error integrating circuit for integrating equalized square errors produced from the linear adaptive equalizer 57, reference numeral 60 indicates an equalized square error averaging circuit for averaging the output of the equalized square error integrating circuit by an integrating symbol number, reference numeral 61 indicates a comparator for comparing the mean value of equalized square errors, corresponding to the output of the equalized square error averaging circuit 60 with the output of the threshold-value setting circuit 58, outputting a signal for selecting the linear adaptive equalizer when the mean value is smaller than the threshold value and outputting a selection hold signal when the mean value is not smaller than the threshold value, reference numeral 62 indicates an equalized-output memory for storing an equalized output supplied from the decision feedback adaptive equalizer 56 therein, reference numeral 63 indicates an equalized-output memory for storing an equalized output supplied from the linear adaptive equalizer 57 therein, reference numeral 64 indicates an equalized square error integrating circuit for integrating equalized square errors of the decision feedback adaptive equalizer 56, and reference numeral 65 indicates a comparator for comparing the magnitude of an output produced from the equalized square error integrating circuit 64 and that of an output produced from the equalized square error integrating circuit 59 and outputting an output control signal to each of an output selector switch 48, the equalized-output memory 62 and the equalized-output memory 63 using the result of comparison.

Operation of the adaptive equalizer shown in FIG. 4 will be described.

FIG. 5 is a flow chart for describing the operation of the adaptive equalizer shown in FIG. 4.

In S501, the decision feedback adaptive equalizer 56 estimates characteristics of a channel using UW11 as described in the paragraphs of the operation of the equalizer shown in FIG. 15 to thereby converge tap coefficients. Next, the decision feedback adaptive equalizer 56 reads receiving input data corresponding to the UW11 as input signals again and with the tap coefficients being fixed and computes an inner product for each symbol. Thereafter, the decision feedback adaptive equalizer 56 computes the error values between the inner product and the reference signal to thereby determine errors for each symbol. Further, the decision feedback adaptive equalizer 56 outputs the fixed tap coefficients and the errors produced for each symbol to the threshold-value setting circuit 58.

The threshold-value setting circuit 58 comprises a first integrating circuit 201 for calculating the sum of absolute values of the fixed tap coefficients in an FF section, a second integrating circuit 202 for calculating the sum of absolute values of tap coefficients in an FB section, a dividing circuit 206 for determining a ratio FFR of the sum of the absolute values of the tap coefficients in the FF section to the sum of the absolute values of the tap coefficients in the FB section, a square error integrating circuit 203 for squaring the errors produced for each symbol to thereby produce the sum of the squared errors, an averaging circuit 207 for averaging the sum of the squared errors to thereby determine MSE1, and a multiplier for multiplying the MSE1 by the FFR and a suitable constant a to thereby determine MSE11.

In S502, the first integrating circuit and the second integrating circuit in the threshold-value setting circuit 58 respectively calculate the following sum SFF of the absolute values of the tap coefficients in the FF section and the following sum SFB of the absolute values of the tap coefficients in the FB section. Next, the dividing circuit in the threshold-value setting circuit 58 determines the following ratio FFR of the sum SFF to the sum SFB.

$$SFF=|C_1(n)|+|C_2(n)|+ \ldots +|C_L(n)| \tag{13}$$

$$SFB=|C_{L+1}(n)|+|C_{L+2}(n)|+ \ldots +|C_M(n)| \tag{14}$$

$$FFR=SFF/SFB \tag{15}$$

Next, the square error integrating circuit and the averaging circuit determine MSE1 representing the mean of the square errors. Further, the multiplier multiplies the MSE1 by the FFR and the suitable constant a to thereby fix the following MSE11 and outputs it to the comparator 61.

$$MSE11=MSE1*FFR*\alpha \tag{16}$$

Now, the FFR is used to perform simple estimation of the ratio of the magnitude of a direct wave propagated through the channel to the magnitude of a delay wave. Therefore, when the magnitude of the delay wave is smaller than that of the preceding wave, for example, the absolute values of the tap coefficients in the FB section, which negate an effect produced by the delay wave, are also low and hence the FFR increases. Further, the MSE11 also increases. On the other hand, when the magnitude of the delay wave is larger than that of the preceding wave, the absolute values of the tap coefficients in the FB section also increases and hence the FFR is decreased. Further, the MSE11 is also decreased. That is, when the magnitude of the delay wave is small, the probability of selecting the equalized output produced from the linear adaptive equalizer 57 is rendered high. Further, when the magnitude of the delay wave is large, the probability of selecting the equalized output produced from the decision feedback adaptive equalizer 56 is made high.

In S503, the linear adaptive equalizer 57 estimates characteristics of a channel using UW11 as described in the paragraphs of the operation of the equalizer shown in FIG. 15 so as to converge tap coefficients. Next, the linear adaptive equalizer 57 equalizes random data 12. The linear adaptive equalizer 57 outputs the error signal given by the equation 4 to the equalized square error integrating circuit 59 upon equalizing the random data 12. Further, the linear adaptive equalizer 57 outputs the result of equalization of the random data 12 to the equalized-output memory 63. The equalized square error integrating circuit 59 squares error values outputted upon equalizing the random data 12 by the linear adaptive equalizer 57 and thereafter calculates the sum SE2 of the squared error values corresponding to one burst. Further, the equalized square error integrating circuit 59 outputs the result of calculation to the equalized square error averaging circuit 60 and the comparator 65. The equalized square error averaging circuit 60 divides the SE2 by the number of symbols in the random data 12 to thereby calculate the mean MSE2 and outputs it to the comparator 61.

Similar to the MSE1 determined in S502, the value MSE2 also becomes large as the signal-to-noise ratio of the channel becomes small.

In S504, the comparator 61 compares the threshold value MSE11 and the mean MSE2. If MSE2<MSE11, then the comparator 61 outputs the signal for selecting the linear adaptive equalizer to the comparator 65. If MSE2≧MSE11, then the comparator 61 outputs the selection hold signal to each of the comparator 65 and the decision feedback adaptive equalizer 56.

If MSE2<MSE11, then the comparator 65 outputs a control signal for connecting the output selector switch 48 with the equalized-output memory 63 to the output selector switch 48 in S505. After the output selector switch 48 has been electrically connected to the equalized-output memory 63, the equalized-output memory 63 outputs the result of equalization stored therein in response to the control signal supplied from the comparator 65 as a final equalized output.

If MSE2≧MSE11, then the decision feedback adaptive equalizer 56 effects an equalization on the random data 12 in response to the selection hold signal outputted from the comparator 61 in S506. Next, the decision feedback adaptive equalizer 56 outputs error values to the equalized square error integrating circuit 64 upon equalizing the random data 12. Further, the decision feedback adaptive equalizer 56 outputs the result of equalization about the random data 12 to the equalized-output memory 62. The equalized square error integrating circuit 64 squares the error values given by the equation (4), which have been outputted upon equalization of the random data 12 by the decision feedback adaptive equalizer 56 and thereafter calculates the sum SE3 of the squared error values corresponding to one burst. Next, the decision feedback adaptive equalizer 56 outputs the result of calculation to the comparator 65.

In S507, the comparator 65 compares the result SE3 outputted from the equalized square error integrating circuit 64 and the previously inputted SE2. If SE2<SE3, it is then considered that the linear adaptive equalizer 57 which shows better performance than the decision feedback adaptive equalizer 56 with respect to a burst produced when SE2<SE3. Therefore, the comparator 65 outputs a switch control signal for connecting the output selector switch 48 to the equalized-output memory 63 to the output selector switch 48. After the equalized-output memory 63 has been electrically connected to the output selector switch 48, the equalized-output memory 63 outputs the result of equalization stored therein in response to the control signal sent from the comparator 65 as a final equalized output.

In S508, if it is decided by the comparator 65 that SE2≧SE3, it is then considered that the decision feedback adaptive equalizer 56 which shows better performance than the linear adaptive equalizer 57 with respect to a burst produced when SE2≧SE3. Therefore, the comparator 65 outputs a control signal for connecting the output selector switch 48 to the equalized-output memory 62 to the output selector switch 48. After the output selector switch 48 has been electrically connected to the equalized-output memory 62, the equalized-output memory 62 outputs the result of equalization stored therein, as a final equalized output therefrom in response to the control signal sent from the comparator 65.

Incidentally, the third embodiment shows the case where the threshold-value setting circuit 58 determines the ratio FFR of the sum of the absolute values of the tap coefficients in the FF section to the sum of the absolute values of those in the FB section based on the tap coefficient values outputted from the decision feedback adaptive equalizer 56. However, this FFR may be set as the ratio of the sum of square values of the tap coefficients in the FF section to the sum of square values of the tap coefficients in the FB section.

Further, the third embodiment shows the case where the threshold-value setting circuit 58 calculates the ratio FFR of the sum of the absolute values of the tap coefficients in the FF section to the sum of the absolute values of those in the FB section based on the tap coefficient values outputted thereto from the decision feedback adaptive equalizer 56. However, the FFR may be set equal to 1 (i.e., FFR=1) without this calculation.

Fourth embodiment

Figure 6:
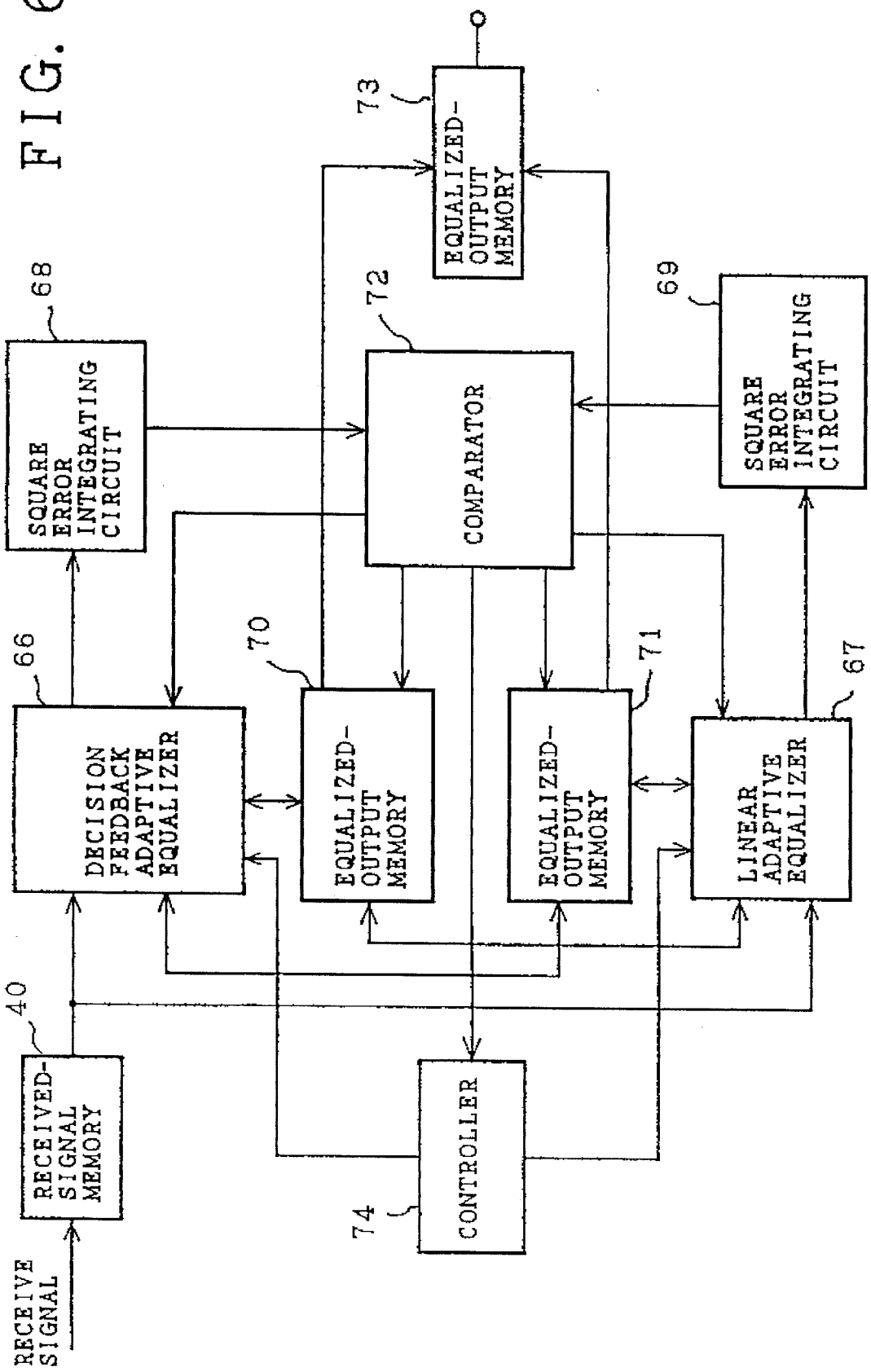
FIG. 6 is a block diagram showing the structure of an adaptive equalizer according to a fourth embodiment of the present invention.

FIG. 6 is a block diagram showing the structure of an adaptive equalizer according to the fourth embodiment of the present invention. In the drawing, the same elements of structure as those employed in the conventional example are identified by the same reference numerals and their description will therefore be omitted.

In FIG. 6, reference numeral 66 indicates a decision feedback adaptive equalizer for reading a receive or input signal from a received-signal memory 40 so as to equalize UW11, thereafter resetting tap coefficients based on a control signal sent from the outside and equalizing random data 12, reference numeral 67 indicates a linear adaptive equalizer for reading a receive signal from the received-signal memory 40 so as to equalize UW11, thereafter resetting tap coefficients based on a control signal sent from the outside and equalizing random data 12, reference numeral 68 indicates an equalized square error integrating circuit for integrating equalized square errors outputted from the decision feedback adaptive equalizer 66, reference numeral 69 indicates an equalized square error integrating circuit for integrating equalized square errors outputted from the linear adaptive equalizer 67, reference numeral 70 indicates an equalized-output memory for storing an equalized output produced from the decision feedback adaptive equalizer 66 therein, reference numeral 71 indicates an equalized-output memory for storing an equalized output produced from the linear adaptive equalizer 67, reference numeral 72 indicates a comparator for comparing the magnitude of an output produced from the equalized square error integrating circuit 68 and that of an output produced from the equalized square error integrating circuit 69 and outputting the result of comparison to each of the equalized-output memory 70, the equalized-output memory 71 and a controller 74, reference numeral 73 indicates an equalized-output memory for storing data outputted from each of the equalized-output memory 70 and the equalized-output memory 71 therein by one burst and thereafter outputting it therefrom, and reference numeral 74 indicates a controller for controlling the operation of the decision feedback adaptive equalizer 66 and that of the linear adaptive equalizer 67.

Operation of the adaptive equalizer shown in FIG. 6 will be described.

Figure 7B:
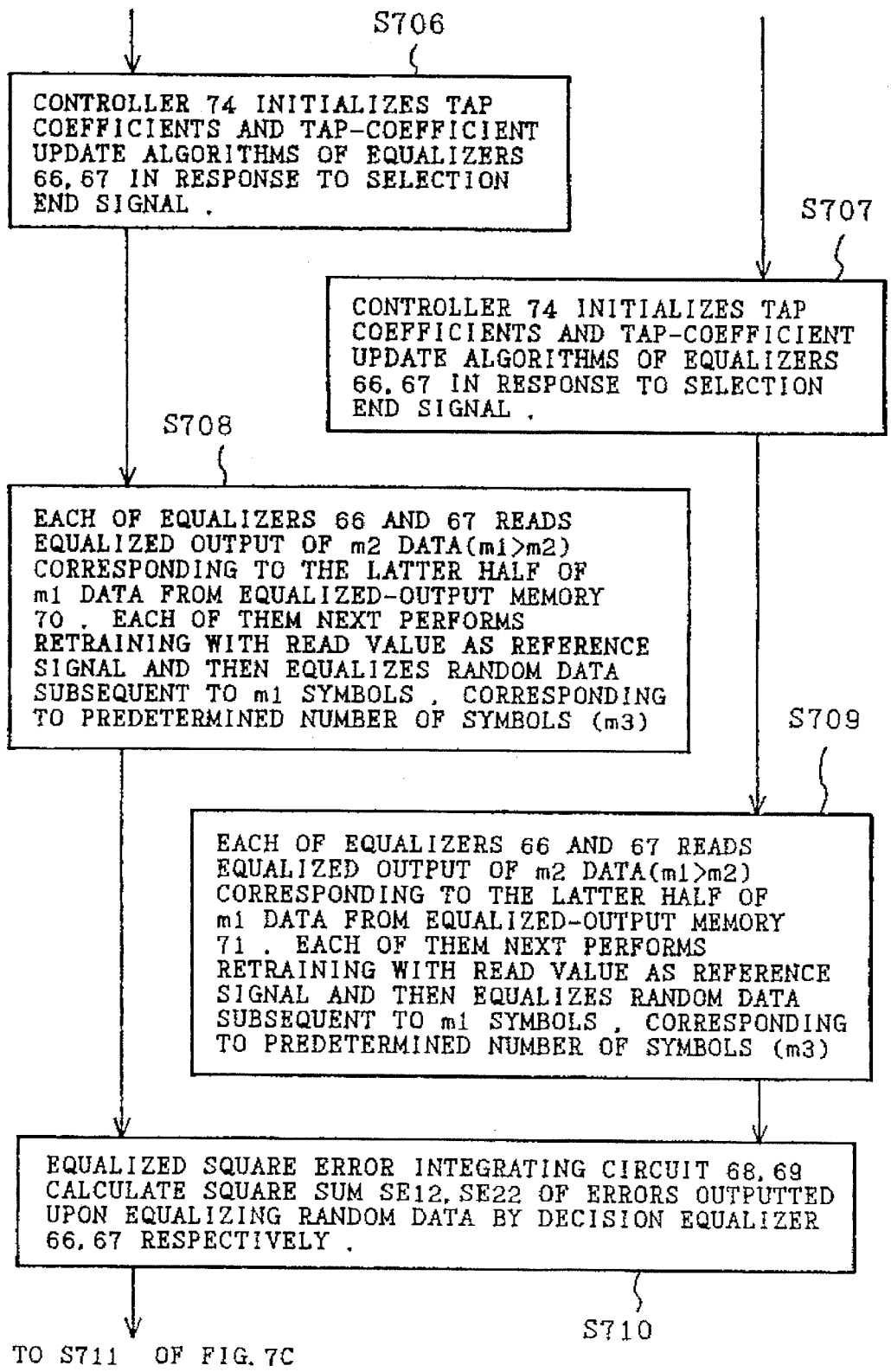
Figure 7C:
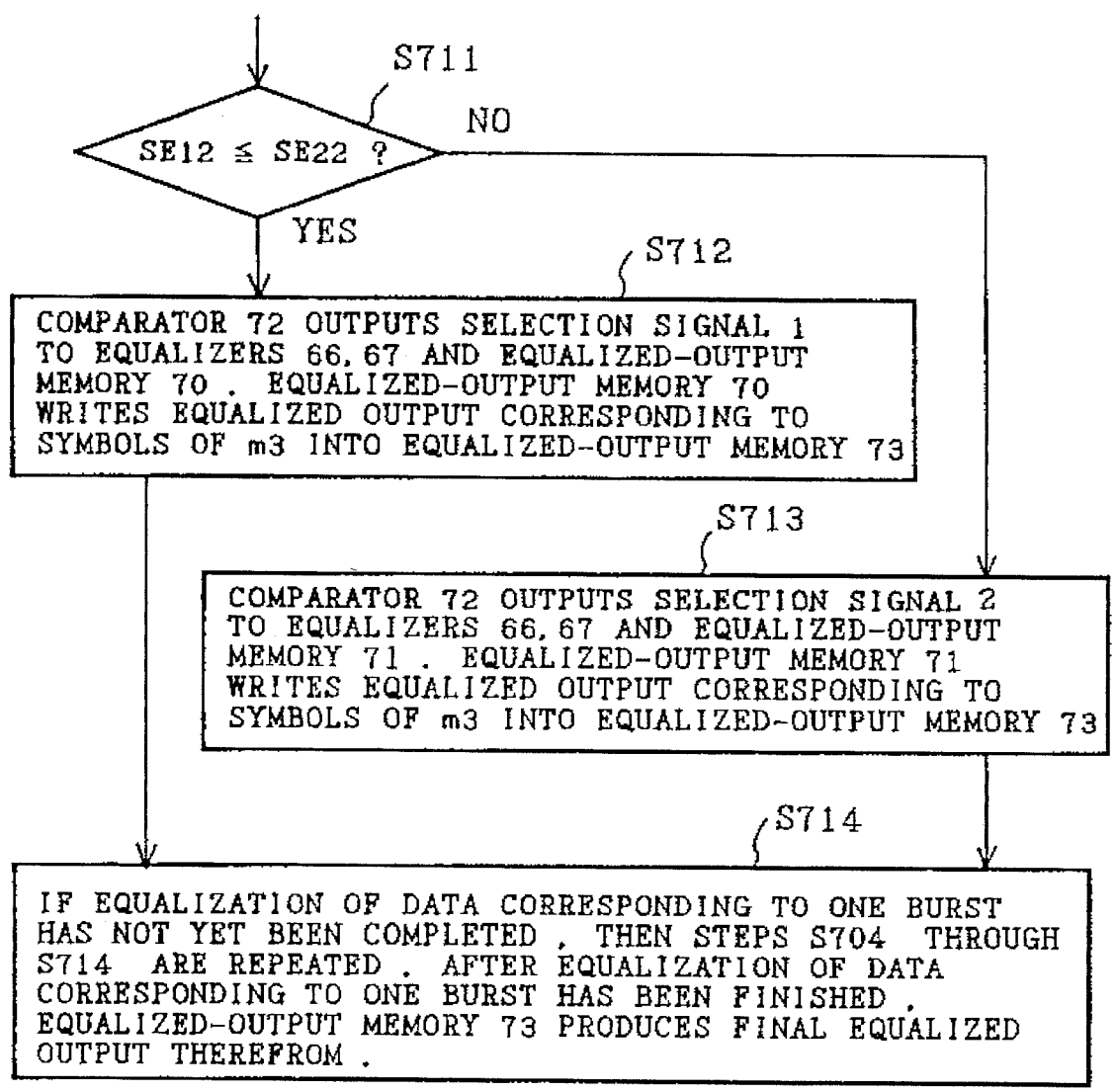
Figure 8:
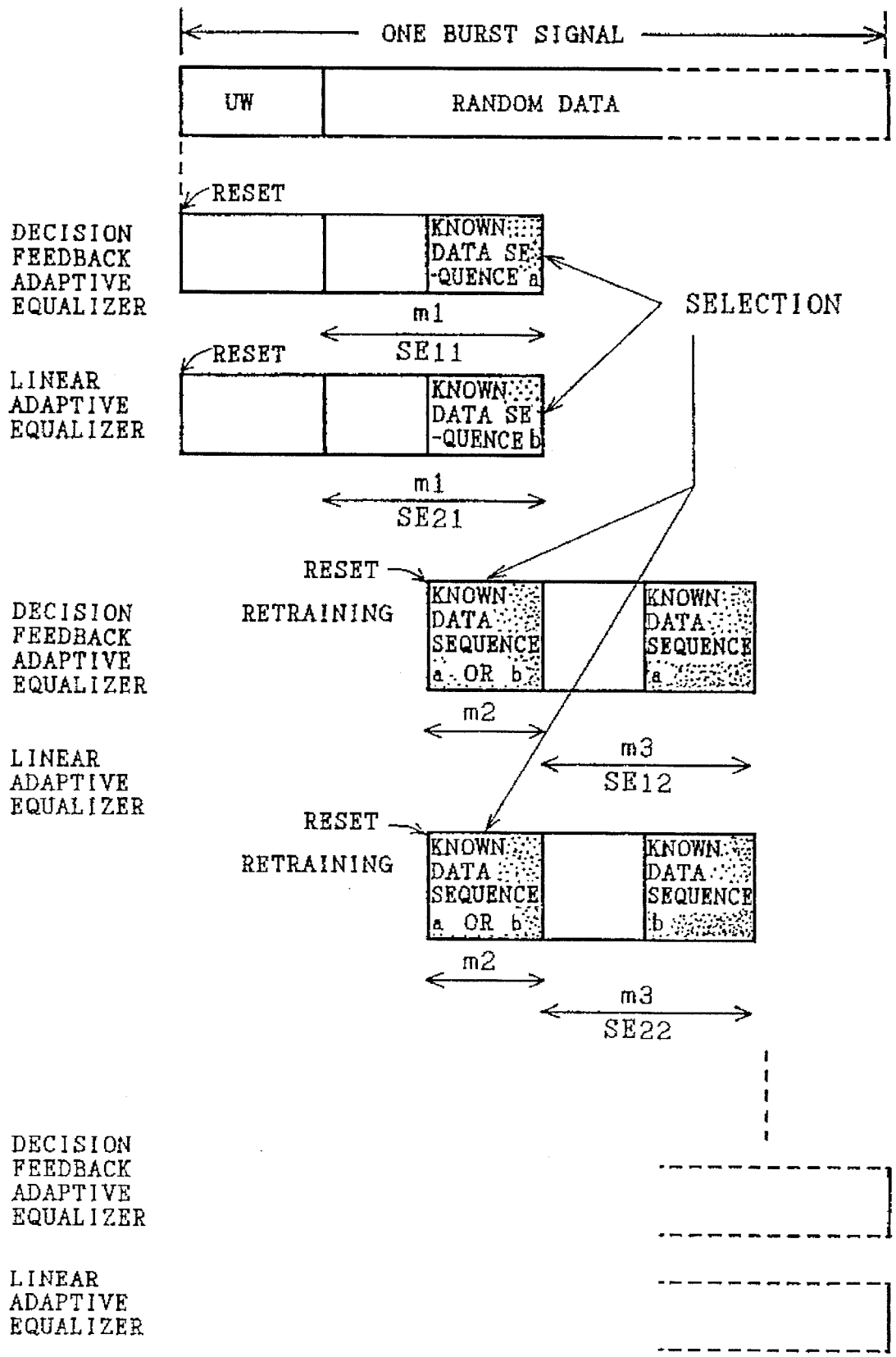
FIG. 8 is a view for describing the operation of the adaptive equalizer shown in FIG. 6.

FIGS. 7A-7C are a flow chart for describing the operation of the adaptive equalizer shown in FIG. 6. FIG. 8 is a view for explaining the operation of the adaptive equalizer shown in FIG. 6.

In S701, the decision feedback adaptive equalizer 66 reads data from the received-signal memory 40 and estimates characteristics of a channel using the UW11 to thereby converge the tap coefficients. Next, the decision feedback adaptive equalizer 66 equalizes the random data 12 corresponding to a predetermined number of symbols (m1). Further, the decision feedback adaptive equalizer 66 outputs the error values expressed by the equation (4) to the equalized square error integrating circuit 68 upon equalization of the random data 12. Thereafter, the decision feedback adaptive equalizer 66 outputs the result of equalization of the random data m1 to the equalized-output memory 70. Similarly, the linear adaptive equalizer 67 reads data from the received-signal memory 40 and estimates characteristics of a channel using UW11 to converge tap coefficients. Next, the linear adaptive equalizer 67 equalizes random data 12 corresponding to a predetermined number of symbols (m1). Thereafter, the linear adaptive equalizer 67 outputs the error values expressed by the equation 4 to the equalized square error integrating circuit 69 upon equalization of the random data 12. Further, the linear adaptive equalizer 67 outputs the result of equalization of the random data m1 to the equalized-output memory 71.

In S702, the equalized square error integrating circuit 68 brings m1 error values outputted upon equalization of the random data by the decision feedback adaptive equalizer 66 to a square and thereafter calculates the sum SE11 of the squared error values. Next, the equalized square error integrating circuit 68 outputs the result of calculation to the comparator 72.

The equalized square error integrating circuit 69 brings m1 error values outputted upon equalization of the random data by the linear adaptive equalizer 67 to a square and thereafter calculates the sum SE21 of the squared error values. Next, the equalized square error integrating circuit 69 outputs the result of calculation to the comparator 72.

In S703, the comparator 72 compares the SE11 and the SE21.

If SE11≦SE21, then the comparator 72 outputs a selection signal 1 to each of the decision feedback adaptive equalizer 66, the linear adaptive equalizer 67, the equalized-output memory 70 and the equalized-output memory 71 in S704. Further, the comparator 72 send a selection end signal to the controller 74. The equalized-output memory 70 writes an equalized output corresponding to m1 symbols into the equalized-output memory 73 when it has received the selection signal 1.

If SE11>SE21, then the comparator 72 outputs a selection signal 2 to each of the decision feedback adaptive equalizer 66, the linear adaptive equalizer 67, the equalized-output memory 70 and the equalized-output memory 71 in S705. Further, the comparator 72 outputs a selection end signal to the controller 74. When the selection signal 2 is received by the equalized-output memory 71, the equalized-output memory 71 writes an equalized output corresponding to m1 symbols into the equalized-output memory 73.

After the selection end signal has been received by the controller 74, the controller 74 initializes tap coefficients and tap-coefficient update algorithms for the decision feedback adaptive equalizer 66 and the linear adaptive equalizer 67 in S706 and S707.

In S708, the decision feedback adaptive equalizer 66 reads an equalized output of m2 (m1>m2) corresponding to the latter half of a series of m1 data from the equalized-output memory 70 when the decision feedback adaptive equalizer 66 receives the selection signal 1 after completion of the above initialization. Next, the decision feedback adaptive equalizer 66 estimates the characteristics of the channel with the equalized output as a reference signal to thereby converge the tap coefficients. Thereafter, the decision feedback adaptive equalizer 66 equalizes random data subsequent to the m1 symbols, corresponding to a predetermined number of symbols (m3). Similarly, the linear adaptive equalizer 67 reads the equalized output of m2 (m1>m2) corresponding to the latter half of the series of m1 data from the equalized-output memory 70 when the linear adaptive equalizer 67 receives the selection signal 1 after completion of the above initialization. Next, the linear adaptive equalizer 67 estimates the characteristics of the channel with the equalized output as the reference signal to converge the tap coefficients. Thereafter, the linear adaptive equalizer 67 equalizes the random data subsequent to the m1 symbols, corresponding to the predetermined number of symbols (m3).

In S709, the decision feedback adaptive equalizer 66 reads an equalized output of m2 (m1>m2) corresponding to the latter half of a series of m1 data from the equalized-output memory 71 when the decision feedback adaptive equalizer 66 receives the selection signal 2 after completion of the above initialization. Next, the decision feedback adaptive equalizer 66 estimates the characteristics of the channel with the equalized output as the reference signal to converge the tap coefficients. Thereafter, the decision feedback adaptive equalizer 66 equalizes the random data subsequent to the m1 symbols, corresponding to the predetermined number of symbols (m3). Similarly, the linear adaptive equalizer 67 reads the equalized output of m2 (m1>m2) corresponding to the latter half of the series of m1 data from the equalized-output memory 71 when the linear adaptive equalizer 67 receives the selection signal 2 after completion of the above initialization. Next, the linear adaptive equalizer 67 estimates the characteristics of the channel with the equalized output as the reference signal to converge the tap coefficients. Thereafter, the linear adaptive equalizer 67 equalizes the random data subsequent to the m1 symbols, corresponding to the predetermined number of symbols (m3).

In S710, the equalized square error integrating circuit 68 squares m3 error values, which have been outputted upon equalizing the random data by the decision feedback adaptive equalizer 66 and thereafter calculates the sum SE12 of the squared error values. Next, the equalized square error integrating circuit 68 outputs the result of calculation to the comparator 72.

Similarly, the equalized square error integrating circuit 69 also squares m3 error values, which have been outputted upon equalizing the random data by the linear adaptive equalizer 67 in S708 and S709 and thereafter calculates the sum SE22 of the squared error values. Next, the equalized square error integrating circuit 69 outputs the result of calculation to the comparator 72.

In S711, the comparator 72 compares the SE12 and the SE22.

If SE12≦SE22, then the comparator 72 outputs the selection signal 1 to each of the decision feedback adaptive equalizer 66, the linear adaptive equalizer 67, the equalized-output memory 70 and the equalized-output memory 71 in S712. When the equalized-output memory 70 receives the selection signal 1, the equalized-output memory 70 writes an equalized output corresponding to m3 symbols into the equalized-output memory 73.

If SE12>SE22, then the comparator 72 outputs the selection signal 2 to each of the decision feedback adaptive equalizer 66, the linear adaptive equalizer 67, the equalized-output memory 70 and the equalized-output memory 71 in S713. When the selection signal 2 is received by the equalized-output memory 71, the equalized-output memory 71 writes an equalized output corresponding to m3 symbols into the equalized-output memory 73. The comparator 72 outputs a comparison end signal to the controller 74.

If the equalization of the data corresponding to the one burst has not yet been completed, then the routine operations of S706 through S713 are repeated and after the equalization of the data corresponding to the one burst has been finished, the equalized-output memory 73 produces a final equalized output therefrom in S714.

Fifth embodiment

Figure 9:
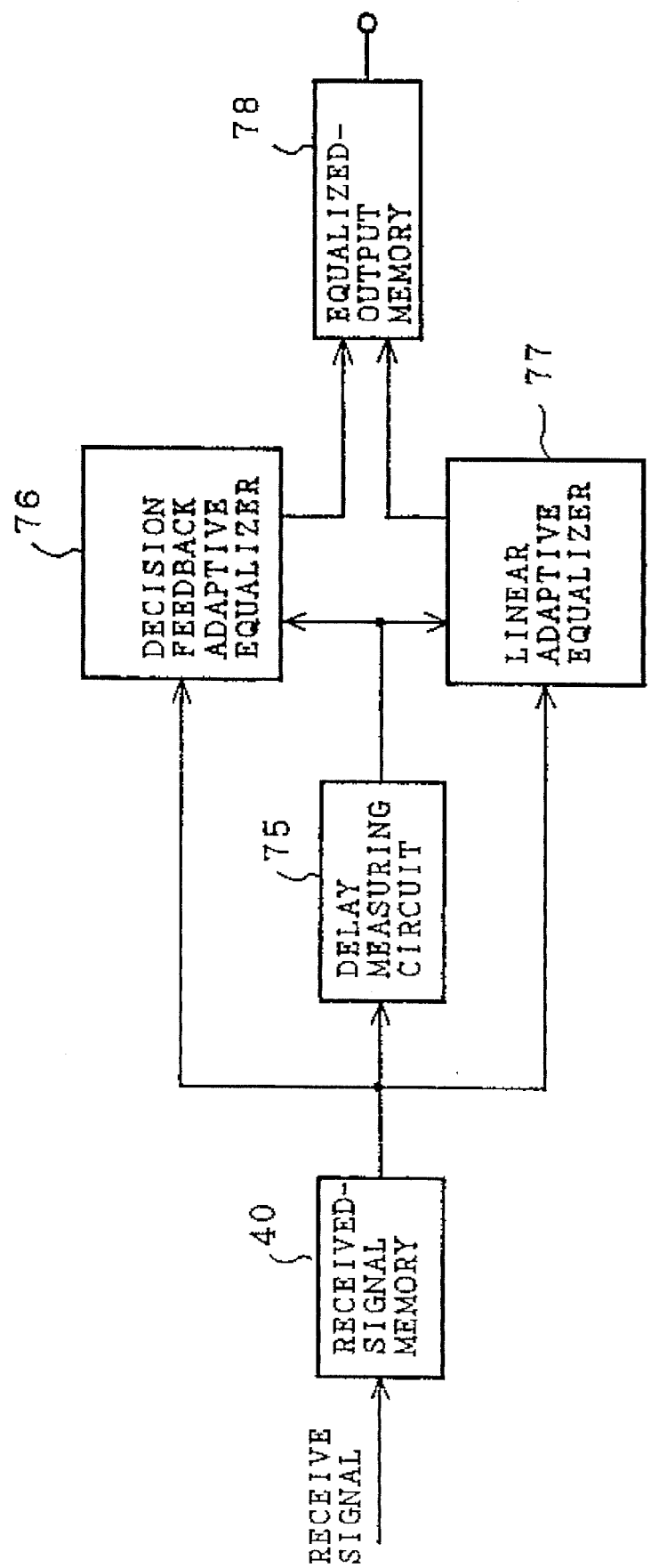
FIG. 9 is a block diagram showing the structure of an adaptive equalizer according to a fifth embodiment of the present invention.

FIG. 9 is a block diagram showing the structure of an adaptive equalizer according to the fifth embodiment of the present invention. In the drawing, the same elements of structure as those employed in the conventional example are identified by the same reference numerals and their description will therefore be omitted. In FIG. 9, reference numeral 40 indicates a received-signal memory for storing a receive signal corresponding to one burst therein, reference numeral 75 indicates a delay measuring circuit for reading the receive signal from the received-signal memory 40 and for measuring a multipath propagation characteristic on a channel and outputting a control signal therefrom, reference numeral 76 indicates a decision feedback adaptive equalizer for reading the receive signal from the received-signal memory 40 in response to the control signal supplied from the delay measuring circuit 75 and equalizing it, reference numeral 77 indicates a linear adaptive equalizer for reading the receive signal from the received-signal memory 40 in response to the control signal produced from the delay measuring circuit 75 and equalizing it, and reference numeral 78 indicates an equalized-output memory for storing therein either an equalized output produced from the decision feedback equalizer 76 or an equalized output produced from the linear adaptive equalizer 77.

Operation of the adaptive equalizer shown in FIG. 9 will be described.

The received-signal memory 40 stores the receive signal therein. The delay measuring circuit 75 comprises a correlator for outputting a value indicative of a relationship between UW and an input signal and a control signal output circuit for outputting the control signal to each of the decision feedback adaptive equalizer 76 and the linear adaptive equalizer 77 based on the output produced from the correlator. The delay measuring circuit 75 reads received data corresponding to UW11 from the received-signal memory 40 and correlates the UW to the input signal at the correlator. The correlation value, which is outputted from the correlator, becomes large at the input signal which corresponds to direct wave or delayed wave or both waves. Based on the correlation value, the control signal output circuit makes a decision as to whether either one of the decision feedback adaptive equalizer 76 and the linear adaptive equalizer 77 should be operated with respect to its burst depending on the ratio of the value of the direct wave of the correlator to that of the delay wave thereof and the maximum delay time of the delay wave. As a criterion for this decision, there is a method of activating the linear adaptive equalizer 77 if the maximum delay time of the delay wave is less than or equal to 0.35 symbol and activating the decision feedback adaptive equalizer 76 if the maximum delay time is more than or equal to 0.35 symbol, both using the result of a bit error rate shown in FIG. 2. After the adaptive equalizer to be operated has been decided, the delay measuring circuit 75 outputs the control signal to the decision feedback adaptive equalizer 76 when the decision feedback adaptive equalizer 76 is activated, whereas the delay measuring circuit 75 outputs the control signal to the linear adaptive equalizer 77 when the linear adaptive equalizer 77 is activated.

When the decision feedback adaptive equalizer 76 receives the control signal from the delay measuring circuit 75, the decision feedback adaptive equalizer 76 reads data from the received-signal memory 40 and estimates characteristics of a channel using UW11 as described in the paragraphs of the operation of the equalizer shown in FIG. 15 to thereby converge tap coefficients. Next, the decision feedback adaptive equalizer 76 effects an equalization on random data 12. Further, the decision feedback adaptive equalizer 76 outputs the result of equalization of the random data 12 to the equalized-output memory 78.

When the linear adaptive equalizer 77 receives the control signal from the delay measuring circuit 75, the linear adaptive equalizer 77 reads data from the received-signal memory 40 and estimates characteristics of a channel using UW11 as described in the paragraph of the operation of the equalizer shown in FIG. 15 to thereby converge tap coefficients. Next, the linear adaptive equalizer 77 equalizes random data 12. Thereafter, the linear adaptive equalizer 77 outputs the result of equalization of the random data 12 to the equalized-output memory 78.

The equalized-output memory 78 outputs the result of equalization stored therein, as a final equalized output.

Sixth embodiment

Figure 10:
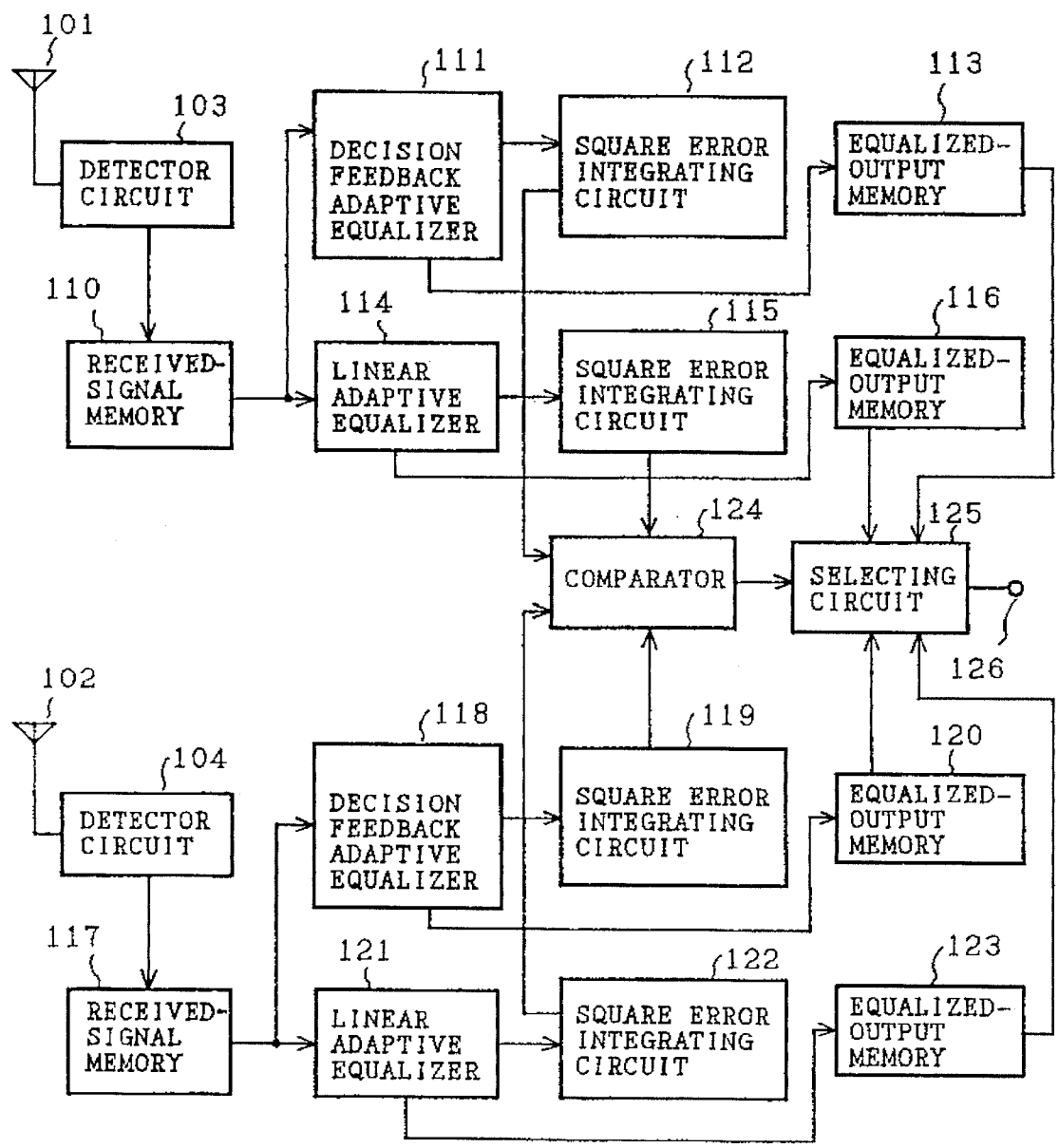
FIG. 10 is a block diagram illustrating the structure of an adaptive equalizer according to a sixth embodiment of the present invention.

FIG. 10 is a block diagram showing the structure of the sixth embodiment of the present invention. In the drawing, the same elements of structure as those employed in the conventional example are identified by the same reference numerals and their description will therefore be omitted. In FIG. 10, reference numeral 110 indicates a received-signal memory for storing a signal received by antenna 101 and converted into a baseband signal by detector circuit 103 therein by one burst, reference numeral 111 denotes a decision feedback adaptive equalizer for reading the signal from the received-signal memory 110 and for equalizing it, reference numeral 112 indicates an equalized square error integrating circuit for integrating equalized square errors produced from the decision feedback adaptive equalizer 111, reference numeral 113 indicates an equalized-output memory for storing an equalized output produced from the decision feedback adaptive equalizer 111 therein, reference numeral 114 indicates a linear adaptive equalizer for reading the signal from the received-signal memory 110 and for equalizing it, reference numeral 115 indicates an equalized square error integrating circuit for integrating equalized square errors produced from the linear adaptive equalizer 114, reference numeral 116 indicates an equalized-output memory for storing an equalized output produced from the linear adaptive equalizer 114 therein, reference numeral 117 indicates a received-signal memory for storing a signal received by antenna 102 and converted into a baseband signal by detector circuit 104 therein by one burst, reference numeral 118 indicates a decision feedback adaptive equalizer for reading the signal from the received-signal memory 117 and for equalizing it, reference numeral 119 indicates an equalized square error integrating circuit for integrating equalized square errors produced from the decision feedback adaptive equalizer 118, reference numeral 120 indicates an equalized-output memory for storing an equalized output produced from the decision feedback adaptive equalizer 118 therein, reference numeral 121 indicates a linear adaptive equalizer for reading the signal from the received-signal memory 117 and for equalizing it, reference numeral 122 indicates an equalized square error integrating circuit for integrating equalized square errors produced from the linear adaptive equalizer 121, reference numeral 123 indicates an equalized-output memory for storing an equalized output produced from the linear adaptive equalizer 121 therein, reference numeral 124 indicates a comparator for comparing outputs respectively produced from the equalized square error integrating circuit 112, the equalized square error integrating circuit 115, the equalized square error integrating circuit 119 and the equalized square error integrating circuit 122 and outputting the result of comparison as an output control signal therefrom, reference numeral 125 indicates a selecting circuit for selecting either one of the equalized outputs produced from the equalized-output memory 113, the equalized-output memory 116, the equalized-output memory 120 and the equalized-output memory 123, and reference numeral 125 indicates an equalize output terminal.

Operation of the adaptive diversity equalizer shown in FIG. 10 will be described.

The received-signal memory 110 stores the signal received by the antenna 101 and converted into the baseband signal by the detector circuit 103 therein by the one burst. The decision feedback adaptive equalizer 111 reads data from the received-signal memory 110 and estimates characteristics of a channel using UW11 as described in the paragraphs of the operation of the equalizer shown in FIG. 15 to converge tap coefficients. Next, the decision feedback adaptive equalizer 111 equalizes random data 12. Further, the decision feedback adaptive equalizer 111 outputs the error values given by the equation (4) to the equalized square error integrating circuit 112 upon equalization of the random data 12. Moreover, the decision feedback adaptive equalizer 111 outputs the result of equalization of the random data 12 to the equalized-output memory 112.

The linear adaptive equalizer 114 reads data from the received-signal memory 110 and estimates characteristics of a channel using UW11 as described in the paragraph of the operation of the equalizer shown in FIG. 15 to converge tap coefficients. Next, the linear adaptive equalizer 114 equalizes random data 12. Further, the linear adaptive equalizer 114 outputs the error signal expressed by the equation (4) to the equalized square error integrating circuit 115 upon equalizing the random data 12. Moreover, the linear adaptive equalizer 114 outputs the result of equalization of the random data 12 to the equalized-output memory 116.

The received-signal memory 117 stores the signal received by the antenna 102 and converted into the baseband signal by the detector circuit 104 therein by the one burst. The decision feedback adaptive equalizer 118 reads data from the received-signal memory 117 and estimates characteristics of a channel using UW11 as described in the paragraphs of the operation of the equalizer shown in FIG. 15 to converge tap coefficients. Next, the decision feedback adaptive equalizer 118 equalizes random data 12. Further, the decision feedback adaptive equalizer 118 outputs the error values given by the equation (4) to the equalized square error integrating circuit 119 upon equalization of the random data 12. Moreover, the decision feedback adaptive equalizer 118 outputs the result of equalization about the random data 12 to the equalized-output memory 120.

The linear adaptive equalizer 121 reads data from the received-signal memory 117 and estimates characteristics of a channel using UW11 as described in the paragraph of the operation of the equalizer shown in FIG. 15 to converge tap coefficients. Next, the linear adaptive equalizer 121 equalizes random data 12. Further, the linear adaptive equalizer 121 outputs the error signal expressed by the equation (4) to the equalized square error integrating circuit 122 upon equalizing the random data 12. Moreover, the linear adaptive equalizer 121 outputs the result of equalization of the random data 12 to the equalized-output memory 123.

The equalized square error integrating circuit 112 squares error values outputted upon equalizing the random data 12 by the decision feedback adaptive equalizer 111 and thereafter calculates the sum of the squared error values corresponding to one burst. Next, the equalized square error integrating circuit 112 outputs the result of calculation to the comparator 124.

The equalized square error integrating circuit 115 squares error values outputted upon equalizing the random data 12 by the linear adaptive equalizer 114 and thereafter calculates the sum of the squared error values corresponding to one burst. Next, the equalized square error integrating circuit 115 outputs the result of calculation to the comparator 124.

The equalized square error integrating circuit 119 squares error values outputted upon equalizing the random data 12 by the decision feedback adaptive equalizer 118 and thereafter calculates the sum of the squared error values corresponding to one burst. Next, the equalized square error integrating circuit 119 outputs the result of calculation to the comparator 124.

The equalized square error integrating circuit 122 squares error values outputted upon equalizing the random data 12 by the linear adaptive equalizer 121 and thereafter calculates the sum of the squared error values corresponding to one burst. Next, the equalized square error integrating circuit 122 outputs the result of calculation to the comparator 124.

The comparator 124 compares the results outputted from the equalized square error integrating circuit 112, the equalized square error integrating circuit 115, the equalized square error integrating circuit 119 and the equalized square error integrating circuit 122. Next, the comparator 124 selects the adaptive equalizer which is considered to have the minimum sum of equalized square errors, i.e., to have the best performance with respect to its burst. Thereafter, the comparator 124 outputs the result of selection to the selecting circuit 125.

The selecting circuit 125 selects a final equalized output from the equalized outputs stored in the equalized-output memory 113, the equalized-output memory 116, the equalized-output memory 120 and the equalized-output memory 123 in accordance with the result outputted from the comparator 124 and outputs it to the equalize output terminal 126.

In the sixth embodiment, the selecting circuit 125 selects one of the outputs stored in the respective memories in accordance with the sum of the equalized square errors in the random data corresponding to one burst. However, the following method may be selected. That is, random data corresponding to one burst is divided into n (n: integer) data and the sums of the equalized square errors respectively produced from the decision feedback adaptive equalizer 111, the linear adaptive equalizer 114, the decision feedback adaptive equalizer 118 and the linear adaptive equalizer 121 are calculated every divided data and compared. Next, the selecting circuit 125 selects one of the equalized outputs for each divided data.

In the sixth embodiment, the selecting circuit 125 selects one of the outputs stored in the respective memories in accordance with the sum of the equalized square errors in the random data corresponding to the one burst. However, the following method may be carried out. That is, the sums of the equalized square errors produced from the decision feedback adaptive equalizer 111, the linear adaptive equalizer 114, the decision feedback adaptive equalizer 118 and the linear adaptive equalizer 121 are calculated with respect to random data corresponding to desired number of bursts and compared. Next, the selecting circuit 125 selects one of the equalized outputs every several bursts.

Seventh embodiment

Figure 11:
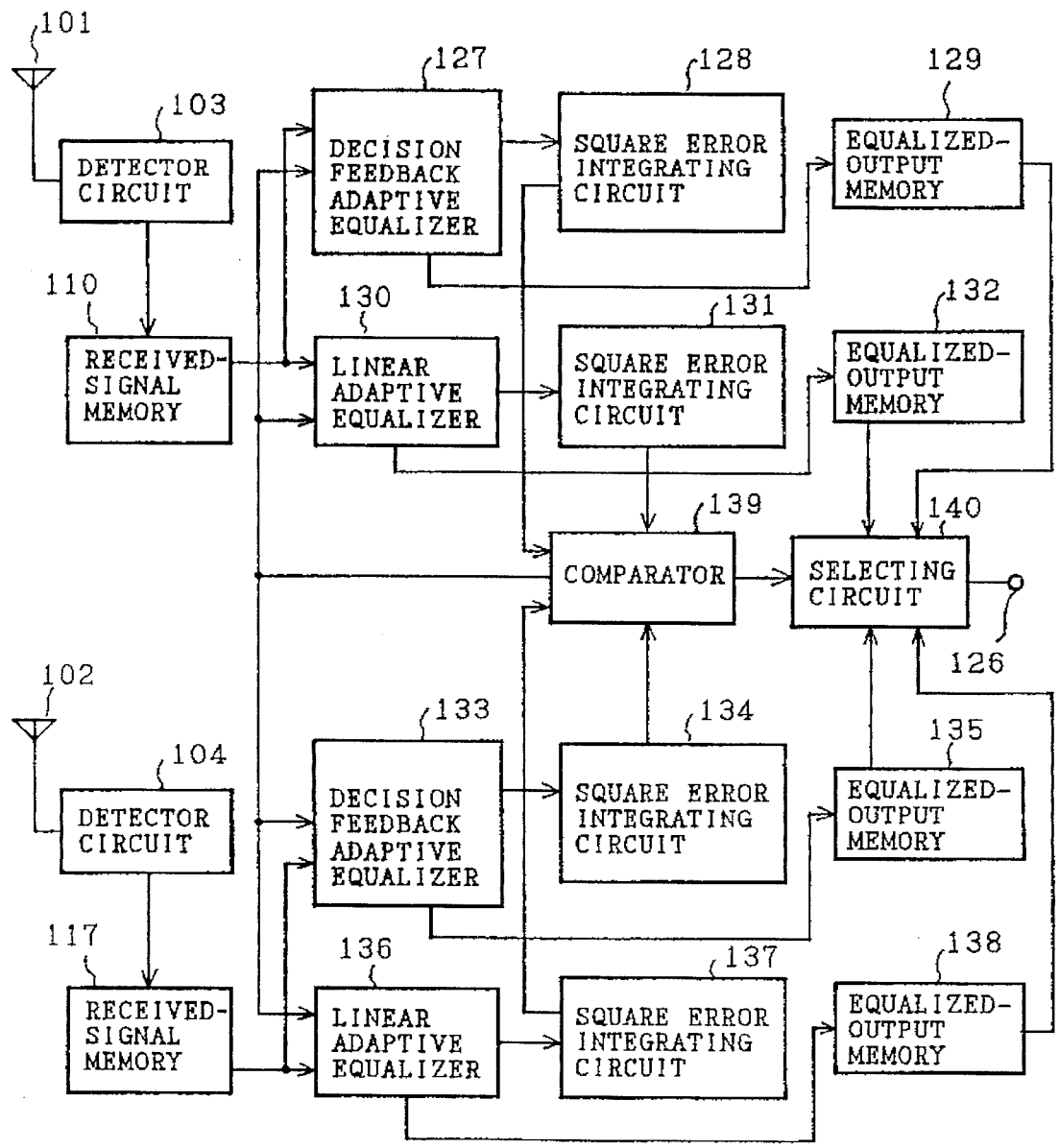
FIG. 11 is a block diagram depicting the structure of an adaptive equalizer according to a seventh embodiment of the present invention.

FIG. 11 is a block diagram showing the structure of an adaptive diversity equalizer according to the seventh embodiment of the present invention. In the drawing, the same elements of structure as those employed in the conventional example and the sixth embodiment are identified by the same reference numerals and their description will therefore be omitted. In FIG. 11, reference numeral 127 indicates a decision feedback adaptive equalizer for reading a receive signal from received-signal memory 110 so as to equalize it and deactivated in response to a control signal supplied from the outside, reference numeral 128 indicates an equalized square error integrating circuit for integrating equalized square errors produced from the decision feedback adaptive equalizer 127, reference numeral 129 indicates an equalized-output memory for storing an equalized output produced from the decision feedback adaptive equalizer 127 therein, reference numeral 130 indicates a linear adaptive equalizer for reading a receive signal from the received-signal memory 110 so as to equalize it and deactivated in response to a control signal supplied from the outside, reference numeral 131 indicates an equalized square error integrating circuit for integrating equalized square errors produced from the linear adaptive equalizer 130, reference numeral 132 indicates an equalized-output memory for storing an equalized output supplied from the linear adaptive equalizer 130 therein, reference numeral 133 indicates a decision feedback adaptive equalizer for reading a receive signal from received-signal memory 117 so as to equalize it and deactivated in response to a control signal sent from the outside, reference numeral 134 indicates an equalized square error integrating circuit for integrating equalized square errors produced from the decision feedback adaptive equalizer 133, reference numeral 135 indicates an equalized-output memory for storing an equalized output supplied from the decision feedback adaptive equalizer 133 therein, reference numeral 136 indicates a linear adaptive equalizer for reading a receive signal from the received-signal memory 117 so as to equalize it and deactivated in response to a control signal sent from the outside, reference numeral 137 indicates an equalized square error integrating circuit for integrating equalized square errors produced from the linear adaptive equalizer 136, reference numeral 138 indicates an equalized-output memory for storing an equalized output produced from the linear adaptive equalizer 136 therein, reference numeral 139 indicates a comparator for comparing outputs respectively produced from the equalized square error integrating circuit 128, the equalized square error integrating circuit 131, the equalized square error integrating circuit 134 and the equalized square error integrating circuit 137 and for outputting the result of comparison therefrom as an output control signal, and reference numeral 140 indicates a selecting circuit for selecting one of the equalized outputs produced from the equalized-output memory 129, the equalized-output memory 132, the equalized-output memory 135 and the equalized-output memory 138 in accordance with the output control signal generated from the comparator 139.

Operation of the adaptive diversity equalizer shown in FIG. 11 will be described.

The received-signal memory 110 stores a signal received by antenna 101 and converted into a baseband signal by detector circuit 103 therein by one burst. The decision feedback adaptive equalizer 127 reads data from the received-signal memory 110 and estimates characteristics of a channel using UW11 as described in the paragraphs of the operation of the equalizer shown in FIG. 15 to converge tap coefficients. Next, the decision feedback adaptive equalizer 127 equalizes random data 12. Further, the decision feedback adaptive equalizer 127 outputs the error values given by the equation 4 to the equalized square error integrating circuit 128 for each symbol upon equalization of the random data 12. Moreover, the decision feedback adaptive equalizer 127 outputs the result of equalization of the random data 12 to the equalized-output memory 129 for each symbol.

The linear adaptive equalizer 130 reads data from the received-signal memory 110 and estimates characteristics of a channel using UW11 as described in the paragraph of the operation of the equalizer shown in FIG. 15 to converge tap coefficients. Next, the linear adaptive equalizer 130 equalizes random data 12. Further, the linear adaptive equalizer 130 outputs the error values expressed by the equation 4 to the equalized square error integrating circuit 131 for each symbol upon equalizing the random data 12. Moreover, the linear adaptive equalizer 130 outputs the result of equalization of the random data 12 to the equalized-output memory 132.

The received-signal memory 117 stores a signal received by antenna 102 and converted into a baseband signal by detector circuit 104 therein by one burst. The decision feedback adaptive equalizer 133 reads data from the received-signal memory 117 and estimates characteristics of a channel using UW11 as described in the paragraphs of the operation of the equalizer shown in FIG. 15 to converge tap coefficients. Next, the decision feedback adaptive equalizer 133 equalizes random data 12. Further, the decision feedback adaptive equalizer 133 outputs the error values given by the equation (4) to the equalized square error integrating circuit 134 for each symbol upon equalization of the random data 12. Moreover, the decision feedback adaptive equalizer 133 outputs the result of equalization of the random data 12 to the equalized-output memory 135 for each symbol.

The linear adaptive equalizer 136 reads data from the received-signal memory 117 and estimates characteristics of a channel using UW11 as described in the paragraphs of the operation of the equalizer shown in FIG. 15 to converge tap coefficients. Next, the linear adaptive equalizer 136 equalizes random data 12. Further, the linear adaptive equalizer 136 outputs the error values given by the equation (4) to the equalized square error integrating circuit 137 for each symbol upon equalizing the random data 12. Moreover, the linear adaptive equalizer 136 outputs the result of equalization of the random data 12 to the equalized-output memory 138 for each symbol.

The equalized square error integrating circuit 128 brings error values outputted upon equalizing the random data 12 by the decision feedback adaptive equalizer 127 to a square and thereafter calculates the sum of the squared error values corresponding to m (m: integer) symbols in the random data. Next, the equalized square error integrating circuit 138 outputs the result of calculation to the comparator 139.

The equalized square error integrating circuit 131 squares individual error values outputted upon equalizing the random data 12 by the linear adaptive equalizer 130 and thereafter calculates the sum of the squared error values corresponding to m (m: integer) symbols in the random data. Next, the equalized square error integrating circuit 131 outputs the result of calculation to the comparator 139.

The equalized square error integrating circuit 134 squares individual error values outputted upon equalizing the random data 12 by the decision feedback adaptive equalizer 133 and thereafter calculates the sum of the squared error values corresponding to m (m: integer) symbols in the random data. Next, the equalized square error integrating circuit 134 outputs the result of calculation to the comparator 139.

The equalized square error integrating circuit 137 squares error values outputted upon equalizing the random data 12 by the linear adaptive equalizer 136 and thereafter calculates the sum of the squared error values corresponding to m (m: integer) symbols in the random data. Next, the equalized square error integrating circuit 137 outputs the result of calculation to the comparator 139.

The comparator 139 compares the results outputted from the equalized square error integrating circuit 128, the equalized square error integrating circuit 131, the equalized square error integrating circuit 134 and the equalized square error integrating circuit 137. Next, the comparator 139 selects the adaptive equalizer which is expected to have the minimum sum of equalized square errors, i.e., to have the best performance with respect to its burst. Thereafter, the comparator 124 outputs the result of selection to the selecting circuit 140 and outputs a stop signal to each of the remaining three adaptive equalizers which have not been selected. These adaptive equalizers stop the equalization of the remaining random data corresponding to the same burst in response to the stop signal.

The selecting circuit 140 selects a final equalized output from the equalized outputs stored in the equalized-output memory 129, the equalized-output memory 132, the equalized-output memory 135 and the equalized-output memory 138 in accordance with the result outputted from the comparator 139 and outputs it from the equalize output terminal 126.

Incidentally, the seventh embodiment shows the case where the comparison between the sums of the equalized square errors and their arithmetic stop operation are carried out once for each burst. As an alternative, however, the comparison between the sums of the equalized square errors may be carried out once for each m burst (m=2, 3, 4, . . . ) when an interval between receiving bursts is short and a channel slowly varies.

Eighth embodiment

Figure 12:
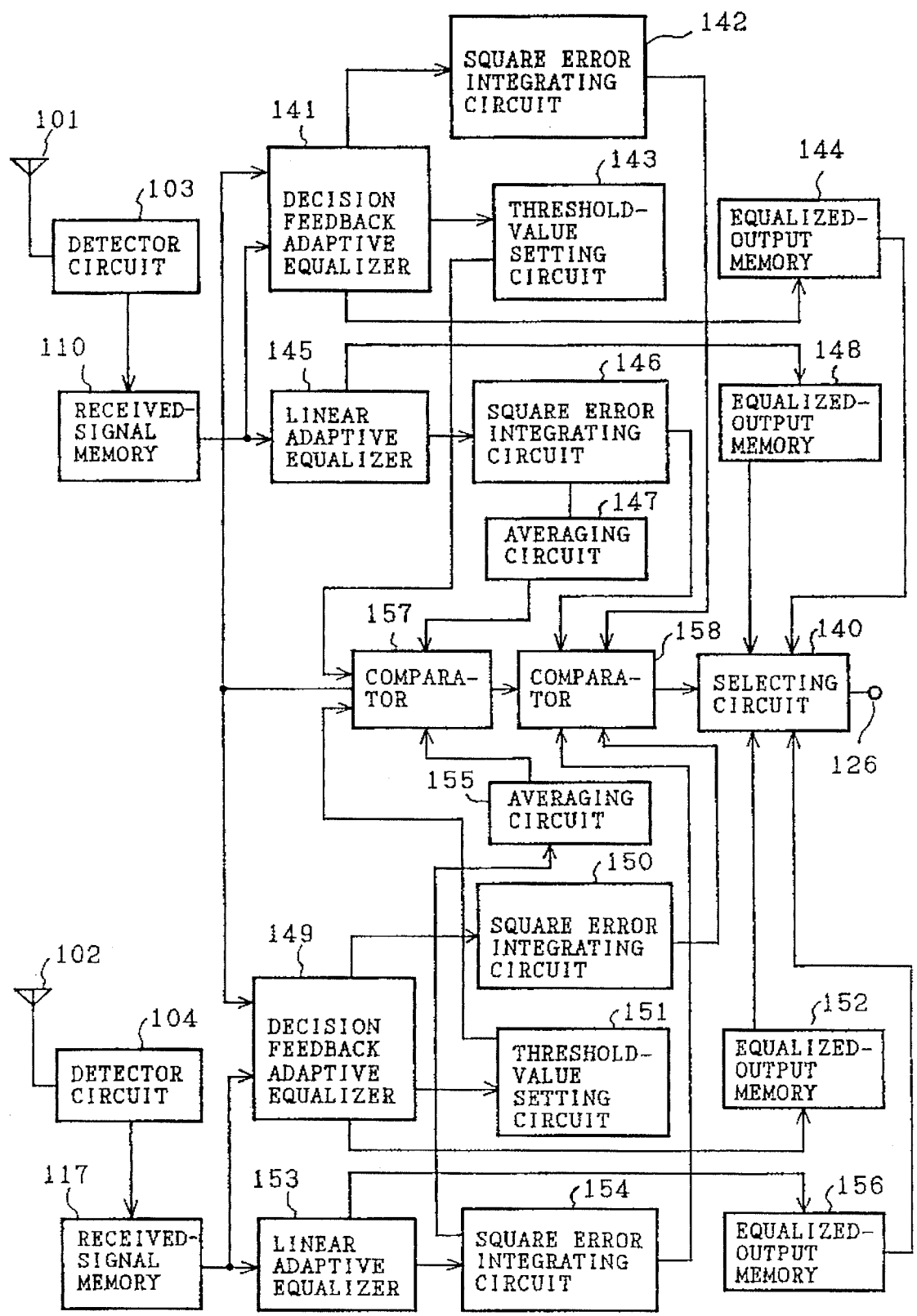
FIG. 12 is a block diagram showing the structure of an adaptive equalizer according to an eighth embodiment of the present invention.

FIG. 12 is a block diagram showing the structure of an adaptive equalizer according to the eighth embodiment of the present invention. In the drawing, the same elements of structure as those employed in the conventional example and the sixth and seventh embodiments are identified by the same reference numerals and their description will therefore be omitted.

In FIG. 12, reference numeral 141 indicates a decision feedback adaptive equalizer for reading a receive signal from a received-signal memory 110 so as to equalize UW11 and thereafter equalizing random data 12 in response to a control signal supplied from the outside, reference numeral 142 indicates an equalized square error integrating circuit for integrating equalized square errors produced from the decision feedback adaptive equalizer 141, reference numeral 143 indicates a threshold-value setting circuit for determining a threshold value based on tap coefficients produced after the equalization of the UW11 by the decision feedback adaptive equalizer 141 and the receive signal corresponding to the UW11, reference numeral 144 indicates an equalized-output memory for storing an equalized output produced from the decision feedback adaptive equalizer 141 therein, reference numeral 145 indicates a linear adaptive equalizer for reading a receive signal from the received-signal memory 110 so as to equalize it, reference numeral 146 indicates an equalized square error integrating circuit for integrating equalized square errors produced from the linear adaptive equalizer 145, reference numeral 147 indicates an equalized square error averaging circuit for averaging the output of the equalized square error integrating circuit 146 by an integrating symbol number, reference numeral 148 indicates an equalized-output memory for storing an equalized output produced from the linear adaptive equalizer 145 therein, reference numeral 149 indicates a decision feedback adaptive equalizer for reading a reception signal from received-signal memory 117 to thereby equalize UW11 and for thereafter equalizing random data 12 in response to a control signal supplied from the outside, reference numeral 150 indicates an equalized square error integrating circuit for integrating equalized square errors produced from the decision feedback adaptive equalizer 149, reference numeral 151 indicates a threshold-value setting circuit for determining a threshold value based on tap coefficients produced after the equalization of the UW11 by the decision feedback adaptive equalizer 149 and the receive signal corresponding to the UW11, reference numeral 152 indicates an equalized output memory for storing an equalized output produced from the decision feedback adaptive equalizer 149 therein, reference numeral 153 indicates a linear adaptive equalizer for reading a receive signal from the received-signal memory 117 so as to effect an equalization thereon, reference numeral 154 indicates an equalized square error integrating circuit for integrating equalized square errors produced from the linear adaptive equalizer 153, reference numeral 155 indicates an equalized square error averaging circuit for averaging the output of the equalized square error integrating circuit 154 by an integrating symbol number, reference numeral 156 indicates an equalized-output memory for storing an equalized output produced from the linear adaptive equalizer 153 therein, reference numeral 157 indicates a comparator for comparing an output produced from the equalized square error integrating circuit 147, an output produced from the equalized square error averaging circuit 155, an output produced from the threshold-value setting circuit 143 and an output produced from the threshold-value setting circuit 151, and reference numeral 158 indicates a comparator for comparing the magnitudes of an output produced from the equalized square error integrating circuit 142, an output produced from the equalized square error integrating circuit 146, an output produced from the equalized square error integrating circuit 150 and an output produced from the equalized square error integrating circuit 154.

Operation of the adaptive equalizer shown in FIG. 12 will be described.

The decision feedback adaptive equalizer 141 estimates characteristics of a channel using UW11 as described in the paragraphs of the operation of the equalizer shown in FIG. 15 to thereby converge tap coefficients. Next, the decision feedback adaptive equalizer 141 reads receiving data corresponding to the UW11 as receiving signals again with the tap coefficients being fixed and computes an inner product for each symbol. Thereafter, the decision feedback adaptive equalizer 141 compute error values between the inner product and the reference signal to thereby determine an error for each symbol. Further, the decision feedback adaptive equalizer 141 outputs the fixed tap coefficients and the error produced for each symbol to the threshold-value setting circuit 143.

The threshold-value setting circuit 143 comprises an integrating circuit a for calculating the sum of absolute values of the fixed tap coefficients in an FF section, an integrating circuit b for calculating the sum of absolute values of tap coefficients in an FB section, a dividing circuit for determining a ratio FFRa of the sum of the absolute values of the tap coefficients in the FF section to the sum of the absolute values of the tap coefficients in the FB section, a square error integrating circuit for squaring errors produced for every symbols to thereby produce the sum of the squared errors, an averaging circuit for averaging the sum of the squared errors to thereby determine MSE1$a$, and a multiplier for multiplying the MSE1$a$ by the FFRa and a suitable constant a to thereby determine MSE11$a$.

The integrating circuit a and the integrating circuit b in the threshold-value setting circuit 143 respectively calculate the following sum SFFa of the absolute values of the tap coefficients in the FF section and the following sum SFBa of the absolute values of the tap coefficients in the FB section. Next, the dividing circuit in the threshold-value setting circuit 143 determines the following ratio FFRa of the sum SFFa to the sum SFBa.

$$SFFa = |C_{1a}(n)| + |C_{2a}(n)| + \ldots + |C_{La}(n)| \quad (17)$$

$$SFBa = |C_{(L+1)a}(n)| + |C_{(L+2)a}(n)| + \ldots + |C_{Ma}(n)| \quad (18)$$

$$FFRa = SFFa/SFBa \quad (19)$$

$C_{ia}(n)$ i=1, 2, ... M: tap coefficients of decision feedback adaptive equalizer 141

Next, the square error integrating circuit and the averaging circuit determine MSE1$a$ representing the mean of the square errors. Further, the multiplier multiplies the MSE1$a$ by the FFRa and the suitable constant a to thereby set the following MSE11$a$ and outputs it to the comparator 157.

$$MSE11a = MSE1a * FFRa * \alpha \quad (20)$$

Now, the FFR is used to perform simple estimattion of the ratio of the magnitude of a preceding wave propagated through the channel to the magnitude of a delay wave. Therefore, when the magnitude of the delay wave is smaller than that of the preceding wave, for example, the absolute values of the tap coefficients in the FB section, which negate an effect produced by the delay wave, also become small and hence the FFRa increases. Further, the MSE11$a$ also increases. On the other hand, when the magnitude of the delay wave is larger than that of the preceding wave, the absolute values of the tap coefficients in the FB section also increase and hence the FFRa is decreased. Further, the MSE11$a$ is also decreased. That is, when the magnitude of the delay wave is small, the probability of selecting the equalized output produced from either the linear adaptive equalizer 145 or the linear adaptive equalizer 153 is rendered high. Further, when the magnitude of the delay wave is large, the probability of selecting the equalized output produced from either the decision feedback adaptive equalizer 141 or the decision feedback adaptive equalizer 149 is made high.

The linear adaptive equalizer 145 estimates characteristics of a channel using UW11 as described in the paragraphs of the operation of the equalizer shown in FIG. 15 to converge tap coefficients. Next, the linear adaptive equalizer 145 equalizes random data 12. The linear adaptive equalizer 145 outputs the error values given by the equation (4) to the equalized square error integrating circuit 146 upon equalizing the random data 12. Further, the linear adaptive equalizer 145 outputs the result of equalization of the random data 12 to the equalized-output memory 148. The equalized square error integrating circuit 146 brings error values outputted upon equalizing the random data 12 by the linear adaptive equalizer 145 to a square and thereafter calculates the sum SE2a of the squared error values corresponding to one burst. Further, the equalized square error integrating circuit 146 outputs the result of calculation to each of the equalized square error averaging circuit 147 and the comparator 158. The equalized square error averaging circuit 147 divides the SE2a by the number of symbols in the random data 12 to thereby calculate the mean MSE2a and outputs it to the comparator 157.

Similar to the MSE1a, the calculated mean MSE2a becomes large as the signal-to-noise of the received signal becomes small.

The decision feedback adaptive equalizer 149 estimates characteristics of a channel using UW11 as described in the paragraphs of the operation of the equalizer shown in FIG. 15 to converge tap coefficients. Next, the decision feedback adaptive equalizer 149 reads receiving input data corresponding to the UW11 as input signals again with the tap coefficients being fixed and computes an inner product for each symbol. Thereafter, the decision feedback adaptive equalizer 149 computes the error values between the inner product and the reference signal to thereby determine an error for each symbol. Further, the decision feedback adaptive equalizer 149 outputs the fixed tap coefficients and the error produced for each symbol to the threshold-value setting circuit 151.

The threshold-value setting circuit 151 comprises an integrating circuit a for calculating the sum of absolute values of the fixed tap coefficients in an FF section, an integrating circuit b for calculating the sum of absolute values of tap coefficients in an FB section, a dividing circuit for determining a ratio FFRb of the sum of the absolute values of the tap coefficients in the FF section to the sum of the absolute values of the tap coefficients in the FB section, a square error integrating circuit for squaring errors produced for each symbol to thereby produce the sum of the squared errors, an averaging circuit for averaging the sum of the squared errors to thereby determine MSE1b, and a multiplier for multiplying the MSE1b by the FFRb and a suitable constant α to thereby determine an MSE11b.

The integrating circuit a and the integrating circuit b in the threshold-value setting circuit 151 respectively calculate the following sum SFFb of the absolute values of the tap coefficients in the FF section and the following sum SFBb of the absolute values of the tap coefficients in the FB section. Next, the dividing circuit in the threshold-value setting circuit 151 determines the following ratio FFRb of the sum SFFb to the sum SFBb.

$$SFFb = |C_{1b}(n)| + |C_{2b}(n)| + \ldots + |C_{Lb}(n)| \quad (21)$$

$$SFBb = |C_{(L+1)b}(n)| + |C_{(L+2)b}(n)| + \ldots + |C_{Mb}(n)| \quad (22)$$

$$FFRb = SFFb/SFBb \quad (23)$$

$C_{ib}(n)$ i=1, 2, ... M: tap coefficients of decision feedback adaptive equalizer 149

Next, the square error integrating circuit and the averaging circuit determine MSE1b representing the mean of the square errors. Further, the multiplier multiplies the MSE1b by the FFRb and the suitable constant a to thereby determine the following MSE11b and outputs it to the comparator 157.

$$MSE11b = MSE1b * FFRb * a \quad (24)$$

The linear adaptive equalizer 153 estimates characteristics of a channel using UW11 as described in the paragraphs of the operation of the equalizer shown in FIG. 15 to converge tap coefficients. Next, the linear adaptive equalizer 153 equalizes random data 12. The linear adaptive equalizer 153 outputs the error values given by the equation (4) to the equalized square error integrating circuit 154 upon equalizing the random data 12. Further, the linear adaptive equalizer 153 outputs the result of equalization of the random data 12 to the equalized-output memory 156. The equalized square error integrating circuit 154 squares error values outputted upon equalizing the random data 12 by the linear adaptive equalizer 153 and thereafter calculates the sum SE2b of the squared error values corresponding to one burst. Further, the equalized square error integrating circuit 154 outputs the result of calculation to each of the equalized square error averaging circuit 155 and the comparator 158. The equalized square error averaging circuit 155 divides the SE2b by the number of symbols in the random data 12 to thereby calculate the mean MSE2b and outputs it to the comparator 157.

Similar to the MSE1b, the calculated mean MSE2b also becomes large as the signal-to-noise of the received signal becomes small.

The comparator 157 compares the threshold value MSE11a, the threshold value MSE11b, the mean MSE2a and the mean MSE2b. When the MSE2a is of the minimum, the comparator 157 outputs a signal for selecting the linear adaptive equalizer 145 to the comparator 158. On the other hand, when the MSE2b is of the minimum, the comparator 157 outputs a signal for selecting the linear adaptive equalizer 153 to the comparator 158. Otherwise, the comparator 157 outputs a selection hold signal to each of the comparator 158, the decision feedback adaptive equalizer 141 and the decision feedback adaptive equalizer 149.

When either the signal for selecting the linear adaptive equalizer 145 or the signal for selecting the linear adaptive equalizer 153 is outputted from the comparator 157, the comparator 158 outputs either the signal for selecting the linear adaptive equalizer 145 or the signal for selecting the linear adaptive equalizer 153 to a selecting circuit 140. The selecting circuit 140 selects a final equalized output from the equalized outputs stored in either the equalized-output memory 148 or the equalized-output memory 156 in response to the selection signal supplied from the comparator 158 and outputs the selected equalized output from an equalize output terminal 126, thereby completing a process effected on its burst.

When either the threshold value MSE11a or the threshold value MSE11b is of the minimum judging from the result of comparison between the threshold value MSE11a, the threshold value MSE11b, the mean MSE2a and the mean MSE2b by the comparator 157, the decision feedback adaptive equalizer 141 equalizes the random data 12 in response to the selection hold signal outputted from the comparator 157. Next, the decision feedback adaptive equalizer 141 outputs error values to the equalized square error integrating circuit 142 upon equalizing the random data 12. Further, the decision feedback adaptive equalizer 141 outputs the result of equalization of the random data 12 to the equalized-output memory 144. Similarly, when either the threshold value MSE11a or the threshold value MSE11b is minimum, the decision feedback adaptive equalizer 149 equalizes random data 12 in response to the selection hold signal outputted from the comparator 157. Next, the decision feedback adaptive equalizer 149 outputs error values to the equalized square error integrating circuit 150 upon equalizing the random data 12. Further, the decision feedback adaptive equalizer 149 outputs the result of equalization of the random data 12 to the equalized-output memory 152.

The equalized square error integrating circuit 142 squares the error values given by the equation (4), which have been outputted upon equalizing the random data 12 by the decision feedback adaptive equalizer 141 and thereafter calculates the sum SE3a of the squared error values, which corresponds to one burst. Next, the equalized square error integrating circuit 142 outputs the result of calculation to the comparator 158.

The equalized square error integrating circuit 150 brings the error values given by the equation (4), which have been outputted upon equalization of the random data 12 by the decision feedback adaptive equalizer 149 to a square and thereafter calculates the sum SE3b of the squared error values, which corresponds to one burst. Next, the equalized square error integrating circuit 150 outputs the result of calculation to the comparator 158.

The comparator 158 compares the magnitudes of the result SE3a outputted from the equalized square error integrating circuit 142, the result SE3b outputted from the equalized square error integrating circuit 150 and the previously-input SE2a and SE2b and selects the minimum one of them. Thereafter, the comparator 158 outputs the result of selection to the selecting circuit 140.

The selecting circuit 140 selects a final equalized output from the equalized outputs stored in the equalized-output memory 144, the equalized-output memory 148, the equalized-output memory 152 and the equalized-output memory 156 and outputs it from the equalize output terminal 126.

In the eighth embodiment, the threshold-value setting circuit 143 and the threshold-value setting circuit 151 respectively calculate the ratio FFRa of the sum of the absolute values of the tap coefficients in the FF section, which have been outputted from the decision feedback adaptive equalizer 141, to that of the absolute values of the tap coefficients in the FB section, which have been outputted from the decision feedback adaptive equalizer 141 and the ratio FFRb of the sum of the absolute values of the tap coefficients in the FF section, which have been outputted from the decision feedback adaptive equalizer 149 to that of the absolute values of the tap coefficients in the FB section, which have been outputted from the decision feedback adaptive equalizer 149. Each of both ratios may be set as the ratio of the sum of squared values of the tap coefficients in the FF section to the sum of squared values of the tap coefficients in the FB section.

In the eighth embodiment, the threshold-value setting circuit 143 and the threshold-value setting circuit 151 respectively calculate the ratio FFRa of the sum of the absolute values of the tap coefficients in the FF section, which have been outputted from the decision feedback adaptive equalizer 141, to that of the absolute values of the tap coefficients in the FB section, which have been outputted from the decision feedback adaptive equalizer 141 and the ratio FFRb of the sum of the absolute values of the tap coefficients in the FF section, which have been outputted from the decision feedback adaptive equalizer 149 to that of the absolute values of the tap coefficients in the FB section, which have been outputted from the decision feedback adaptive equalizer 149. Both ratios FFRa and FFRb may be set equal to 1 respectively without carrying out this calculation.

Ninth embodiment

Figure 13:
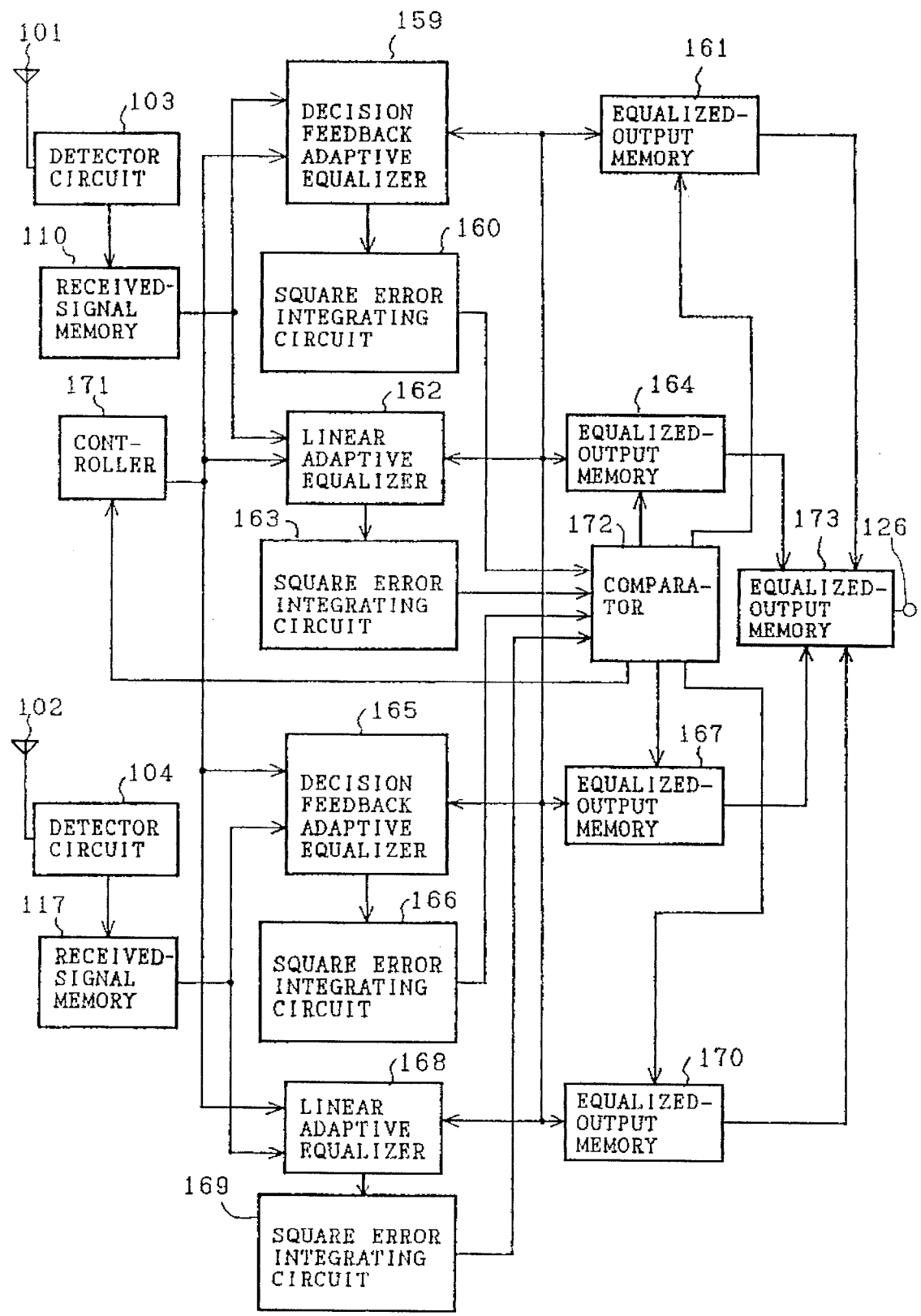
FIG. 13 is a block diagram illustrating the structure of an adaptive equalizer according to a ninth embodiment of the present invention.

FIG. 13 is a block diagram showing the structure of an adaptive diversity equalizer according to the ninth embodiment of the present invention. In the drawing, the same elements of structure as those employed in the conventional example are identified by the same reference numerals and their description will therefore be omitted.

In FIG. 13, reference numeral 159 indicates a decision feedback adaptive equalizer for reading a receive signal from received-signal memory 110 so as to equalize UW11, thereafter resetting tap coefficients and equalizing random data 12, based on a control signal sent from the outside, reference numeral 160 indicates an equalized square error integrating circuit for integrating equalized square errors outputted from the decision feedback adaptive equalizer 159, reference numeral 161 indicates an equalized-output memory for storing an equalized output produced from the decision feedback adaptive equalizer 159 therein, reference numeral 162 indicates a linear adaptive equalizer for reading a receive signal from the received-signal memory 110 so as to equalize UW11, thereafter resetting tap coefficients and equalizing random data 12, based on a control signal sent from the outside, reference numeral 163 indicates an equalized square error integrating circuit for integrating equalized square errors outputted from the linear adaptive equalizer 162, reference numeral 164 indicates an equalized-output memory for storing an equalized output produced from the linear adaptive equalizer 162 therein, reference numeral 165 indicates a decision feedback adaptive equalizer for reading a receive signal from a received-signal memory 117 so as to equalize UW11, thereafter resetting tap coefficients and equalizing random data 12, based on a control signal supplied from the outside, reference numeral 166 indicates an equalized square error integrating circuit for integrating equalized square errors outputted from the decision feedback adaptive equalizer 165, reference numeral 167 indicates an equalized-output memory for storing an equalized output outputted from the decision feedback adaptive equalizer 165 therein, reference numeral 168 indicates a linear adaptive equalizer for reading a receive signal from the received-signal memory 117 so as to equalize UW11, thereafter resetting tap coefficients and equalizing random data 12, based on a control signal sent from the outside, reference numeral 169 indicates an equalized square error integrating circuit for integrating equalized square errors outputted from the linear adaptive equalizer 168, reference numeral 170 indicates an equalized-output memory for storing an equalized output outputted from the linear adaptive equalizer 168, reference numeral 171 indicates a controller for controlling the operation of each of the decision feedback adaptive equalizer 159, the decision feedback adaptive equalizer 165, the linear adaptive equalizer 162 and the linear adaptive equalizer 168, reference numeral 172 indicates a comparator for comparing the magnitudes of an output produced from the equalized square error integrating circuit 160, an output produced from the equalized square error integrating circuit 163, an output produced from the equalized square error integrating circuit 166 and an output produced from the equalized square error integrating circuit 169 and for outputting the result of comparison to each of the equalized-output memory 161, the equalized-output memory 164, the equalized-output memory 167, the equalized-output memory 170 and the controller 171, and reference numeral 173 indicates an equalized-output memory for storing data outputted from each of the equalized-output memory 161, the equalized-output memory 164, the equalized-output memory 167 and the equalized-output memory 170 therein by one burst and thereafter outputting it therefrom.

Operation of the adaptive diversity equalizer shown in FIG. 13 will be described.

The decision feedback adaptive equalizer 159 reads data from the received-signal memory 110 and estimates characteristics of a channel using UW11 so as to converge tap coefficients. Next, the decision feedback adaptive equalizer 159 equalizes random data 12 by a predetermined number of symbols (m1). Further, the decision feedback adaptive equalizer 159 outputs the error values given by the equation 4 to the equalized square error integrating circuit 160 upon equalizing the random data 12. Moreover, the decision feedback adaptive equalizer 159 outputs the result of equalization of the random data, which corresponds to m1, to the equalized-output memory 161. The linear adaptive equalizer 162 also reads data from the received-signal memory 110 and estimates characteristics of a channel using UW11 so as to converge tap coefficients. Next, the linear adaptive equalizer 162 equalizes random data 12 by a predetermined number of symbols (m1). Further, the linear adaptive equalizer 162 outputs the error values expressed by the equation (4) to the equalized square error integrating circuit 163 upon equalizing the random data 12. Moreover, the linear adaptive equalizer 162 outputs the result of equalization of the m1 random data to the equalized-output memory 164.

The decision feedback adaptive equalizer 165 reads data from the received-signal memory 117 and estimates characteristics of a channel using UW11 to converge tap coefficients. Next, the decision feedback adaptive equalizer 165 equalizes random data 12 by a predetermined number of symbols (m1). Further, the decision feedback adaptive equalizer 165 outputs the error values given by the equation (4) to the equalized square error integrating circuit 166 upon equalizing the random data 12. Moreover, the decision feedback adaptive equalizer 165 outputs the result of equalization of the m1 random data to the equalized-output memory 167. The linear adaptive equalizer 168 also reads data from the received-signal memory 117 and estimates characteristics of a channel using UW11 to converge tap coefficients. Next, the linear adaptive equalizer 168 equalizes random data 12 for a predetermined number of symbols (m1). Further, the linear adaptive equalizer 168 outputs the error values given by the expression (4) to the equalized square error integrating circuit 169 upon equalizing the random data 12. Moreover, the linear adaptive equalizer 168 outputs the result of equalization of the m1 random data to the equalized-output memory 170.

The equalized square error integrating circuit 160 squares the m1 error values which have been outputted upon equalizing the random data by the decision feedback adaptive equalizer 159 and thereafter calculates the sum SE11 of the squared error values. Next, the equalized square error integrating circuit 160 outputs the result of calculation to the comparator 172.

The equalized square error integrating circuit 163 squares the m1 error values outputted upon equalizing the random data by the linear adaptive equalizer 162 and thereafter calculates the sum SE21 of the squared error values. Next, the equalized square error integrating circuit 163 outputs the result of calculation to the comparator 172.

The equalized square error integrating circuit 166 squares the m1 error values outputted upon equalizing the random data by the decision feedback adaptive equalizer 165 and thereafter calculates the sum SE31 of the squared error values. Next, the equalized square error integrating circuit 166 outputs the result of calculation to the comparator 172.

The equalized square error integrating circuit 169 squares the m1 error values outputted upon equalizing the random data by the linear adaptive equalizer 168 and thereafter calculates the sum SE41 of the squared error values. Next, the equalized square error integrating circuit 169 outputs the result of calculation to the comparator 172.

The comparator 172 compares the SE11, the SE21, the SE31 and the SE41. When the SE11 is of the minimum value from the result of comparison, the comparator 172 outputs a selection signal 1 to each of the decision feedback adaptive equalizer 159, the linear adaptive equalizer 162, the decision feedback adaptive equalizer 165, the linear adaptive equalizer 168, the equalized-output memory 161, the equalized-output memory 164, the equalized-output memory 167 and the equalized-output memory 170. When the SE21 is of the minimum value, the comparator 172 outputs a selection signal 2 to each of them. When the SE31 is of the minimum value, the comparator 172 outputs a selection signal 3 to each of them. When the SE41 is of the minimum value, the comparator 172 outputs a selection signal (4) to each of them. Further, the comparator 172 outputs a selection end signal to the controller 171. Only when the selection signal 1 is received by the equalized-output memory 161, the equalized-output memory 161 writes an equalized output corresponding to m1 symbols into the equalized-output memory 173. Only when the selection signal 2 is received by the equalized-output memory 164, the equalized-output memory 164 writes the equalized output corresponding to the m1 symbols into the equalized-output memory 173. Further, the equalized-output memory 167 writes the equalized output corresponding to the m1 symbols into the equalized-output memory 173 only when it receives the selection signal 3. Moreover, the equalized-output memory 170 writes the equalized output corresponding to the m1 symbols into the equalized-output memory 173 only when the selection signal 4 is received by the equalized-output memory 170.

After the selection end signal has been received by the controller 171, the controller 171 initializes tap coefficients and tap-coefficient update algorithms for the decision feedback adaptive equalizer 159, the linear adaptive equalizer 162, the decision feedback adaptive equalizer 165 and the linear adaptive equalizer 168.

When the decision feedback adaptive equalizer 159, the linear adaptive equalizer 162, the decision feedback adaptive equalizer 165 and the linear adaptive equalizer 168 respectively receive the selection signals 1, 2, 3 and 4 after completion of the above initialization, they read equalized outputs of m2 data (m1>m2) each corresponding to the latter half of a series of m1 data from their corresponding equalized-output memory 161, the equalized-output memory 164, the equalized-output memory 167 and the equalized-output memory 170. Next, each of the decision feedback adaptive equalizer 159, the linear adaptive equalizer 162, the decision feedback adaptive equalizer 165 and the linear adaptive equalizer 168 estimates the characteristics of the channel with the equalized output as a reference signal to thereby converge the tap coefficients. Thereafter, each of them equalizes random data subsequent to the m1 symbols, corresponding to a predetermined number of symbols (m3).

The equalized square error integrating circuit 160 squares m3 error values, which have been outputted upon equalizing the above m3 random data by the decision feedback adaptive equalizer 159 and thereafter calculates the sum SE12 of the squared error values. Next, the equalized square error integrating circuit 160 outputs the result of calculation to the comparator 172.

The equalized square error integrating circuit 163 squares m3 error values, which have been outputted upon equalizing the above m3 random data by the linear adaptive equalizer 162 and thereafter determines or calculates the sum SE22 of the squared error values. Next, the equalized square error integrating circuit 163 outputs the result of calculation to the comparator 172.

The equalized square error integrating circuit 166 squares m3 error values, which have been outputted upon equalizing the above m3 random data by the decision feedback adaptive equalizer 165 and thereafter calculates the sum SE32 of the squared error values. Next, the equalized square error integrating circuit 166 outputs the result of calculation to the comparator 172.

The equalized square error integrating circuit 169 squares m3 error values, which have been outputted upon equalizing the above m3 random data by the linear adaptive equalizer 168 and thereafter calculates the sum SE42 of the squared error values. Next, the equalized square error integrating circuit 169 outputs the result of calculation to the comparator 172.

The comparator 172 compares the SE12, the SE22, the SE32 and the SE42. When the SE12 is of the minimum value from the result of comparison, the comparator 172 outputs the selection signal 1 to each of the decision feedback adaptive equalizer 159, the linear adaptive equalizer 162, the decision feedback adaptive equalizer 165, the linear adaptive equalizer 168, the equalized-output memory 161, the equalized-output memory 164, the equalized-output memory 167 and the equalized-output memory 170. When the SE22 is of the minimum value, the comparator 172 outputs the selection signal 2 to each of them. When the SE32 is of the minimum value, the comparator 172 outputs the selection signal 3 to each of them. When the SE42 is of the minimum value, the comparator 172 outputs the selection signal 4 to each of them. Further, the comparator 172 outputs the selection end signal to the controller 171. Only when the selection signal 1 is received by the equalized-output memory 161, the equalized-output memory 161 writes an equalized output corresponding to m3 symbols into the equalized-output memory 173. Only when the selection signal 2 is received by the equalized-output memory 164, the equalized-output memory 164 writes the equalized output corresponding to the m3 symbols into the equalized-output memory 173. Further, the equalized-output memory 167 writes the equalized output corresponding to the m3 symbols into the equalized-output memory 173 only when it receives the selection signal 3. Moreover, the equalized-output memory 170 writes the equalized output corresponding to the m3 symbols into the equalized-output memory 173 only when the selection signal 4 is received by the equalized-output memory 170.

When the equalization of data corresponding to one burst has not yet been completed, the controller 171 repeats the same operation as described above during a period of from the initialization of the tap coefficients and tap-coefficient update algorithms for the decision feedback adaptive equalizer 159, the linear adaptive equalizer 162, the decision feedback adaptive equalizer 165 and the linear adaptive equalizer 168 to the writing of the selected equalized output into the equalized-output memory 173 after the selection end signal has been received by the controller 171. After completion of the equalization of the data corresponding to the one burst, the controller 171 makes the equalized-output memory 113 output a final equalized output.

Tenth embodiment

Figure 14:
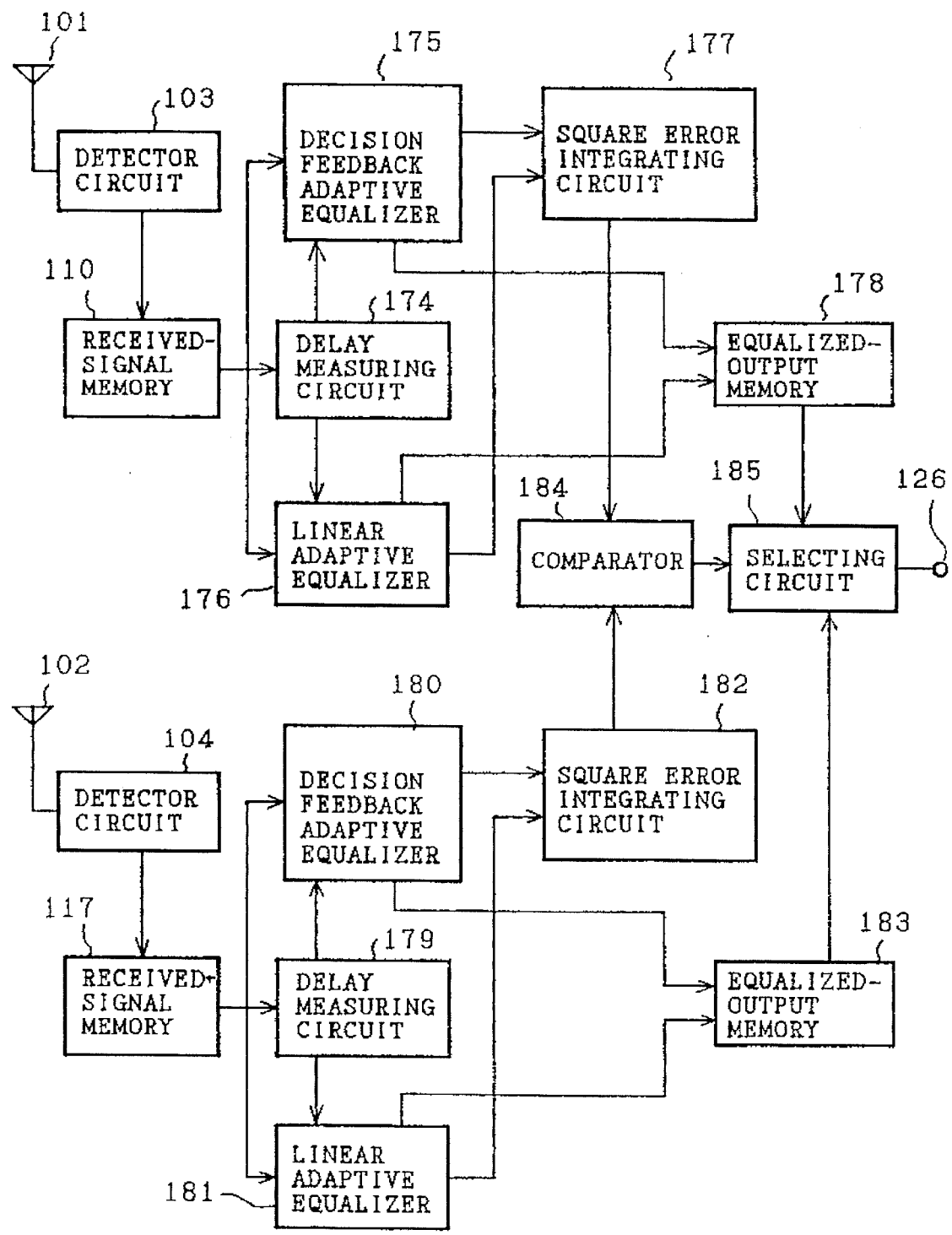
FIG. 14 is a block diagram showing the structure of an adaptive equalizer according to a tenth embodiment of the present invention.

FIG. 14 is a block diagram showing the structure of an adaptive equalizer according to the tenth embodiment of the present invention. In the drawing, the same elements of structure as those employed in the conventional example are identified by the same reference numerals and their description will therefore be omitted. In FIG. 14, reference numeral 174 indicates a delay measuring circuit for reading a receive signal from received-signal memory 110, for measuring a multipath propagation characteristic on a channel and for outputting a control signal therefrom, reference numeral 175 indicates a decision feedback adaptive equalizer for reading a receive signal from the received-signal memory 110 in response to the control signal supplied from the delay measuring circuit 174 and for equalizing it, reference numeral 175 indicates a linear adaptive equalizer for reading a receive signal from the received-signal memory 110 in response to the control signal sent from the delay measuring circuit 174 and for equalizing it, reference numeral 177 indicates an equalized square error integrating circuit for integrating equalized square errors produced from either the decision feedback adaptive equalizer 175 or the linear adaptive equalizer 176, reference numeral 178 indicates an equalized-output memory for storing therein either an equalized output produced from the decision feedback equalizer 175 or an equalized output produced from the linear adaptive equalizer 176, reference numeral 179 indicates a delay measuring circuit for reading a receive signal from received-signal memory 117, for measuring a multipath propagation characteristic on a channel and for outputting a control signal therefrom, reference numeral 180 indicates a decision feedback adaptive equalizer for reading a receive signal from the received-signal memory 117 in response to a control signal supplied from the delay measuring circuit 179 and for equalizing it, reference numeral 181 indicates a linear adaptive equalizer for reading a receive signal from the received-signal memory 117 in response to the control signal sent from the delay measuring circuit 179 and for equalizing it, reference numeral 182 indicates an equalized square error integrating circuit for integrating equalized square errors produced from either the decision feedback adaptive equalizer 180 or the linear adaptive equalizer 181, reference numeral 183 indicates an equalized-output memory for storing therein an equalized output produced from the decision feedback adaptive equalizer 180 or an equalized output produced from the linear adaptive equalizer 181, reference numeral 184 indicates a comparator for comparing the magnitude of an output produced from the equalized square error integrating circuit 177 and the magnitude of an output produced from the equalized square error integrating circuit 182 and for outputting the result of comparison as an output control signal therefrom, and reference numeral 185 indicates a selecting circuit for selecting one of outputs produced from the equalized-output memory 178 and the equalized-output memory 183 in accordance with the output control signal supplied from the comparator 184.

Operation of the adaptive diversity equalizer shown in FIG. 14 will be described. The received-signal memory 110 stores therein a signal received by an antenna 101 and converted into a baseband signal by a detector circuit 103.

The delay measuring circuit 174 comprises a correlator for outputting a value indicative of a relationship between UW and an input signal, and a control signal output circuit for outputting the control signal to each of the decision feedback adaptive equalizer 175 and the linear adaptive equalizer 176 based on the result outputted from the correlator. The delay measuring circuit 174 reads received data corresponding to UW11 from the received-signal memory 110 and correlates the UW to the input signal at the correlator. The correlation value, which is outputted from the correlator, becomes large at the input signal which corresponds to direct wave or delayed wave or both waves. Based on the correlation value, the control signal output circuit makes a decision as to whether either one of the decision feedback adaptive equalizer 175 and the linear adaptive equalizer 176 should be operated with respect to its burst depending on the ratio of the value of the direct wave of the correlator to that of the delay wave thereof and the maximum delay time of the delay wave. As a criterion for this decision, there is a method of activating the linear adaptive equalizer 176 if the maximum delay time of the delay wave is less than or equal to 0.35 symbol and of activating the decision feedback adaptive equalizer 175 if the maximum delay time is more than or equal to 0.35 symbol, both using the result of bit error rate performance shown in FIG. 2, for example. After the adaptive equalizer to be operated has been decided, the delay measuring circuit 174 outputs the control signal to the decision feedback adaptive equalizer 175 when the decision feedback adaptive equalizer 175 is activated, whereas the delay measuring circuit 174 outputs the control signal to the linear adaptive equalizer 176 when the linear adaptive equalizer 176 is activated.

When the decision feedback adaptive equalizer 175 receives the control signal from the delay measuring circuit 174, the decision feedback adaptive equalizer 175 reads data from the received-signal memory 110 and estimates characteristics of a channel using UW11 as described in the paragraphs of the operation of the equalizer shown in FIG. 15 to converge tap coefficients. Next, the decision feedback adaptive equalizer 175 effects an equalization on random data 12. The decision feedback adaptive equalizer 175 outputs the error values given by the equation (4) to the equalized square error integrating circuit 177 upon equalizing the random data 12. Further, the decision feedback adaptive equalizer 175 outputs the result of equalization of the random data 12 to the equalized-output memory 178. When the linear adaptive equalizer 176 receives the control signal from the delay measuring circuit 174, the linear adaptive equalizer 176 reads data from the received-signal memory 110 and estimates characteristics of a channel using UW11 as described in the paragraphs of the operation of the equalizer shown in FIG. 15 to converge tap coefficients. Next, the linear adaptive equalizer 176 equalizes random data 12. Thereafter, the linear adaptive equalizer 176 outputs the error values given by the equation (4) to the equalized square error integrating circuit 177 upon equalization of the random data 12. Further, the linear adaptive equalizer 176 outputs the result of equalization of the random data 12 to the equalized-output memory 178.

The received-signal memory 117 stores therein a signal received by antenna 102 and converted into a baseband signal by detector circuit 104.

The delay measuring circuit 179 comprises a correlator for outputting a value indicative of a relationship between UW and an input signal, and a control signal output circuit for outputting the control signal to each of the decision feedback adaptive equalizer 180 and the linear adaptive equalizer 181 based on the result outputted from the correlator. The delay measuring circuit 179 reads received data corresponding to UW11 from the received-signal memory 117 and effects a correlation process on the UW and the input signal using the correlator. The correlation value, which is outputted from the correlator, becomes large at the input signal which corresponds to direct wave or delayed wave or both waves.

Based on the correlation value, the control signal output circuit makes a decision as to whether either one of the decision feedback adaptive equalizer 180 and the linear adaptive equalizer 181 should be operated with respect to its burst depending on the ratio of the value of the direct wave of the correlator to that of the delay wave thereof and the maximum delay time of the delay wave. As a criterion for this decision, there is a method of activating the linear adaptive equalizer 181 if the maximum delay time of the delay wave is less than or equal to 0.35 symbol and activating the decision feedback adaptive equalizer 180 if the maximum delay time is more than or equal to 0.35 symbol, both using the result of the bit error rate shown in FIG. 2, for example. After the adaptive equalizer to be operated has been decided, the delay measuring circuit 179 outputs the control signal to the decision feedback adaptive equalizer 180 when the decision feedback adaptive equalizer 180 is activated, whereas the delay measuring circuit 179 outputs the control signal to the linear adaptive equalizer 181 when the linear adaptive equalizer 181 is activated.

When the decision feedback adaptive equalizer 180 receives the control signal from the delay measuring circuit 179, the decision feedback adaptive equalizer 180 reads data from the received-signal memory 117 and estimates characteristics of a channel using UW11 as described in the paragraphs of the operation of the equalizer shown in FIG. 15 to converge tap coefficients. Next, the decision feedback adaptive equalizer 180 effects an equalization on random data 12. The decision feedback adaptive equalizer 180 outputs the error values given by the equation (4) to the equalized square error integrating circuit 182 upon equalizing the random data 12. Further, the decision feedback adaptive equalizer 180 outputs the result of equalization of the random data. 12 to the equalized-output memory 183. When the linear adaptive equalizer 181 receives the control signal from the delay measuring circuit 179, the linear adaptive equalizer 181 reads data from the received-signal memory 117 and estimates characteristics of a channel using UW11 as described in the paragraphs of the operation of the equalizer shown in FIG. 15 to converge tap coefficients. Next, the linear adaptive equalizer 181 equalizes random data 12. Thereafter, the linear adaptive equalizer 181 outputs the error values given by the equation (4) to the equalized square error integrating circuit 182 upon equalization of the random data 12. Further, the linear adaptive equalizer 181 outputs the result of equalization of the random data 12 to the equalized-output memory 183.

The equalized square error integrating circuit 177 squares the error values outputted upon equalizing the random data 12 by either the decision feedback adaptive equalizer 175 or the linear adaptive equalizer 176 and thereafter calculates the sum of the squared error values, which corresponds to one burst. Next, the equalized square error integrating circuit 177 outputs the result of calculation to the comparator 184.

The equalized square error integrating circuit 182 squares the error values outputted upon equalizing the random data 12 by either decision feedback adaptive equalizer 180 or the linear adaptive equalizer 181 and thereafter calculates the sum of the squared error values, which corresponds to one burst. Next, the equalized square error integrating circuit 182 outputs the result of calculation to the comparator 184.

The comparator 184 compares the result outputted from the equalized square error integrating circuit 177 and the result outputted from the equalized square error integrating circuit 182. When the sum of the equalized square errors by the equalized square error integrating circuit 177 is smaller than that of the equalized square errors by the equalized square error integrating circuit 182, that is, when either the decision feedback adaptive equalizer 175 or the linear adaptive equalizer 176 that shows better performance than either the decision feedback adaptive equalizer 180 or the linear adaptive equalizer 181 with respect to a burst produced at that time, the comparator 184 outputs a control signal for connecting the selecting circuit 185 to the equalized-output memory 178 to the selecting circuit 185.

On the other hand, when the sum of the equalized square errors by the equalized square error integrating circuit 182 is smaller than that of the equalized square errors by the equalized square error integrating circuit 177, that is, when either the decision feedback adaptive equalizer 180 or the linear adaptive equalizer 181 that shows better performance than either the decision feedback adaptive equalizer 175 or the linear adaptive equalizer 176 in regard to a burst produced at that time, the comparator 184 outputs a control signal for connecting the selecting circuit 185 to the equalized-output memory 183 to the selecting circuit 185.

The selecting circuit 185 selects a final equalized output from the equalized outputs stored in the equalized-output memory 178 and the equalized-output memory 183 in accordance with the result outputted from the comparator 184 and outputs it from an equalize output terminal 126.

Thus, according to the invention as has been described above, an equalization is executed by means of a decision feedback adaptive equalizer which shows excellent performance under frequency selective fading in which a delay time interval of a delay wave is long and a linear adaptive equalizer which shows excellent performance under frequency selective fading in which a delay time interval of a delay wave is short and fading in which a delay wave does not exist, and the result of the output of the adaptive equalizer which shows better performance than the other is used as a final equalized output. Therefore, a good performance is obtained irrespective of whether the delay wave is present and the delay time interval of the delay wave is long or short under fading. Further, the computational complexity of tap-coefficient update algorithms for an adaptive equalizer employed in mobile communication normally increases in proportion to the square of the number of taps. However, if an improvement in performance is considered where a normalized delay time interval of a delay wave falls within one symbol, then the number of taps for the linear adaptive equalizer may be either 1 or 2. Therefore, an adaptive equalizer can be obtained wherein the performance is improved without so increasing the computational complexity as compared with the case where a single decision feedback adaptive equalizer is used.

Further, according to the invention, as has been described above, an equalization is effected on a part of a received signal by means of a decision feedback adaptive equalizer which shows excellent performance under frequency selective fading in which a delay time interval of a delay wave is long and a linear adaptive equalizer which shows excellent performance under frequency fading in which a delay time interval of a delay wave is short and fading in which a delay wave does not exist, thereby deciding or judging the performance of both equalizers and deactivating the one which shows performance degradation compared with the other. Therefore, an adaptive equalizer can be obtained wherein when a variation of channel characteristic is relatively gentle, a good performance can be obtained irrespective of whether the delay wave is present and the delay time interval of the delay wave is long or short and the total computation time can be reduced.

Further, according to the invention as has been described above, a performance of a decision feedback adaptive equalizer with respect to a received signal corresponding to an known data sequence is compared with a performance of a linear adaptive equalizer with respect to a received signal corresponding to one burst. Only when it is expected that the linear adaptive equalizer which shows performance degradation as compared with the decision feedback adaptive equalizer, the decision feedback adaptive equalizer effects an equalization on a received signal subsequent to that corresponding to the known data sequence. Therefore, when a delay wave does not exist and a delay time interval of the delay wave is short, the decision feedback adaptive equalizer does not need to effect an equalization on one other than the received signal corresponding to the known data sequence. It is therefore possible to obtain an adaptive equalizer capable of reducing the total computation time. Even when the received signal subsequent to that corresponding to the known data sequence is equalized by the decision feedback adaptive equalizer, the result outputted from the adaptive equalizer which shows excellent performance is set as a final equalized output. It is therefore possible to obtain an adaptive equalizer wherein a good performance can be brought about irrespective of whether the delay wave is present and the delay time interval of the delay wave is long or short under fading.

Further, according to the invention as has been described above, an equalization effected on a signal produced in one burst is stopped and then the tap coefficients of a decision feedback adaptive equalizer and a linear adaptive equalizer are reset and the output of the adaptive equalizer which has been shown good performance so far, is selected. Further, the decision feedback adaptive equalizer and the linear adaptive equalizer are subjected to re-training with data outputted from the adaptive equalizer which shows excellent performance as an known reference signal for the following equalization. Therefore, an adaptive equalizer can be obtained wherein a tracking property with respect to a variation in characteristic of a channel can be improved and a good performance can be brought about irrespective of whether a delay wave is present and a delay time interval of the delay wave is long or short under fading.

Further, according to the invention as has been described above, a delay measuring circuit measures a state of a channel. When a delay time interval of a delay wave is long, an equalization is made by means of a decision feedback adaptive equalizer which shows excellent performance under frequency selective fading in which the delay time interval of the delay wave is long. On the other hand, when the delay time interval of the delay wave is short, an equalization is executed by means of a linear adaptive equalizer which shows excellent performance under frequency selective fading in which the delay time interval of the delay wave is short and fading in which the delay wave does not exist. Thus, a good performance can be obtained regardless of whether the delay wave is present and the delay time interval of the delay wave is long or short. Further, an adaptive equalizer whose computational complexity has been reduced, can be obtained without making either one of calculations to be performed by the decision feedback adaptive equalizer or the linear adaptive equalizer.

Further, according to the invention as has been described above, each of a plurality of decision feedback adaptive equalizers, which is which shows excellent performance under frequency selective fading in which a delay time interval of a delay wave is long and each of a plurality of linear adaptive equalizers, which shows excellent performance under frequency fading in which a delay time interval of a delay wave is short and fading in which the delay wave does not exist, effect an equalization on each of signals outputted from a plurality of antennas and detectors. Further, the result outputted from the adaptive equalizer whose equalization characteristic is best, is set as a final equalized output. Therefore, a receiver performance can be improved owing to a diversity effect under fading and a satisfactory characteristic can be obtained irrespective of whether the delay wave is present and the delay time interval of the delay wave is long or short under fading. The computational complexity of tap-coefficient update algorithms of an adaptive equalizer employed in mobile communication is normally increased in proportion to the square of the number of taps of the equalizer. However, if an improvement in performance is considered where a normalized delay time interval of a delay wave falls within one symbol, then the number of taps for the linear adaptive equalizer may be either 1 or 2. Therefore, an adaptive diversity equalizer can be obtained wherein performance is improved without so increasing the computation time as compared with the case where only the decision feedback adaptive equalizers are provided so as to correspond to the signals outputted from the plurality of antennas and detectors.

Further, according to the invention as has been described above, an equalization is effected on a part of a received signal by each of a plurality of decision feedback adaptive equalizers, which shows excellent performance with respect to each of signals outputted from a plurality of antennas and detectors under frequency selective fading in which a delay time interval of a delay wave is long and each of a plurality of linear adaptive equalizers, which shows excellent performance with respect to each output signal under frequency selective fading in which a delay time interval of a delay wave is short and fading in which a delay wave does not exist, thereby deciding or judging each performance of equalizers and deactivating the equalizers which shows performance degradation. Therefore, an adaptive diversity equalizer can be obtained wherein a receiver performance can be improved owing to a diversity effect under fading, when a variation in characteristic of a channel is relatively gentle, a good performance can be obtained irrespective of whether the delay wave is present and the delay time interval of the delay wave is long or short under fading, and the total computation time can be reduced.

Further, according to the invention as has been described above, performance each produced with respect to a received signal corresponding to an known data sequence, of respective decision feedback adaptive equalizers are respectively compared with performance each produced with respect to a received signal corresponding to one burst, of linear adaptive equalizers. Next, only when it is expected that the decision feedback adaptive equalizers are best in equalization characteristic with respect to signals outputted from a plurality of antennas and detectors, each of the decision feedback adaptive equalizers effects an equalization on a received signal subsequent to that corresponding to the known data sequence. Therefore, when a delay wave does not exist and a delay time interval of the delay wave is short, each of the decision feedback adaptive equalizers does not need to effect an equalization on one other than the received signal corresponding to the known data sequence. It is therefore possible to obtain an adaptive diversity equalizer capable of reducing the total computation time. Even when the received signal subsequent to that corresponding to the known data sequence is equalized by the decision feedback adaptive equalizer, the result outputted from the adaptive equalizer, which is best in equalization characteristic, is set as a final equalized output. It is therefore possible to obtain an adaptive diversity equalizer wherein a receiver performance can be improved owing to a diversity effect and a good performance can be brought about irrespective of whether the delay wave is present and the delay time interval of the delay wave is long or short under fading.

Further, according to the invention as has been described above, an equalization effected on signals outputted from a plurality of antennas and detectors is stopped in one burst and then tap coefficients for decision feedback adaptive equalizers and linear adaptive equalizers are reset and the output of the adaptive equalizer which has been shown good performance so far, is selected. Further, each of the decision feedback adaptive equalizers and each of the linear adaptive equalizer are subjected to re-training with data outputted from the adaptive equalizer best in equalization characteristic as a known reference signal for the following equalization. Therefore, a tracking property with respect to a variation in characteristic of a channel is improved and a receiver performance is improved owing to a diversity effect under fading. Further, an adaptive diversity equalizer can be obtained wherein a good performance can be brought about irrespective of whether a delay wave is present and a delay time interval of the delay wave is long or short.

Further, according to the invention as has been described above, each of a plurality of delay measuring circuits measures a state of a channel. When a delay time interval of a delay wave is long, an equalization is effected on each of signals outputted from a plurality of antennas and detectors by each of a plurality of decision feedback adaptive equalizers, which shows excellent performance under frequency selective fading in which the delay time interval of the delay wave is long. On the other hand, when the delay time interval of the delay wave is short, an equalization is effected on each output signal by each of a plurality of linear adaptive equalizers, which shows excellent performance under frequency selective fading in which the delay time interval of the delay wave is short and fading in which the delay wave does not exist. Further, the result outputted from a branch which is best in equalization characteristic, is set as a final equalized output after equalized outputs have been decided every branches. Therefore, a receiver performance can be improved owing to a diversity effect under fading and a good performance can be obtained regardless of whether the delay wave is present and the delay time interval of the delay wave is long or short. Further, an adaptive diversity equalizer whose computation time has been reduced, can be obtained at each branch without making either one of calculations to be performed by the decision feedback adaptive equalizer or the linear adaptive equalizer.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An adaptive equalizer comprising:

a decision feedback adaptive equalizer including an equalization filter part, a decision part having an input connected to the output of said equalization filter part and tap-coefficient-update part which updates the tap coefficients of said equalization filter part in accordance with a tap-coefficient update algorithm, said equalization filter part having two linear transversal filters, that is, a feedforward filter and a feedback filter, said decision feedback adaptive equalizer being deactivated or activated in response to an external control signal;

a linear adaptive equalizer including an equalization filter part having a linear transversal filter, a decision part and a tap-coefficient-update part which updates the tap coefficients of said equalization filter part in accordance with a tap-coefficient update algorithm;

a threshold value setting circuit for determining a threshold value based on an estimation error outputted from said decision feedback adaptive equalizer upon equalizing a receive signal corresponding to a known data sequence;

a first comparator for comparing a value determined based on an estimation error outputted from said linear adaptive equalizer upon equalizing a receive signal corresponding to a random data sequence with said threshold value;

means for setting the output produced from said linear adaptive equalizer as the final output and for providing the external control signal to stop the equalization of the random data sequence by said decision feedback adaptive equalizer when said value determined by said linear adaptive equalizer is smaller than said threshold value;

means for providing the external control signal to effect equalization of a receive signal corresponding to a data sequence other than said known data sequence by said decision feedback adaptive equalizer when said value determined by said linear adaptive equalizer is larger than said threshold value;

a second comparator for comparing a value determined based on an estimation error produced from said decision feedback adaptive equalizer upon equalizing the receive signal corresponding to the data sequence other than said known data sequence with said value determined by said linear adaptive equalizer when said value determined by said linear adaptive equalizer is larger than said threshold value; and means for selecting one of the output produced from said decision feedback adaptive equalizer and the output produced from said linear adaptive equalizer based on the result of comparison by said second comparator when said value determined by said linear adaptive equalizer is larger than said threshold value and for setting the selected equalized output as the final output.

2. The adaptive equalizer according to claim 1, wherein said threshold value setting circuit includes a first integrating circuit for determining a first coefficient value based upon the tap coefficients in said feedforward filter;

a second integrating circuit for determining a second coefficient value based upon the tap coefficients in said feedback filter;

an error circuit for determining an estimation error from said decision feedback adaptive equalizer; and an setting circuit for determining said threshold value based upon said first coefficient value, said second coefficient value and said estimation error.

3. The adaptive equalizer of claim 2, wherein said first integrating circuit determines said first coefficient value by summing the absolute values of the tap coefficients in said feedforward filter; and wherein said second integrating circuit determines said second coefficient value by summing the absolute values of the tap coefficients in said feedback filter.

4. The adaptive equalizer of claim 2, wherein said first integrating circuit determines said first coefficient value by summing the squares of the tap coefficients in said feedforward filter; and wherein said second integrating circuit determines said second coefficient value by summing the squares of the tap coefficients in said feedback filter.

5. The adaptive equalizer of claim 2, wherein said threshold value is the product of the estimation error and a ration of the first coefficient value and the second coefficient value.

6. A method for equalizing an input signal comprising the steps of:

performing a first equalization using a decision feedback adaptive equalizer;

performing a second equalization using a linear adaptive equalizer;

determining a threshold value based on an estimation error outputted from said decision feedback adaptive equalizer upon equalizing a receive signal corresponding to a known data sequence;

comparing a value determined based on an estimation error outputted from said linear adaptive equalizer upon equalizing a receive signal corresponding to a random data sequence with said threshold value;

setting the output produced from said linear adaptive equalizer as a final output and stopping equalization of the random data sequence by said decision feedback adaptive equalizer when said value determined by said linear adaptive equalizer is smaller than said threshold value;

effecting equalization of a receive signal corresponding to a data sequence other than said known data sequence by said decision feedback adaptive equalizer when said value determined by said linear adaptive equalizer is larger than said threshold value;

comparing a value determined based on an estimation error produced from said decision feedback adaptive equalizer upon equalizing the receive signal corresponding to the data sequence other than said known data sequence with said value determined by said linear adaptive equalizer when said value determined by said linear adaptive equalizer is larger than said threshold value; and selecting one of the output produced from said decision feedback adaptive equalizer and the output produced from said linear adaptive equalizer based on the result of comparison by said second comparator when said value determined by said linear adaptive equalizer is larger than said threshold value and for setting the selected equalized output as the final output.

* * * * *